US012634879B2

(12) United States Patent
Edge et al.

(10) Patent No.: US 12,634,879 B2
(45) Date of Patent: May 19, 2026

(54) ARCHITECTURE AND PROTOCOL LAYERING FOR SIDELINK POSITIONING

(71) Applicant: QUALCOMM Incorporated, San Diego, CA (US)

(72) Inventors: Stephen William Edge, Escondido, CA (US); Hong Cheng, Basking Ridge, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 18/194,444

(22) Filed: Mar. 31, 2023

(65) Prior Publication Data

US 2023/0319776 A1      Oct. 5, 2023

Related U.S. Application Data

(60) Provisional application No. 63/327,775, filed on Apr. 5, 2022.

(51) Int. Cl.
*H04W 64/00*      (2009.01)
*G01S 5/02*      (2010.01)
(52) U.S. Cl.
CPC ......... *H04W 64/006* (2013.01); *G01S 5/0205* (2013.01)
(58) Field of Classification Search
CPC ...... G01S 5/0289; G01S 5/0009; G01S 1/042; H04W 76/14; H04W 92/18; H04W 72/23; H04W 72/0446; H04W 72/1268; H04W 88/04; H04W 72/21; H04W 72/20; H04W 48/16; H04W 72/542; H04W 60/04;

H04W 8/24; H04W 88/14; H04W 72/04; H04W 72/25; H04W 36/00698; H04W 36/0094; H04W 72/54; H04W 72/543; H04W 92/02; H04W 92/16; H04W 72/563;

(Continued)

(56) References Cited

U.S. PATENT DOCUMENTS

2018/0352412 A1* 12/2018 Huang ............... H04W 36/0055
2019/0373652 A1* 12/2019 Hong .................... H04W 76/14
(Continued)

FOREIGN PATENT DOCUMENTS

WO      WO-2021167393 A1      8/2021

OTHER PUBLICATIONS

International Search Report and Written Opinion—PCT/US2023/017278—ISA/EPO—Jun. 12, 2023.
(Continued)

*Primary Examiner* — Nimesh Patel
(74) *Attorney, Agent, or Firm* — Thien T. Nguyen

(57)      ABSTRACT

In some implementations, a user equipment (UE) may implement a ranging support protocol layer comprising one or more ranging support elements. The UE may communicate, using the one or more ranging support elements of the ranging support protocol layer, with a corresponding ranging support protocol layer in one or more other UEs, wherein the communicating is conducted via at least one lower protocol layer implemented at the UE. The UE may provide, at the ranging support protocol layer, a positioning service to an upper protocol layer implemented at the UE, the positioning service based at least in part on the communicating.

30 Claims, 14 Drawing Sheets

(58) Field of Classification Search

CPC ... H04W 72/535; H04W 16/18; H04W 68/12; H04W 8/005; H04W 72/02; H04W 52/0229; H04W 52/0245; H04W 28/0268; H04W 28/0236; H04W 28/0967; H04W 48/10; H04W 84/042; H04W 4/023; H04W 36/302; H04W 56/002; H04W 76/10; H04W 36/18; H04W 36/00833; H04W 36/144; H04W 36/03; H04W 72/00; H04W 48/12; H04W 40/12; H04W 40/22; H04W 40/24; H04L 5/0053; H04L 5/0048; H04L 5/0023; H04L 5/0055; H04L 5/0007; H04L 5/0098; H04L 27/261; H04L 1/0026; H04L 41/0894; H04L 5/006; H04L 2001/0097; H04L 41/0803; H04L 43/08; H04L 5/0037; H04B 7/0695; H04B 7/088; H04B 7/0626; H04B 17/318; H04B 7/0617; H04B 17/336; H04B 17/345; H04B 17/328; H04B 7/0632; H04B 7/06954; H04B 7/24; H04B 7/15507; H04B 7/0452; H04B 17/327; H04B 17/382; H04B 17/346; H04B 17/3913; Y02D 30/70; G06N 20/00; G06N 3/063; H04J 11/0056; H04J 11/0036; H04J 11/0053; H04J 11/005; H04J 13/004; H04J 11/0069; H04J 13/18; H04J 11/0079; H04J 11/0026; H04J 11/00; H04J 11/0059; H04J 11/0023; H04J 2011/0096

See application file for complete search history.

(56)    References Cited

U.S. PATENT DOCUMENTS

| | | | |
|---|---|---|---|
| 2020/0296619 A1* | 9/2020 | Pan | H04W 76/14 |
| 2023/0076030 A1* | 3/2023 | Baek | H04W 64/006 |
| 2023/0189117 A1* | 6/2023 | Tenny | H04L 45/20 |
| | | | 370/328 |

OTHER PUBLICATIONS

Vivo: "TR 23.700-86: New Solution for Ranging Devices Discovery and Ranging Procedure", 3GPP Draft, SA WG2 Meeting #150E e-meeting, S2-2202489, 3rd Generation Partnership Project, Mobile Competence Centre, 650, Route Des Lucioles, F-06921 Sophia-Antipolis Cedex, France, vol. SA WG2, No. e-meeting, Apr. 6, 2022-Apr. 12, 2022, 5 Pages, Mar. 29, 2022, XP052133326, p. 1-p. 5.

Apple Inc: "On Rel-18 Positioning", 3GPP TSG RAN Meeting #93-e, RP-212368, 3rd Generation Partnership Project, Mobile Competence Centre, 650, Route Des Lucioles, F-06921 Sophia-Antipolis Cedex, France, vol. TSG RAN, No. Electronic Meeting, Sep. 13, 2021-Sep. 17, 2021, Sep. 6, 2021, 6 Pages, XP052050343.

* cited by examiner

400A

410

412

600

620

660

800 ⟍
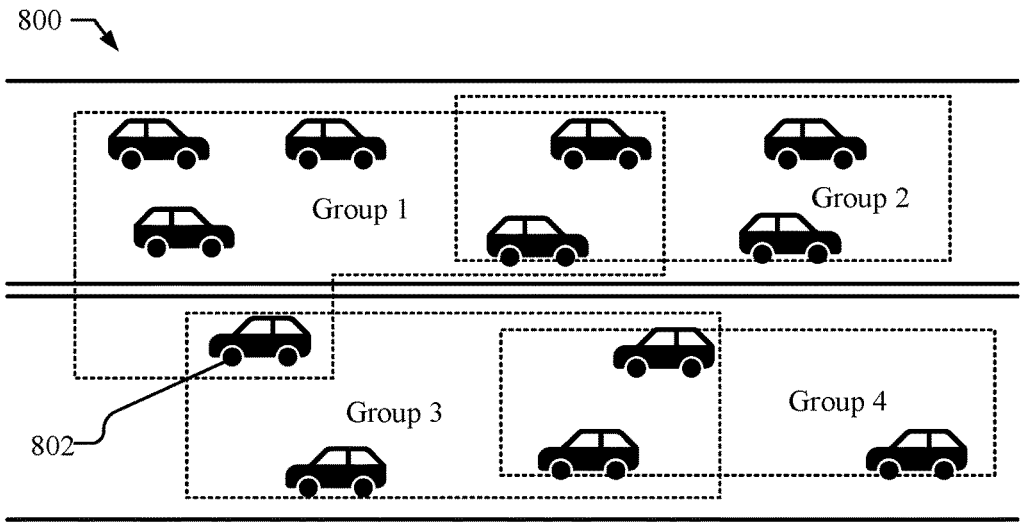
FIG. 8
900 ⟍
|      | UE1 | UE2 | UE3 | UE4 | UE5 |
|------|-----|-----|-----|-----|-----|
| UE1  |     | Y   | Y   | Y   | U   |
| UE2  | Y   |     | Y   | Y   | U   |
| UE3  | Y   | Y   |     | Y   | U   |
| UE4  | Y   | Y   | Y   |     | U   |
| UE5  | N   | N   | N   | N   |     |
FIG. 9
1000 ⟍
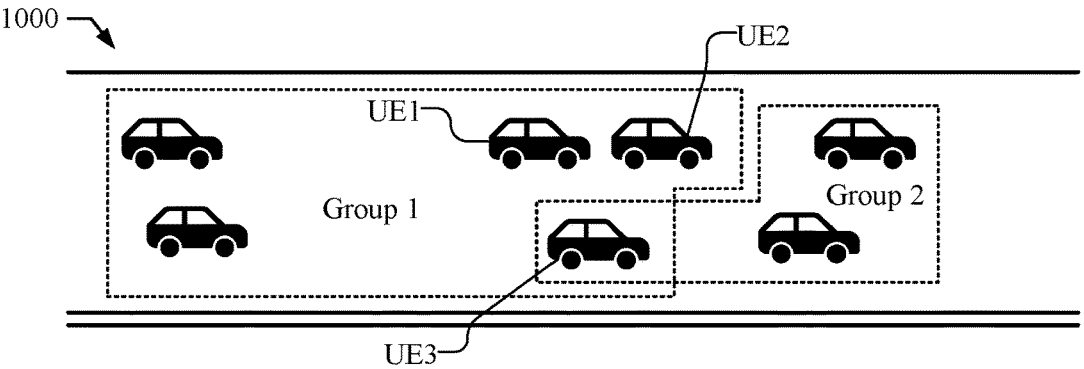
FIG. 10

1400 ⌐

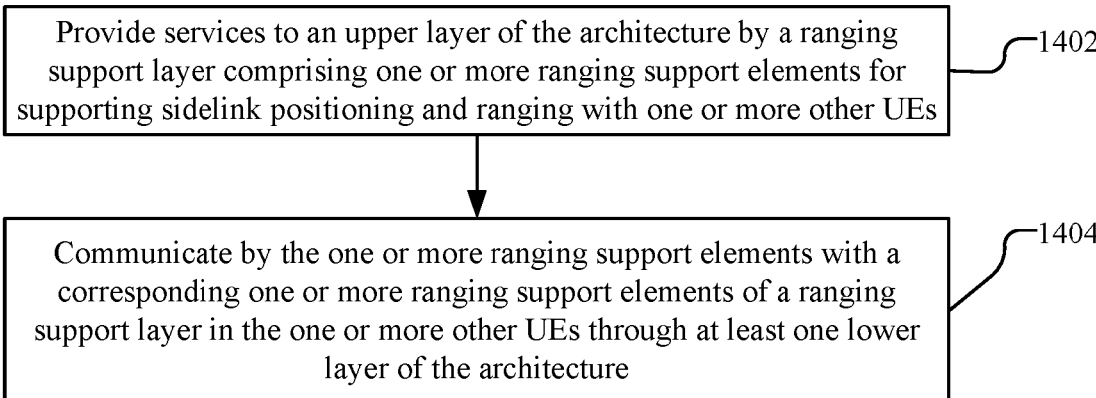

Provide services to an upper layer of the architecture by a ranging support layer comprising one or more ranging support elements for supporting sidelink positioning and ranging with one or more other UEs — 1402

Communicate by the one or more ranging support elements with a corresponding one or more ranging support elements of a ranging support layer in the one or more other UEs through at least one lower layer of the architecture — 1404

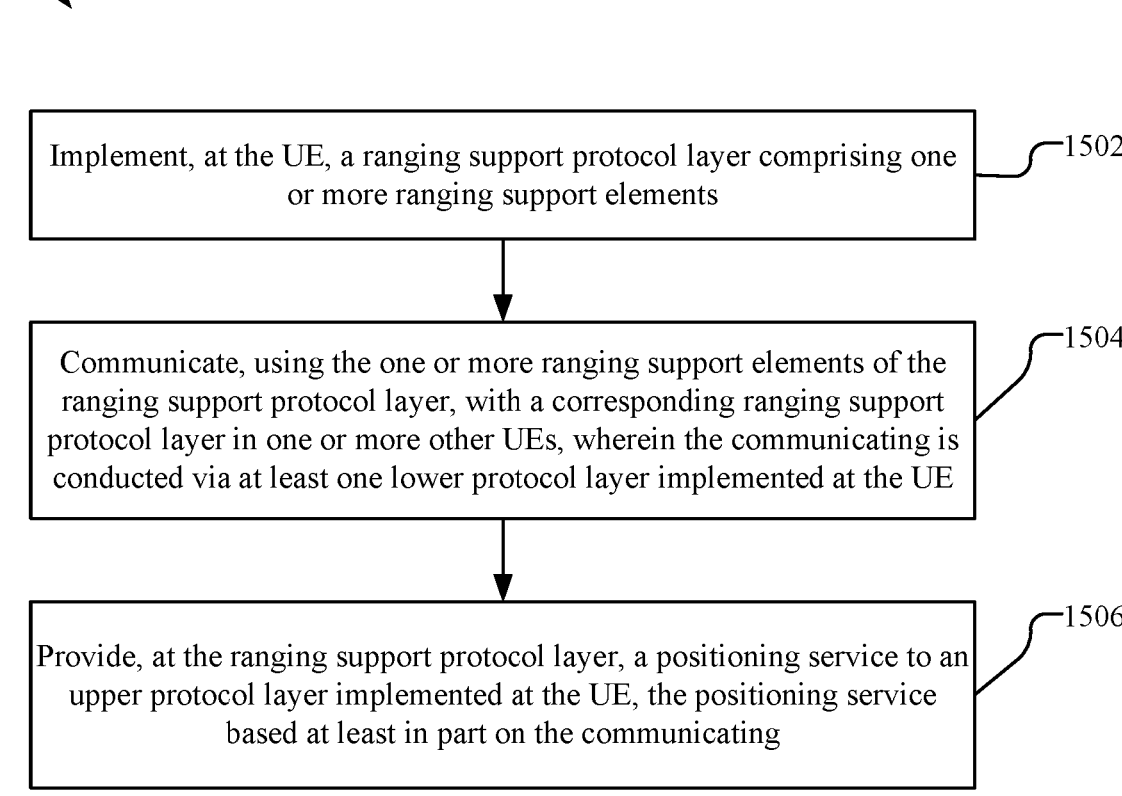

Implement, at the UE, a ranging support protocol layer comprising one or more ranging support elements —1502

Communicate, using the one or more ranging support elements of the ranging support protocol layer, with a corresponding ranging support protocol layer in one or more other UEs, wherein the communicating is conducted via at least one lower protocol layer implemented at the UE —1504

Provide, at the ranging support protocol layer, a positioning service to an upper protocol layer implemented at the UE, the positioning service based at least in part on the communicating —1506

FIG. 15

ARCHITECTURE AND PROTOCOL LAYERING FOR SIDELINK POSITIONING

RELATED APPLICATIONS

This application claims the benefit of U.S. Provisional Application No. 63/327,775, filed Apr. 5, 2022, entitled "ARCHITECTURE AND PROCEDURES FOR SIDE-LINK POSITIONING", which is assigned to the assignee hereof, and incorporated herein in its entirety by reference.

BACKGROUND

Field

The subject matter disclosed herein relates to wireless communications systems, and more particularly to systems, methods, and devices that support positioning.

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth-generation (4G) systems such as Long-Term Evolution (LTE) systems, LTE-Advanced (LTE-A) systems, or LTE-A Pro systems, and fifth-generation (5G) systems which may be referred to as New Radio (NR) systems.

In some examples, a wireless multiple-access communication system may include a number of base stations, each simultaneously supporting communication for multiple communication devices, otherwise known as user equipment (UEs). A base station may communicate with a set of UEs on downlink channels (e.g., for transmissions from a base station to a UE) and uplink channels (e.g., for transmissions from a UE to a base station). Additionally, UEs may communicate directly with each other using sidelink channels.

A location of UE may be useful or essential to a number of applications including emergency calls, navigation, direction finding, asset tracking and Internet service. In a cellular network, for example, a base station may send downlink reference signals with which positioning measurements are obtained by a UE and/or the UE may send uplink reference signals with which positioning measurements are obtained by the base stations. The UE may compute an estimate of its own location using the positioning measurements in UE-based positioning or may send the positioning measurements to a network entity, e.g., location server, which may compute the UE location based on the positioning measurements in UE-assisted positioning.

There are a number of other applications where the location of one UE or of multiple UEs may be needed and where traditional UE-based positioning and UE-assisted positioning may be less useful. Examples of such other applications include Vehicle-to-everything (V2X) communication and coordination, Public Safety first responder scenarios and control and coordination of automated environments like factories and warehouses. In these applications, it may be more effective for UEs to communicate using sidelink signaling and for UEs to be located using sidelink related positioning measurements and/or sidelink related control signaling. Consequently, support for sidelink based positioning may be desirable.

SUMMARY

Sidelink positioning of user equipments (UEs) is supported with a user equipment (UE) architecture configured to support functions including device and service discovery, group operation support, sidelink positioning and ranging-based service control, and interactions with an application layer. The architecture includes an upper layer, such as an application layer, and an underlying ranging support layer comprising one or more ranging support elements for supporting sidelink positioning and ranging with one or more other UEs. The ranging support elements include a device and service discovery function, a group support service function and a sidelink positioning and ranging protocol function. The ranging support elements provide services to the upper layer and communicate with corresponding ranging support elements in one or more other UEs through at least one lower layer of the architecture which may include a ProSe layer, a V2X layer and/or an AS layer.

An example method for supporting sidelink (SL) positioning, according to this disclosure, may comprise implementing, at the UE, a ranging support protocol layer comprising one or more ranging support elements. The method also may comprise communicating, using the one or more ranging support elements of the ranging support protocol layer, with a corresponding ranging support protocol layer in one or more other UEs, wherein the communicating is conducted via at least one lower protocol layer implemented at the UE. The method also may comprise providing, at the ranging support protocol layer, a positioning service to an upper protocol layer implemented at the UE, the positioning service based at least in part on the communicating.

An example user equipment (UE) comprising: a transceiver, a memory, one or more processors communicatively coupled with the transceiver and the memory, wherein the one or more processors are configured to implement a ranging support protocol layer comprising one or more ranging support elements. The one or more processors further may be configured to communicate, via the transceiver using the one or more ranging support elements of the ranging support protocol layer, with a corresponding ranging support protocol layer in one or more other UEs, wherein the communicating is conducted via at least one lower protocol layer implemented at the UE. The one or more processors further may be configured to provide, at the ranging support protocol layer, a positioning service to an upper protocol layer implemented at the UE, the positioning service based at least in part on the communicating.

An example apparatus for supporting sidelink (SL) positioning, according to this disclosure, may comprise means for implementing a ranging support protocol layer comprising one or more ranging support elements. The apparatus further may comprise means for communicating, using the one or more ranging support elements of the ranging support protocol layer, with a corresponding ranging support protocol layer in one or more other UEs, wherein the communicating is conducted via at least one lower protocol layer implemented at the UE. The apparatus further may comprise means for providing, at the ranging support protocol layer, a positioning service to an upper protocol layer implemented at the UE, the positioning service based at least in part on the communicating.

According to this disclosure, an example non-transitory computer-readable medium stores instructions for supporting sidelink (SL) positioning, the instructions comprising code for Implementing a ranging support protocol layer comprising one or more ranging support elements. The instructions further may comprise code for communicating, using the one or more ranging support elements of the ranging support protocol layer, with a corresponding ranging support protocol layer in one or more other UEs, wherein the communicating is conducted via at least one lower protocol layer implemented at the UE. The instructions further may comprise code for providing, at the ranging support protocol layer, a positioning service to an upper protocol layer implemented at the UE, the positioning service based at least in part on the communicating.

BRIEF DESCRIPTION OF THE DRAWINGS

FIG. 8 illustrates an environment that illustrates group formation of sidelink positioning groups of UEs.

FIG. 9 illustrates an example of a table of indications of reverse link communications between UEs for a sidelink positioning group.

FIG. 10 illustrates addition or transfer of a UE between sidelink positioning groups of UEs.

FIG. 14 shows a schematic block diagram illustrating certain exemplary features of a UE that is configured to support sidelink positioning, as discussed herein.

FIG. 15 shows a flowchart for an exemplary method performed by a UE for determining a group of UEs to perform sidelink positioning, in a manner consistent with disclosed implementation.

Figure 1:
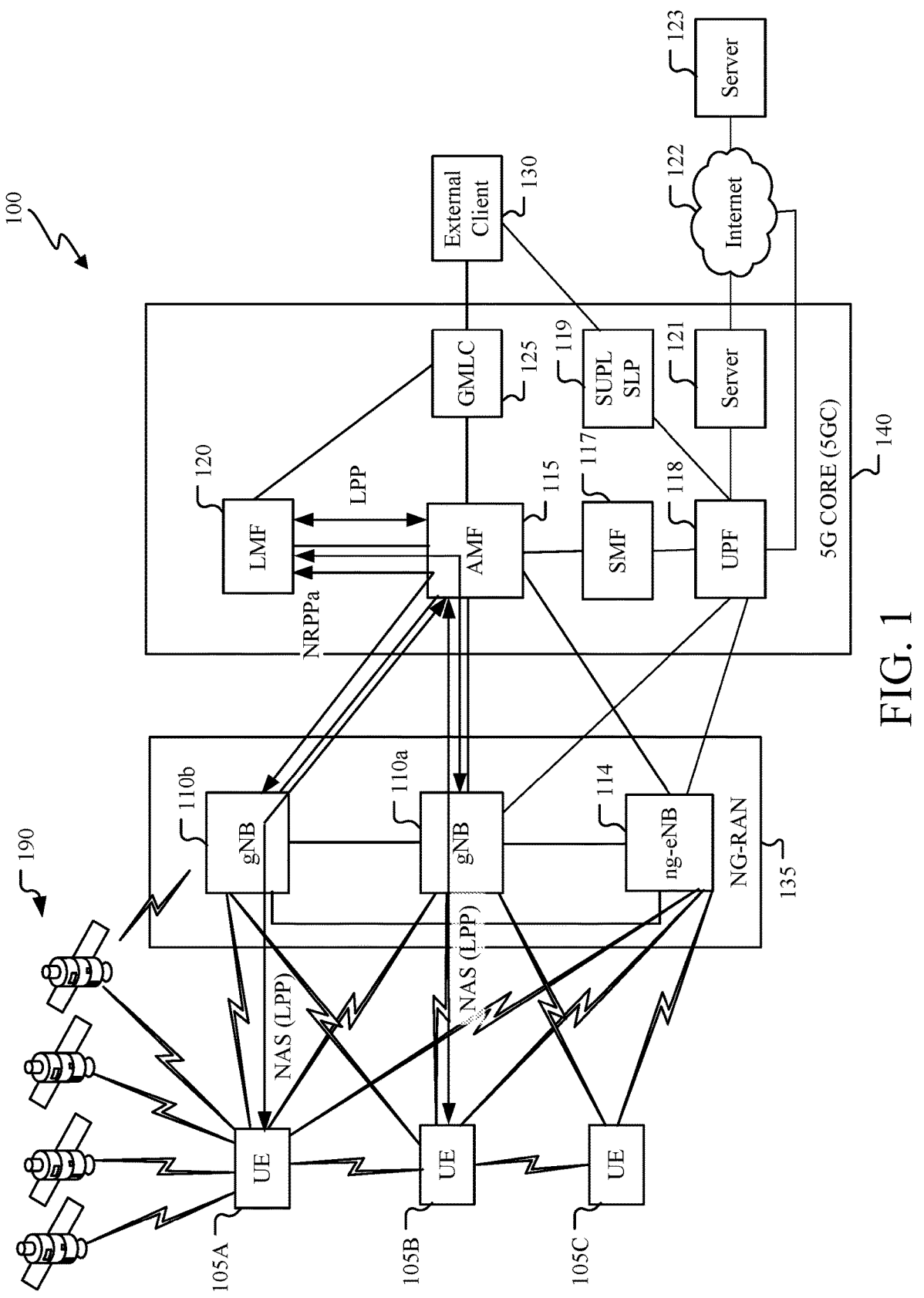
FIG. 1 shows an architecture of a communication system including a number of UEs, a Radio Access Network (RAN), and a 5G Core Network (5GC).

Elements are indicated by numeric labels in the figures with like numbered elements in different figures representing the same element or similar elements. Different instances of a common element are indicated by following a numeric label for the common element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Techniques and apparatus are discussed herein for supporting sidelink (SL) positioning between UEs. A Sidelink positioning protocol (SLPP) may be used for supporting sidelink positioning of UEs in pairwise positioning, group operation, as well as network supported sidelink positioning. A user equipment (UE) architecture is configured to support functions including device and service discovery, group operation support, sidelink positioning and ranging-based service control, and interactions with an application layer or application function (AF).

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, Industrial IoT (IIoT) device, In Vehicle System (IVS), etc.) used to communicate over a wireless communications network. A UE may be mobile or may (e.g., at certain times) be stationary, and may communicate with a Radio Access Network (RAN). For example, as used herein, a UE may be an infrastructure node, such as a roadside unit (RSU), Positioning Reference Unit (PRU), etc. As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," RSU, PRU, IVS, or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, Wi-Fi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a sidelink channel. As used herein the term traffic channel (TCH) can refer to either an uplink/reverse or downlink/forward or sidelink traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Standardization of cellular systems and positioning support for cellular systems, such as the Fifth Generation (5G) or New Radio (NR) network system, has been performed by the 3$^{rd}$ Generation Partnership Project (3GPP). By way of example, RAT-dependent positioning systems that have undergone standardization include Enhanced Cell ID (E-CID) (using Received Signal Strength (RSS) and Round-Trip Time (RTT) and optionally using Angle of Arrival (AOA)), downlink (DL) positioning, such as Observed Time Difference of Arrival (OTDOA) and Downlink Time Difference of Arrival (DL-TDOA), uplink (UL) positioning, such as Uplink Time Difference of Arrival (UL-TDOA) and uplink Angle of Arrival (UL-AOA). RAT-independent positioning systems that have undergone standardization include assisted Global Navigation Satellite System (A-GNSS), and other technologies such as Wireless Local Area Network (WLAN), Bluetooth®, Terrestrial Beason System (TBS), and sensor-based positioning including barometric sensor and motion sensor. Additionally, Hybrid positioning has undergone standardization, which includes the use of multiple methods for positioning, e.g., A-GNSS+DL-TDOA hybrid positioning.

Standardization of sidelink (SL) positioning has also started in 3GPP. Standardization of SL positioning will require new solutions to define various aspects. For example, standardization of SL positioning may require defining a new sidelink (SL) positioning protocol (SLPP) to be used between UEs and between an RSU and UEs. Note that SLPP messages are also referred to herein as SL positioning messages. Additionally, it may be necessary to define support by location servers, e.g., by a location management function (LMF) and a Secure User Plane Location (SUPL) Location Platform (SLP). Standardization of SL positioning may further require defining a means to optimize SL group formation and modification, e.g., for V2X (e.g., comprising V2P (Vehicle-to-Pedestrian), V2I (Vehicle-to-Infrastructure) and V2V (Vehicle-to-Vehicle), etc.) to ensure that vehicles in an SL group are generally close to one another and possibly travelling in the same direction. Additionally, standardization of SL positioning may further require defining suitable procedures and message types for SLPP that will allow the addition of new position methods and new access types later and support by a network. There are currently no solutions for any of the above.

FIG. 1 shows an example of a communication system 100 that includes a first UE 105A, a second UE 105B, a third UE 105C, a Radio Access Network (RAN) 135, here a Fifth Generation (5G) Next Generation (NG) RAN (NG-RAN), and a 5G Core Network (5GC) 140. The 5GC 140, for example, may be a public land mobile network (PLMN). The UEs 105A, 105B and 105C may be sometimes referred to herein as UE 105 individually or UEs 105 collectively. The UE 105 may be, e.g., an IoT device, a location tracker device, a cellular telephone, a vehicle, an On-Board Unit (OBU), or other similar type of device. The UE 105 may additionally be considered an RSU or PRU. A 5G network may also be referred to as a New Radio (NR) network; NG-RAN 135 may be referred to as a 5G RAN or as an NR RAN; and 5GC 140 may be referred to as an NG Core network (NGC). The RAN 135 may be another type of RAN, e.g., a 3G RAN, a 4G Long Term Evolution (LTE) RAN, etc. The communication system 100 may utilize a constellation of satellite vehicles (SVs) 190 which may support a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). In some embodiments, a UE 105 may communicate via an SV 190 and an Earth station (not shown in FIG. 1) with a RAN node (e.g. a gNB 110) or a 5GC 140 node, in which case the UE 105 may not communicate directly with a RAN node but only via the SV 190. This may be used to increase the coverage and/or the capacity of the NG-RAN 135. Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125, a User Plane Function (UPF) 118, and a Secure User Plane Location (SUPL) Location Platform (SLP) 119. The gNBs 110a, 110b and the ng-eNB 114 are communicatively coupled to each other, are each configured to communicate bi-directionally with the UEs 105, and are each communicatively coupled to, and configured to bi-directionally communicate with, the AMF 115 and the UPF 118. The gNBs 110a, 110b, and the ng-eNB 114 may be referred to as base stations (BSs) or RAN nodes. The AMF 115, the SMF 117, the LMF 120, and the GMLC 125 are communicatively coupled to each other, and the GMLC 125 is communicatively coupled to an external client 130. The AMF 115, the SMF 117, the UPF 118, and the SLP 119 are communicatively coupled to each other, and the SLP 119 is communicatively coupled to the external client 130. Server 121, the Internet 122, and server 123 may be communicatively coupled with the UPF 118 and may facilitate SL positioning, according to some embodiments. The SMF 117 may further serve as an initial contact point of a Service Control Function (SCF) (not shown) to create, control, and delete media sessions. The base stations 110a, 110b, 114 may be a macro cell (e.g., a high-power cellular base station), or a small cell (e.g., a low-power cellular base station), or an access point (e.g., a short-range base station configured to communicate with short-range technology such as WI-FI, WI-FI DIRECT (Wi-Fi D), BLUETOOTH, Bluetooth-Low Energy (BLE), ZIGBEE, etc. One or more of the base stations 110a, 110b, 114 may be configured to communicate with the UEs 105 via multiple carriers. Each of the base stations 110a, 110b, 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted, as necessary. Specifically, although only UEs 105 are illustrated, many UEs (e.g., hundreds, thousands, millions, etc.) may be utilized in the communication system 100. Similarly, the communication system 100 may include a larger (or smaller) number of SVs (i.e., more or fewer than the four SVs 190 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UEs 105) or at base stations 110a, 110b, 114 and/or provide location assistance to the UEs 105 (via the LMF 120 or SLP 119 or other location server) and/or compute a location for one or both of the UEs 105 at a location-capable device such as the UEs 105, the base stations 110a, 110b, the LMF 120, or SLP 119 based on measurement quantities received at the UEs 105 or the base stations 110a, 110b, 114 for such directionally-transmitted signals. The GMLC 125, the LMF 120, the AMF 115, the SMF 117, the UPF 118, the SLP 119, the ng-eNB (eNodeB) 114 and the gNBs (gNodeBs) 110a, 110b are examples and may, in various embodiments, be replaced by or include various other entities, including location server functionality and/or base station functionality.

The communication system 100 is capable of wireless communication in that components of the system 100 can communicate with one another (at least sometimes using wireless connections) directly or indirectly, e.g., via the base stations 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UEs 105 may include multiple UEs and may be a mobile wireless communication device but may communicate wirelessly and via wired connections. The UEs 105 may be any of a variety of devices, e.g., a smartphone, a tablet computer, a vehicle-based device, etc., but these are examples only as the UEs 105 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UEs 105, the base stations 110a, 110b, 114, the core network 140, and/or the external client 130. For example, such other devices may include IoT or IIoT devices, medical devices, home entertainment and/or automation devices, etc. The core network 140 may communicate with the external client 130, the server 123 or the server 121 (e.g., which may each be a computer system), e.g., to allow the external client 130, the server 123 or the server 121 to request and/or receive location information regarding the UEs 105 (e.g., via the GMLC 125, SLP 119 or UPF 118).

The UEs 105 or other devices may be configured to communicate in various networks and/or for various purposes and/or using various technologies (e.g., 5G, Wi-Fi communication, multiple frequencies of Wi-Fi communication, satellite positioning, satellite communication, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or Wi-Fi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105 may communicate with each other through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), Synchronization Signal Block (SSB), sidelink channel state information reference signal (SL-CSIRS), physical sidelink feedback channel (PSFCH), or sidelink sounding reference signals (SL-SRS).

The UEs 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UEs 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UEs 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 Wi-Fi (also referred to as Wi-Fi), Bluetooth (BT), Worldwide Interoperability for Microwave Access (WiMAX), 5G new radio (NR) (e.g., using the NG-RAN 135 and the 5GC 140), etc. The UEs 105 may support wireless communication using a Wireless Local Area Network (WLAN) which may connect to other networks (e.g., the Internet) using a Digital Subscriber Line (DSL) or packet cable, for example. The use of one or more of these RATs may allow the UEs 105 to communicate with the external client 130, the server 121 and/or the server 123 (e.g., via elements of the 5GC 140 and possibly the Internet 122) and/or allow the external client 130, the server 121 and/or the server 123 to receive location related information regarding the UEs 105 (e.g., via the GMLC 125, SLP 119 or UPF 118).

Each of the UEs 105 may include a single entity or may include multiple entities such as in a personal area network where a user may employ audio, video and/or data I/O (input/output) devices and/or body sensors and a separate wireline or wireless modem. An estimate of a location of a UE, e.g., UE 105, may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geodetically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geodetically, in civic terms, or by reference to a point, area, or volume, e.g., indicated on a map, floor plan, or building plan. In the description contained herein, the use of the term location may comprise any of these variants unless indicated otherwise.

When sidelink positioning is used, an absolute (e.g. global) or relative location of a UE may not always be obtained. Instead, location results may be obtained for a UE which may include a range or distance between the UE and each of one or more other UEs, a direction from the UE to each of one or more other UEs, a location of the UE relative to the location of some other UE, a location of one or more other UEs relative to the location of the UE, a velocity of the UE, and/or a velocity of each of one or more other UEs. A velocity of a UE may be absolute (e.g. relative to the Earth) or may be relative to some other UE, and may then be referred to as a "relative velocity". A relative velocity of a UE B relative to another UE A may include a "radial velocity" component, which may be equal to a rate of change of a range from the UE A to the UE B, and a "transverse velocity" component which may be at right angles to the radial velocity component as seen by the UE A and may be equal to a rate of angular change of a direction to the UE B from the UE A multiplied by the range from the UE A to the UE B. In the description contained herein, the use of the term "location result" or "location results" for sidelink positioning of a UE or a group of UEs may comprise any of these variants unless indicated otherwise.

The UEs 105 may be configured to communicate with other entities using one or more of a variety of technologies. The UEs 105 may be configured to communicate with one or more other UEs (e.g. other UEs 105) via one or more device-to-device (D2D) peer-to-peer (P2P) links. The D2D P2P links may be an example of (or may be supported by) sidelink signaling and be supported with any appropriate D2D radio access technology (RAT), such as LTE Direct (LTE-D), Wi-Fi Direct (Wi-Fi D), Bluetooth, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UEs 105 via wireless communication between the UEs and one or more of the gNBs 110a, 110b, which may provide wireless communications access to the 5GC 140 on behalf of the UE using 5G. In FIG. 1, the serving gNB for the UE 105A is assumed to be the gNB 110b, while the serving gNB for the UE 105B is assumed to be the gNB 110a, although another gNB may act as a serving gNB if the UEs 105 move to another location or may act as a secondary gNB to provide additional throughput and bandwidth to the UEs 105 and the UEs 105 may share the same serving gNB.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UEs 105. One or more of the gNBs 110a, 110b and/or the ng-eNB 114 may be configured to function as positioning-only beacons which may transmit signals to assist with determining the position of the UEs 105 but may not receive signals from the UEs 105 or from other UEs.

The base stations 110a, 110b, 114 may transmit one or more downlink reference signals, including a positioning reference signal (PRS) transmission. The PRS transmission may be configured for a specific UEs 105 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105 (such as global positioning system (GPS) technology).

A base station 110a, 110b, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110a, 110b, 114. The structure of the one or more PRS resources, PRS resource sets, and PRS resource settings within a PRS transmission may be referred to as a multi-level resource setting. For example, multi-level PRS resource setting of the base station 110a, 110b, 114 may include multiple PRS resource sets and each PRS resource set may contain a set of PRS resources (such as a set of 4 PRS resources).

The UEs 105 may receive the PRS transmission over the one or more PRS resources of the slot. The UEs 105 may determine a report parameter for at least some PRS resources included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Similarly, the UEs 105 may be configured to transmit one or more additional uplink reference signals that may be received by base stations 110a, 110b, 114 and used for positioning. For example, UEs 105 may transmit sounding reference signal (SRS) for positioning. Base stations 110a, 110b, 114 that receive uplink reference signals from a UEs 105 may perform positioning measurements, such as one or more of a time of arrival (TOA), reception to transmission difference (UE Rx-Tx).

A position estimation of the UE may be determined using reference signals, such as PRS signals or SRS for positioning signals, or other reference signals, from one or more base stations 110a, 110b, 114 or the UE. Positioning methods, such as downlink (DL) Time Difference of Arrival (DL-TDOA), DL Angle of Departure (DL AOD), Enhanced Cell ID (ECID) are position methods that may be used to estimate the position of the UE using reference signals from base stations. DL-TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS).

Other positioning methods may use reference signals transmitted by the UE including uplink based positioning methods and downlink and uplink based positioning methods. For example, uplink based positioning methods include, e.g., UL Time Difference of Arrival (UL-TDOA), UL Angle of Arrival (UL AOA), UL Relative Time of Arrival (UL-RTOA) and downlink and uplink based positioning methods, e.g., multi cell Round-trip time (RTT) with one or more neighboring base stations. Additionally, sidelink based positioning may be used in which UEs transmit and/or receive sidelink positioning reference signals that are measured and used for positioning.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UEs 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UEs 105, including cell change and handover and may participate in supporting a signaling connection to the UEs 105 and possibly data and voice bearers for the UEs 105. The LMF 120 may communicate directly or indirectly with the UEs 105, e.g., through wireless communications, or directly or indirectly with the base stations 110a, 110b, 114. The LMF 120 may support positioning of the UEs 105 when the UEs 105 access the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematic (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UEs 105, e.g., received from the AMF 115 or from the GMLC 125. The LMF 120 may be connected to the AMF 115 and/or to the GMLC 125. A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE) may be performed at the UE (e.g., using signal measurements obtained by the UE for signals transmitted by wireless nodes such as the gNBs 110a, 110b and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110a, 110b and/or the ng-eNB 114. The AMF 115 may serve as a control node that processes signaling between the UEs 105 and the core network 140, and provides QoS (Quality of Service) flow and session management. The AMF 115 may support mobility of the UEs 105 including cell change and handover and may participate in supporting signaling connection to the UEs 105.

The GMLC 125 may support a location request for the UEs 105 received from the external client 130 and may forward such a location request to the AMF 115 for forwarding by the AMF 115 to the LMF 120 or may forward the location request directly to the LMF 120. A location response from the LMF 120 (e.g., containing a location estimate or sidelink location results for the UEs 105) may be returned to the GMLC 125 either directly or via the AMF 115 and the GMLC 125 may then return the location response (e.g., containing the location estimate or sidelink location results) to the external client 130. The GMLC 125 is shown connected to both the AMF 115 and LMF 120, though only one of these connections may be supported by the 5GC 140 in some implementations.

A User Plane Function (UPF) 118 may support voice and data bearers for UE 105 and may enable UE 105 voice and data access to other networks such as the Internet 122 and to servers such as server 121 and server 123. The UPF 118 may be connected to gNBs 110 and ng-eNB 114. UPF 118 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 118 may be connected to the SLP 119 to enable support of positioning of UE 105 using SUPL. SLP 119 may be further connected to or accessible from external client 130.

As illustrated, a Session Management Function (SMF) 117 connects to the AMF 115 and the UPF 118. The SMF 117 may have the capability to control both a local and a central UPF within a PDU session. SMF 117 may manage the establishment, modification, and release of PDU sessions for UE 105, perform IP address allocation and management for UE 105, act as a Dynamic Host Configuration Protocol (DHCP) server for UE 105, and select and control a UPF 118 on behalf of UE 105.

As further illustrated in FIG. 1, the LMF 120 may communicate with the gNBs 110a, 110b and/or the ng-eNB 114 using a New Radio Position Protocol A (NRPPa), which may be defined in 3GPP Technical Specification (TS) 38.455. NRPPa messages may be transferred between the gNB 110a (or the gNB 110b) and the LMF 120, and/or between the ng-eNB 114 and the LMF 120, via the AMF 115. As further illustrated in FIG. 1, the LMF 120 and the UEs 105 may communicate using an LTE Positioning Protocol (LPP), which may be defined in 3GPP TS 37.355. Here, LPP messages may be transferred between the UEs 105 and the LMF 120 via the AMF 115 and the serving gNB 110a, 110b or the serving ng-eNB 114 for the UEs 105. For example, LPP messages may be transferred between the LMF 120 and the AMF 115 using service operations based on the Hypertext Transfer Protocol (HTTP) and may be transferred between the AMF 115 and the UEs 105 using a 5G Non-Access Stratum (NAS) protocol.

The LPP protocol may be used to support positioning of the UEs 105 using UE-assisted and/or UE-based position methods such as A-GNSS, RTK, TDOA, AOA, AOD, and/or E-CID. The NRPPa protocol may be used to support positioning of the UEs 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional Synchronization Signal (SS) transmissions from the gNBs 110a, 110b, and/or the ng-eNB 114. The LMF 120 is illustrated in FIG. 1 as being located in the core network 140, but may be external to the core network 140, e.g., in an NG-RAN. For example, the LMF 120 may be co-located or integrated with a gNB, or may be disposed remote from the gNB and configured to communicate directly or indirectly with the gNB.

With a UE-assisted position method, the UE, e.g., UE 105A or UE 105B may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE, e.g., UE 105A or UE 105B, may obtain location measurements (e.g., which may be the same as or similar to location measurements for a UE-assisted position method) and may compute a location of the UE (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114), may obtain location measurements (e.g., measurements of RSSI, RTT, RSRP, RSRQ, AOA, AOD, or Time of Arrival (ToA) for signals transmitted by the UE, e.g., UE 105A or UE 105B) and/or may receive measurements obtained by the UE. The one or more base stations or APs may send the measurements to a location server (e.g., the LMF 120) for computation of a location estimate for the UE.

As noted, while the communication system 100 is described in relation to 5G technology, the communication system 100 may be implemented to support other communication technologies, such as GSM, WCDMA, LTE, etc., that are used for supporting and interacting with mobile devices such as the UEs 105 (e.g., to implement voice, data, positioning, and other functionalities). For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125.

Positioning for UEs in a radio network, such as communication system 100 shown in FIG. 1, typically uses Uu interfaces, i.e., a radio interface between a UE 105 and the radio access network, for DL PRS and/or UL PRS. Positioning for UEs may also or instead use sidelink PRS (SL-PRS), which may be a specific sidelink defined reference signal for positioning or may reuse Uu PRS, e.g., UL PRS, sometimes referred to as Sounding Reference Signal for positioning (SRSPos), or other reference signals may be transmitted in the sidelink channel. Sidelink positioning may enhance UE positioning by providing additional transmission (or reception) nodes. A UE, such as UE 105B, with a known position may be used to support position determination of another target UE, such as UE 105A, where the UE 105B is sometimes referred to as an anchor node.

With a sidelink positioning method, a UE 105A for example may transmit a sidelink PRS or sidelink SRS signal which is received and measured by another UE 105B. In addition or instead, the UE 105B for example may transmit a sidelink PRS or sidelink SRS signal which is received and measured by the UE 105A. A sidelink PRS may be similar to a PRS (e.g. DL PRS) transmitted by a gNB 110, e.g. as described previously. A sidelink SRS may be similar to an SRS (e.g. uplink SRS) transmitted by a UE 105 for measurement by a gNB 110, e.g. as described previously. Measurements of SL PRS or SL SRS signals may include a reception to transmission time difference (Rx-Tx), time of arrival (TOA), reference signal receive power (RSRP), reference signal receive quality (RSRQ), angle of arrival (AOA) and reference signal time difference (RSTD). SL position methods may include SL round trip signal propagation time (RTT) (also referred to as ranging), SL AOA and SL AOD.

In some scenarios, a group of UEs (not shown in FIG. 1) may support SL positioning. In this case, one UE in the group may transmit an SL PRS or SL SRS signal which may be measured by some or all of the other UEs in the group. Some or all of the other UEs in the group may also each transmit an SL PRS or SL SRS signal (e.g. with each UE transmitting SL SRS or SL PRS at a different time or times than times at which other UEs in the group transmit SL PRS or SL SRS) which may be measured by some or all other UEs in the group different to the UE transmitting the UL PRS or ULS SRS. Measurements made by UEs applicable to transmission of SL PRS or SL SRS by a group of UEs may include Rx-Tx, TOA, RSTD, AOA, RSRP, RSRQ. Position methods supported by these measurements may include sidelink RTT (e.g. ranging), sidelink AOA, sidelink AOD, sidelink TDOA (SL-TDOA). Based on the measurements and the position methods(s), each UE may determine location results for itself and/or for one or more other UEs in the group. As described previously, the location results for a UE may include a range or distance between the UE and each of one or more other UEs in the group, a direction from the UE to each of one or more other UEs in the group, a direction to the UE from each of one or more other UEs in the group, a location of the UE relative to a location of some other UE in the group, a location of the UE relative to some other known location, an absolute location of the UE, a velocity of the UE or a velocity of the UE relative to some other UE.

Sidelink positioning may be used for positioning of UEs independently of a core network (e.g. 5GC 140) or a serving PLMN. One example implementation of sidelink positioning may be found in vehicular communication systems, such as V2X, which may be used for safety related applications, such as safety warnings, traffic congestion (e.g., automated traffic control), and coordinated or automated vehicle maneuvering. One aspect of sidelink positioning that may require a solution for standardization is a sidelink positioning protocol (SLPP) that can be used between UEs, including between an RSU and UEs, and location servers. The SLPP, for example, may support sidelink positioning between UEs, RSUs, and PRUs with network access independence. The SLPP may provide support for sidelink positioning for a pair of UEs (e.g., ranging), groups of UEs (V2X), and for UEs that are members of multiple different groups. By way of example, SLPP may provide support for various position techniques currently standardized for UE-based and UE-assisted support by a location server (e.g. LMF 120) such as PRS RTT, AOA, Differential AOA (DAOA), AOD, Differential AOD (DAOD), but may also enable the support of other PRS and SRS based position methods and non-PRS methods such as RTK at a later time. By enabling the addition of new capabilities and methods at a later time, the SLPP may avoid the need to define separate new positioning protocols different to SLPP. By way of example, additional position methods that may be included in SLPP at a later time may include RTK, Wi-Fi, Ultra-Wideband (UWB), BT positioning methods. The SLPP may enable direct sidelink operation initially (where UEs communicate and coordinate positioning by exchanging SLPP messages using sidelink signaling), and may be extended later to sidelink operation via relays and operation via a network, where UEs may exchange SLPP messages via a network or via intermediate relay UEs. For example, this might be used to coordinate positioning of two vehicles on a collision course at a corner where direct SL signaling between the two vehicles is not possible. Thus, SLPP may define support for SL PRS based positioning initially in a generic manner to simplify extension to support of other position methods later. For example, SLPP may define generic SLPP messages similar to generic LPP messages defined for LPP in 3GPP TS 37.355. SLPP may support separate position methods (e.g. SL PRS RTT, SL PRS AOA, SL PRS AOD) using common procedures and common parameters where feasible. SLPP may define procedures that can be reused for multiple position methods and are not limited to just one or a few position methods. SLPP may be enabled to be transferred and used by various entities, such as UEs, RSUs, PRUs, and location servers, such as LMFs and SUPL SLPs. The location server (e.g., LMF and SUPL SLP) usage may transfer SLPP messages inside LPP messages to enable UE-assisted positioning by an LMF or SUPL SLP. Alternatively, the location server (e.g., LMF and SUPL SLP) usage may transfer SLPP messages not in association with LPP messages to enable UE-assisted positioning by an LMF or SUPL SLP. SLPP may further support relative (local) and global positioning.

Figure 2:
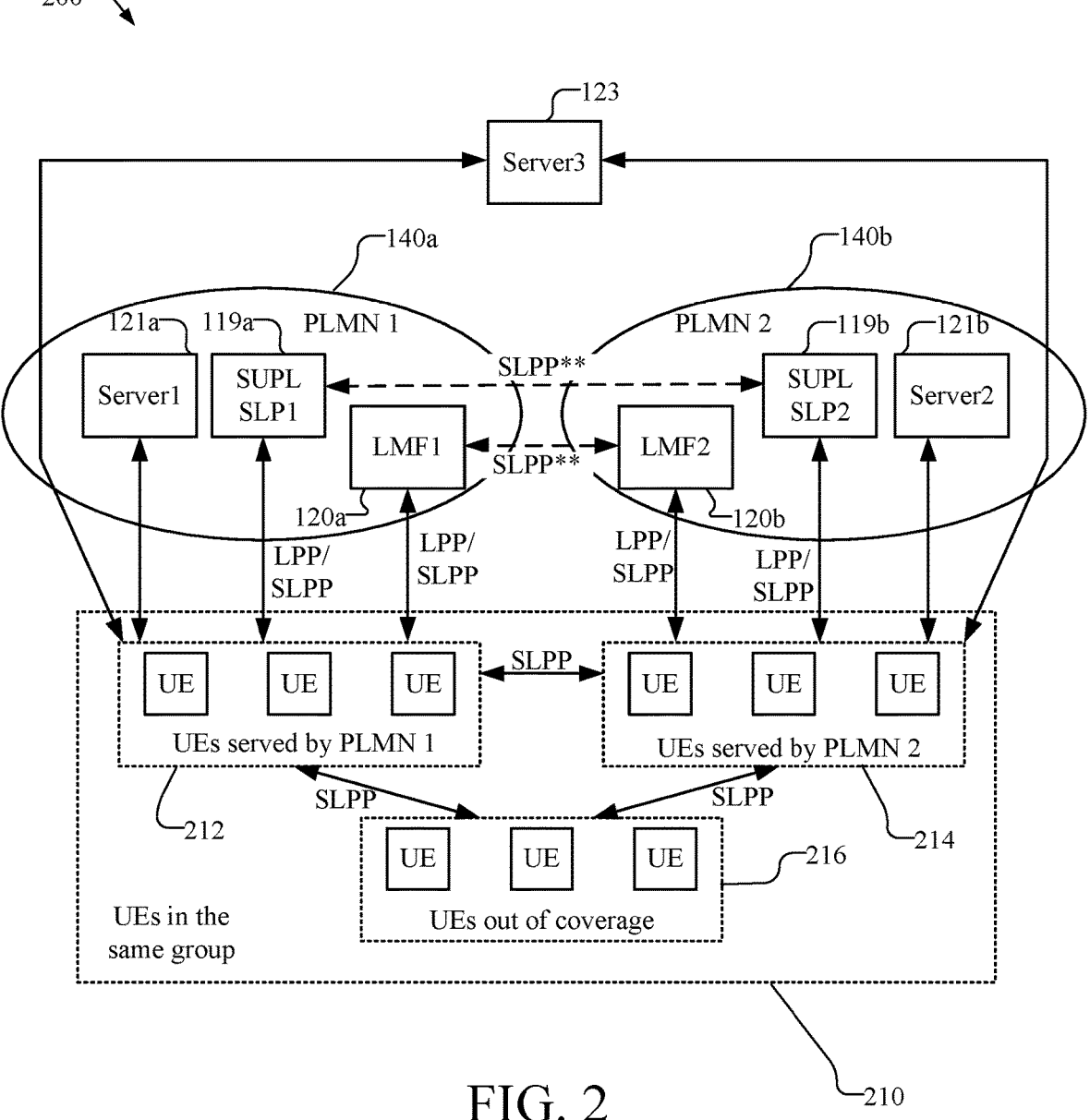
FIG. 2 shows an architecture of a communication system for network-supported sidelink positioning.

FIG. 2, by way of example, shows an architecture of a communication system 200 capable of network-supported sidelink positioning. As illustrated in FIG. 2, a number of UEs may be combined within a same group 210 for sidelink positioning. Within the group 210, various subgroups of UEs may be present. For example, the group 210 of UEs may include a first subgroup 212 of UEs that is served by a first network (PLMN1 140*a*), while a second subgroup 214 of UEs is served by a second (different) network (PLMN2 140*b*), and a third subgroup 216 of UEs is out of coverage of and is not served by either network. One or more of the UEs served by a network, e.g., the UEs in subgroup 212 served by PLMN1 140*a*, or the UEs in subgroup 214 served by PLMN2 140*b*, may include RSUs.

A location server in a serving network, e.g., LMF1 120*a*, SUPL SLP1 119*a*, or Server1 121*a* in the serving PLMN1 140*a*, LMF2 120*b*, SUPL SLP2 119*b*, or Server2 121*b* in the serving PLMN2 140*b*, and Server3 123 (communicating to UEs via PLMN1 140*a* and/or PLMN2 140*b*), may assist some or all UEs in a group that are served by the network (PLMN), e.g., subgroups 212 and 214, respectively. As illustrated, the location servers may support UEs by communicating with the UEs using "LPP/SLPP," which represents communicating using LPP, SLPP, embedding SLPP in LPP, or a combination thereof. For example, LMF1 120*a* and LMF2 120*b* may embed SLPP in LPP while supporting UEs in subgroups 212 and 214, respectively (e.g. where each SLPP message transferred between a UE and LMF1 120*a* or LMF2 120*b* is embedded in one LPP message and where one LPP message may include one or more than one embedded SLPP messages). Similarly, SUPL SLP1 119*a* and SUPL SLP2 119*b* may embed SLPP in LPP with LPP messages embedded in SUPL UserPlane Location Protocol (ULP) messages while supporting UEs in subgroups 212 and 214, respectively. Additionally or alternatively, LPP messages and/or SLPP messages may be used, where SLPP messages are not embedded in LPP messages (though LPP messages or SLPP messages may still be embedded in SUPL ULP messages). Additionally, the UEs within each subgroup, and UEs in different subgroups may exchange SLPP messages with one another to support and coordinate SL positioning.

The location server (e.g., LMF/SUPL SLP/Server1/ Server2/Server3) support for a particular UE or UEs may not be visible to other UEs in the group. For example, the location server support from the PLMN1 140*a* for UEs in subgroup 212 may not be visible to UEs in subgroup 214 and may not be visible to the out of coverage UEs in subgroup 216. The support provided by location servers to the UEs may include determination or verification of SL PRS configurations and calculation of location results for UEs, including for UEs that are supported and for UEs that are not supported (e.g. such as calculating location results for UEs within a supported subgroup and for UEs within an unsupported subgroup, e.g. if position information for the UEs in the unsupported subgroup is provided to the location server). In some implementations, signaling between location servers in separate networks may be used to provide more complete network support. As illustrated, LMF-LMF or SUPL SLP-SUPL SLP signaling may use an extension of SLPP (referred to as SLPP in FIG. 2**) to enable more complete network support.

The SLPP message types may align with LPP message types to enable LPP messages to contain embedded SLPP messages and/or to enable SLPP procedures to align with LPP procedures which may reduce implementation and/or testing. FIG. 2 shows signaling (e.g. SLPP messages or SLPP messages embedded in LPP messages) between LMF1 120*a* and one or more of the UEs of subgroup 212 and signaling between LMF2 120*b* and one or more of the UEs of subgroup 214. FIG. 2 also shows SLPP messages, or LPP messages that contain embedded SLPP messages, and that are embedded in SUPL ULP messages that are exchanged between SUPL SLP1 119*a* and one or more of the UEs of subgroup 212 and between SUPL SLP2 119*b* and one or more of the UEs of subgroup 214. SLPP may include messages that are analogous to an LPP Request Capabilities message and an LPP Provide Capabilities message, which, for example, in SLPP may be called "Request Capabilities and Resources" and "Provide Capabilities and Resources". The Request/Provide Capabilities and Resources in SLPP may be restricted to NR SL PRS capabilities and resources initially, but may be extended later to capabilities and resources for LTE SL PRS, RTK, Wi-Fi, BT, etc.

In another example, SLPP may include a message that is analogous to an LPP Provide Assistance Data message, which, for example, in SLPP may be called a "Provide Positioning Signal Configuration" (or just a "Provide Assistance Data"). The Provide Positioning Signal Configuration in SLPP may include one or more of, e.g., the SL PRS Configuration to be transmitted by each UE and measured by other UEs, a start time and duration of the transmission, and conditions for termination of the transmission, and the types of SL PRS measurements requested, such as Rx-Tx, AOA, RSRP, RSRD, TOA, TDOA. In some implementations, the Provide Positioning Signal Configuration in SLPP may be extended to define other types of signals, such as RTK signals to be measured, Wi-Fi signal to be transmitted and measured etc. The Provide Positioning Signal Configuration in SLPP may include additional information, for example, to assist UEs in acquiring and measuring signals (e.g. SL PRS signals) and to determine times of transmission and measurement.

In another example, SLPP may include a message such as a "Confirm Positioning Signal Configuration" (or a "Provide Assistance Data Confirm"), which does not have an analogous LPP message. The Confirm Positioning Signal Configuration in SLPP, for example, may confirm whether a Provide Positioning Signal Configuration (or a Provide Assistance Data) is agreeable. If the Provide Positioning Signal Configuration is (partly) not agreeable, a different configuration may be provided as a Provide Positioning Signal Configuration. Because LPP does not have an analogous message, a new LPP message type may be added to carry the Confirm Positioning Signal Configuration SLPP message in the case that SLPP messages are embedded in LPP messages. However, such a new LPP message type may not be needed when SLPP messages are not embedded in LPP messages In another example, SLPP may include a message that is analogous to an LPP Provide Location Information message, which, for example, in SLPP may be called a "Provide Location Information" message. The Provide Location Information message in SLPP may include and provide SL PRS measurements obtained by a UE for SL PRS transmitted by one or more other UEs and/or may include and provide location results obtained for the UE and/or for other UEs. The Provide Location Information in SLPP may be extended to include and provide other measurements, such as measurements of RTK, Wi-Fi, BT etc.

As illustrated in FIG. 2, UEs within each subgroup and UEs in different subgroups may signal each other using SLPP (e.g. where a UE sends an SLPP message to one or more other UEs). Additionally, location servers (e.g., LMF, SUPL SLP, or Server1-3) may support UEs using SLPP (as discussed above). As previously noted, SLPP may be embedded in LPP or embedded in both LPP and SUPL, or may be sent without embedding in LPP according to some embodiments. Accordingly, a first UE may receive a first SLPP message from a second UE and may send the first SLPP message to a location server that supports the first UE. The first UE may receive a second SLPP message from the location server in response to the first SLPP message and may send the second SLPP message to the second UE.

Figure 3:
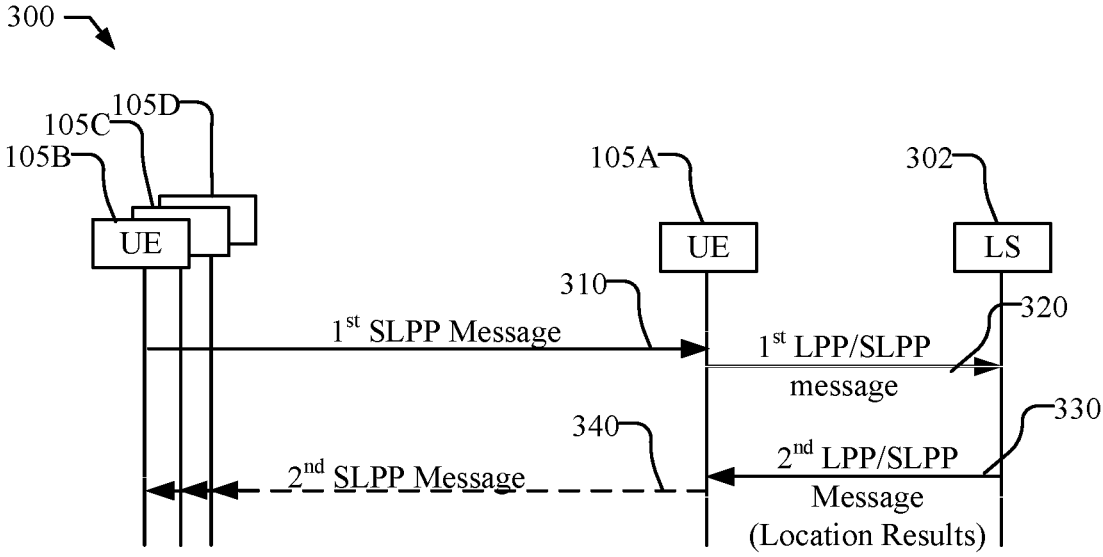
FIG. 3 is a signal flow illustrating signaling between UEs and a location server for network-supported sidelink positioning.

FIG. 3, by way of example, is a signal flow 300 illustrating the signaling between a UE 105A and UEs 105B, 105C, and 105D and a location server 302 for network supported sidelink positioning, as discussed herein. The UEs 105A, 105B, 105C, and 105D, may belong to the same group, and may be, e.g., the UEs 105 illustrated in FIG. 1 or any of the UEs illustrated within network supported subgroups 212 and 214 in FIG. 2. The location server 302 may be any of the LMF 120, SUPL SLP 119, Server 121, or Server 123 shown in FIG. 1 or the LMF1 120*a* or SUPL SLP1 119*a* shown in FIG. 2.

As shown in FIG. 3, at 310, the UE 105A receives a first sidelink positioning message from the UE 105B. The first sidelink positioning message, for example, may be an SLPP message, as discussed above, and may be any of the message types discussed above. The first sidelink positioning message may be sent based on SL multicasting (also referred to as SL groupcasting) if the group contains more than two UEs, e.g., as illustrated in FIG. 3, or may be sent based on SL unicasting. With SL multicasting (also referred to as SL groupcasting), a sidelink positioning message (e.g. an SLPP message) may be transmitted containing a group destination address (e.g. which may be partly or completely included in a layer 1 protocol header and/or in a layer 2 protocol header in the sidelink positioning message). A recipient UE (e.g. UE 105A) that belongs to a group which has this group destination address then recognizes the group destination address in the sidelink positioning message and receives, decodes and processes the sidelink positioning message. With SL unicasting, the sidelink positioning message may be transmitted containing a UE destination address (e.g. a layer 2 address assigned to UE 105A) and is received, decoded and processed only by the UE (e.g. UE 105A) whose destination address is included.

In 320, the UE 105A sends a first LPP/SLPP message (e.g., a first SLPP message or the first SLPP message embedded in an LPP message, as previously noted) to the location server 302, where the first SLPP message is based on or comprises the first sidelink positioning message.

In 330, the UE 105A receives a second LPP/SLPP message from the location server 302 in response to the first LPP/SLPP message from 320. The second LPP/SLPP message may be a second SLPP message or the second SLPP message embedded in an LPP message, as discussed above, and may be any of the message types discussed above. The second LPP/SLPP message (e.g. the second SLPP message) may include location results for at least one UE in the group (e.g. UE 105A or UE 105B). For example, location results for at least one UE in the group may comprise at least one of a range between the at least one UE and another UE, a direction from the at least one UE to another UE, a location of the at least one UE relative to the location of another UE, a velocity of the at least one UE, a relative velocity of the at least one UE relative to the velocity of another UE, or some combination of these.

In 340, the UE 105A may send a second sidelink positioning message to one or more of the UEs 105B, 105C, and 105D in the group. The second sidelink positioning message may be an SLPP message and may be based on or may comprise the second SLPP message received at 330. The second sidelink positioning message may be sent based on SL multicasting if the group contains more than two UEs, e.g., as illustrated in FIG. 3.

The sidelink positioning messages in signal flow 300 may be any of the message types as discussed above. For example, the first sidelink positioning message at 310 and the first LPP/SLPP message at 320 may include sidelink positioning capabilities, sidelink positioning resources or both for at least one UE in the group, e.g., UE 105B. The first LPP/SLPP message at 320 may include an LPP Provide Capabilities message and/or an SLPP Provide Capabilities message (e.g. where the SLPP Provide Capabilities message may be embedded in the LPP Provide Capabilities message). The second LPP/SLPP message at 330 and the second sidelink positioning message at 340 may include sidelink positioning capabilities, sidelink positioning resources or both for the UE 105A. The second LPP/SLPP message at 330 may include an LPP Provide Capabilities message and/or an SLPP Provide Capabilities message.

In another example, the first sidelink positioning message at 310 and the first LPP/SLPP message at 320 may include an SL Positioning Reference Signal (PRS) configuration for at least one UE in the group, e.g., UE 105A and/or UE 105B. The first LPP/SLPP message at 320 may include an LPP Request Assistance Data message, an LPP Provide Assistance Data message, an SLPP Request Assistance Data message and/or an SLPP Provide Assistance Data message (e.g. where an SLPP message may be embedded in an LPP message of the same type). The second LPP/SLPP message at 330 and the second sidelink positioning message at 340 may include an SL Positioning Reference Signal (PRS) configuration for at least one UE in the group, e.g., UE 105A or UE 105B. The second LPP/SLPP message at 330 may include an LPP Provide Assistance Data message and/or an SLPP Provide Assistance Data message (e.g. where the SLPP Provide Assistance Data message may be embedded in the LPP Provide Assistance Data message).

In another example, the first sidelink positioning message at 310 and the first LPP/SLPP message at 320 may include sidelink positioning measurements obtained by at least one UE in the group, e.g., UE 105B. The first LPP/SLPP message at 320 may include an LPP Provide Location Information message and/or an SLPP Provide Location Information message (e.g. where the SLPP Provide Location Information message may be embedded in the LPP Provide Location Information message). The second LPP/SLPP message at 330 may include the location results for the at least one UE in the group, where the second LPP/SLPP message includes an LPP Provide Location Information message and/or an SLPP Provide Location Information message (e.g. where the SLPP Provide Location Information message may be embedded in the LPP Provide Location Information message).

The location server 302 may be an LMF or a SUPL SLP. If the location server 302 is a SUPL SLP, the first LPP/SLPP message is sent by the UE 105A to the location server 302 at 320 as part of a first SUPL message, and the second LPP/SLPP message is received by the UE 105A at 330 from the location server 302 as part of a second SUPL message. The first SUPL message and the second SUPL message may each include a SUPL POS message.

Figure 4A:
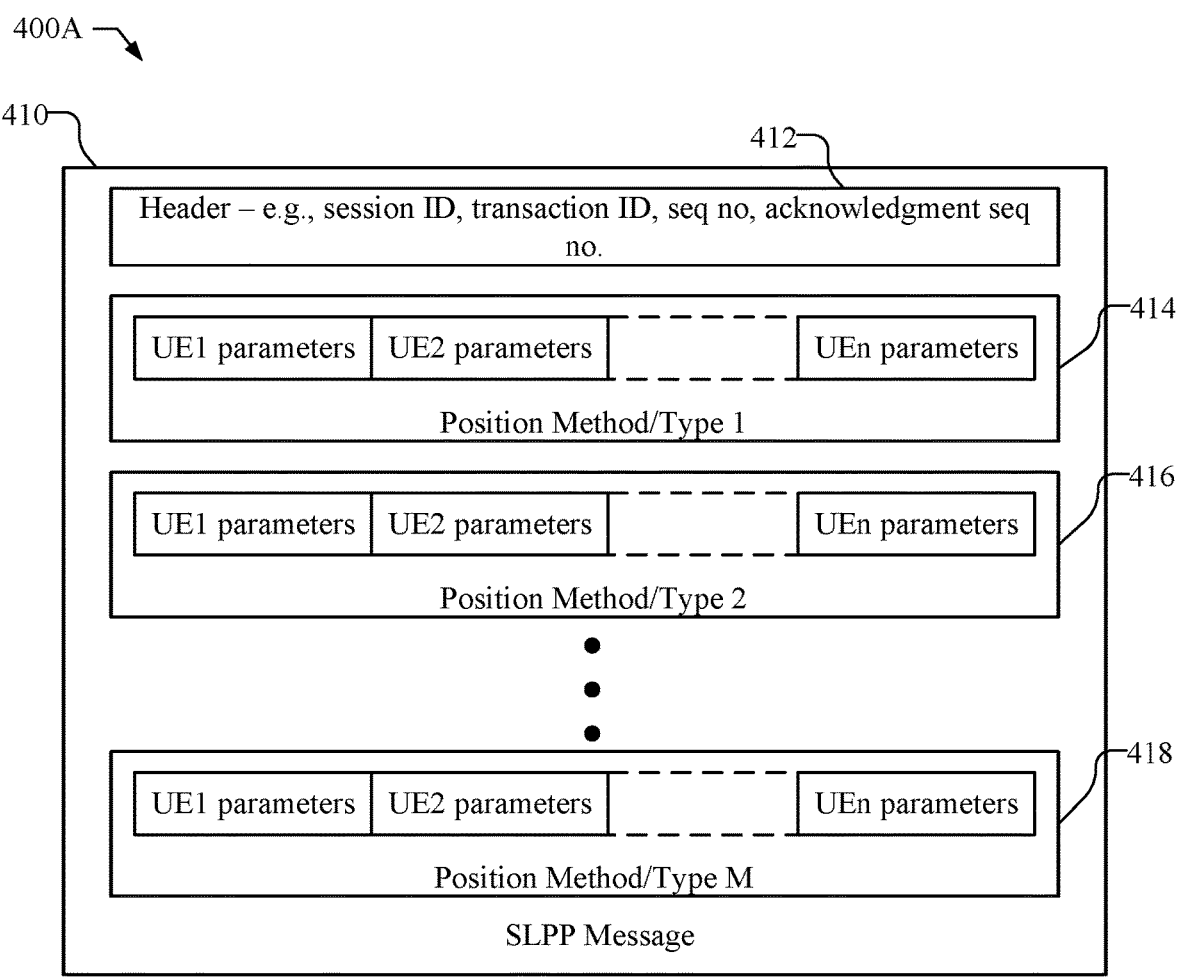
FIGS. 4A and 4B are block diagrams illustrating implementations of the structure of a sidelink positioning protocol (SLPP) message.

FIG. 4A, by way of example, is a block diagram 400A illustrating one implementation of the structure of an SLPP message 410. As illustrated, the SLPP message 410 includes a header 412, which may include a session ID, a transaction ID, a sequence number (seq no), an acknowledge (or acknowledgment) sequence number (acknowledgment seq no), etc. The SLPP message 410 allows for one or more position methods or position method types. For example, the SLPP message 410 includes, as entries, a position method/type 1 414, a position method/type 2 416, and a position method/type M 418 (e.g. where M could be equal to three or more). A position method, for example, may use a specific signal type or types (e.g., SL NR PRS, SL LTE PRS, Wi-Fi or GPS L1-L5) and supports one method of determining location for that specific signal type (e.g. one of RTT, AOA, RSRP or TDOA). A position method type, on the other hand, uses a specific signal type or types and supports multiple position methods for that signal type or types. For example, a position method type could use SL PRS signals (e.g. either SL NR PRS signals or both SL NR PRS and SL LTE PRS signals) and support multiple position methods that use these SL PRS signals (e.g. could support all of RTT, AOA, RSRP and TDOA). Another position method type could use GNSS signals and support multiple position methods that use GNSS signals (e.g. could support GNSS code phase based positioning and GNSS carrier phase based positioning such as RTK).

The SLPP message 410 may be configured to support position methods or position method types (also referred to as position types), or both position methods and position method types. As illustrated, each position method/type 414, 416, and 418 in the SLPP message 410 may include parameters for each UE in a group, which are illustrated as being identified by member IDs, e.g. UE1, UE2, . . . UEn. It is possible that not all UEs in a group support the same position methods/types, which could mean that parameters for a UE not supporting a position method/type 414, 416, or 418 might not be present for that position method/type in the SLPP message 410. Support for multiple position methods or position method types in the SLPP message 410 may be advantageous when UEs do not all support the same position methods or same position method types. e.g. where some UEs may support positioning using RTK and SL PRS, while some other UEs only support RTK. In some implementations, however, the SLPP message 410 may provide support for only one position method (e.g. NR SL PRS RTT) or one position method type (e.g., NR SL PRS).

Figure 4B:
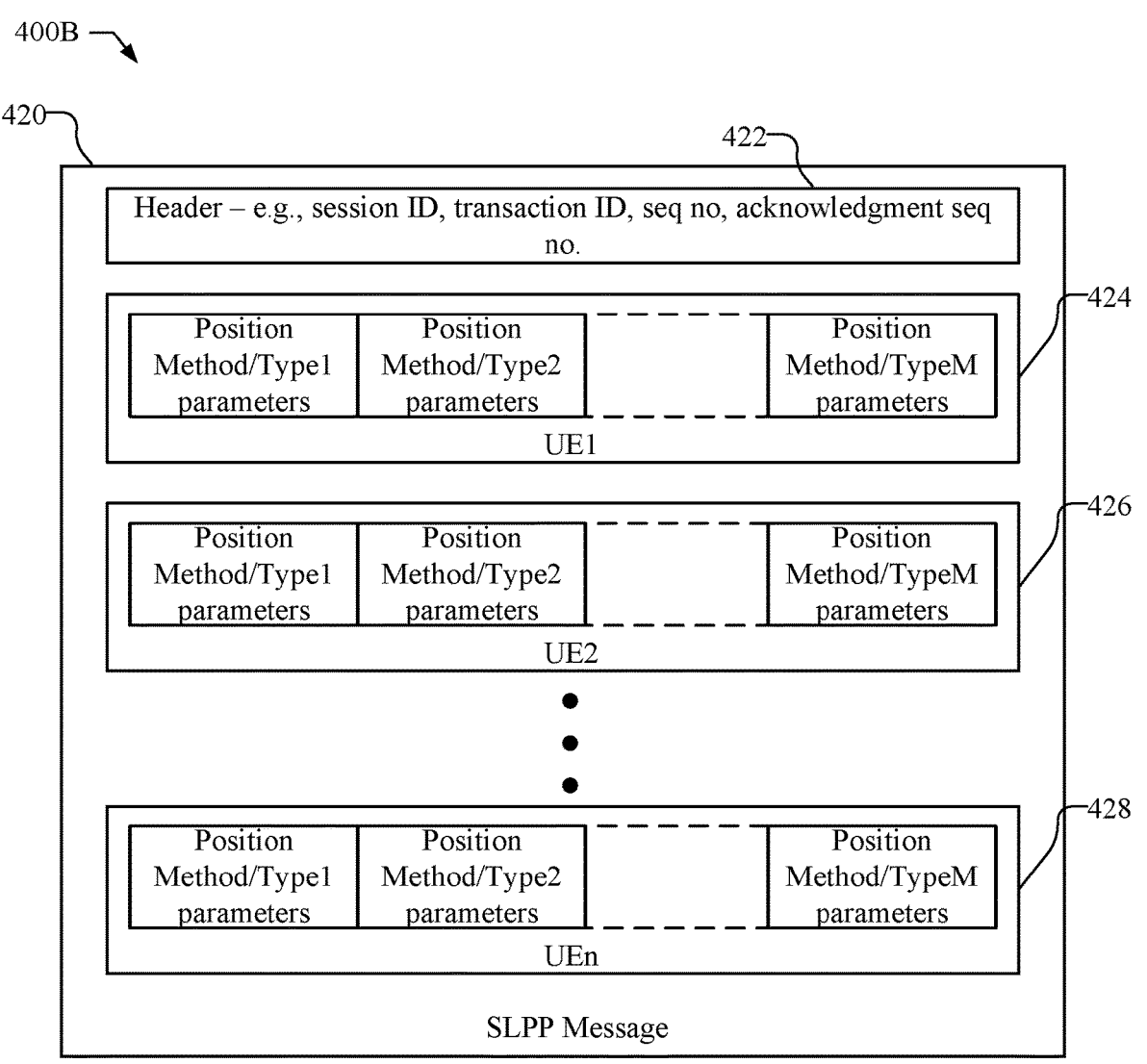

FIG. 4B is a block diagram 400B illustrating another implementation of the structure of an SLPP message 420. Similar to the block diagram 400A of FIG. 4A, the SLPP message 420 includes a header 422, which may include similar information to the header 412 in FIG. 4A. Here, however, data may be structured such that each UE in a group of n UEs has a separate message portion 424, 426, and 428 in the SLPP message 420 that each include parameters for that UE for each position method/type 1-M supported by that UE.

Figure 5:
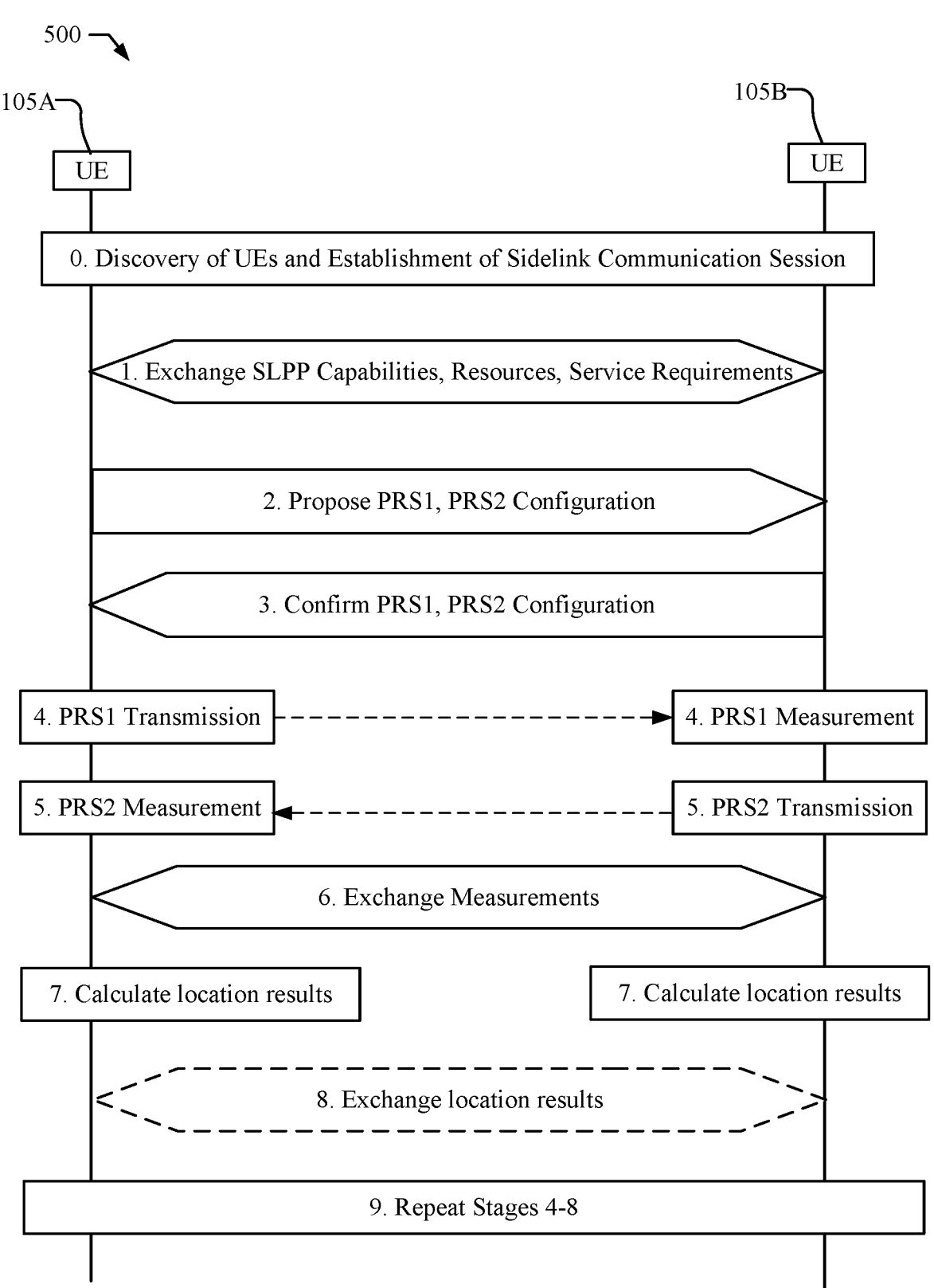
FIG. 5 is a signal flow illustrating the signaling between a pair of UEs for pairwise sidelink positioning.

FIG. 5 by way of example, is a signal flow 500 illustrating the signaling between UE 105A and UE 105B for pairwise sidelink positioning involving just two UEs. The UE 105A and UE 105B, for example, may be, e.g., the UEs illustrated in FIG. 1 or any two of the UEs illustrated in group 210 shown in FIG. 2. The sidelink positioning illustrated in FIG. 5 can be independent of a network and thus, the UEs shown in FIG. 5 may be the out-of-coverage UEs in subgroup 216. The signaling performed in signal flow 500 may be similar to or the same as the SLPP signaling discussed above in reference to FIG. 2.

At stage 0 of FIG. 5, the discovery of UEs and establishment of a sidelink communication session or sidelink positioning session is performed. The discovery process may be request-response or announcement based. The discovery phase, for example, may be implemented by one or both of UEs 105A and 105B to detect other UEs that are available for sidelink positioning. For example, discovery messages may be exchanged between UE 105A and/or UE 105B to determine nearby UEs that are available to participate in sidelink positioning. For example, UE 105A may broadcast a discovery based message using sidelink signaling which UE 105B may receive and respond to by transmitting a similar discovery based response message back to UE 105A using sidelink signaling. Additional messages may be exchanged between UE 105A and UE 105B to establish a sidelink communication or positioning session between UEs 105A and 105B. For example, UE 105A may send a request (e.g. an SLPP request) to UE 105B to start an SLPP positioning session and UE 105B may return a response (e.g. an SLPP response) to UE 105A agreeing to start the SLPP positioning session.

At stage 1, the UEs 105A and 105B may exchange SLPP capabilities, resources and service requirements, which may include Quality of Service (QoS), for example, using SLPP Request Capabilities and Resources and SLPP Provide Capabilities and Resources messages as discussed above. Exchanging SLPP capabilities, resources and service requirements may include both of UE 105A and UE 105B sending their capabilities, resources and service requirements to the other UE or just one of UE 105A or UE 105B sending its capabilities, resources and service requirements to the other UE. The capabilities that are exchanged may define what each of the UEs 105A and 105B is implemented to support. The resources that are exchanged may define what capabilities each of the UEs 105A and 105B is permitted to support, and/or what capabilities each of the UEs 105A and 105B is not permitted to support, or both. The sidelink positioning capabilities that a UE is permitted to support or not permitted to support may include permission or restrictions on one or more of a sidelink PRS transmission time, sidelink PRS measurement time, sidelink PRS transmission duration, sidelink PRS measurement duration, bandwidth of sidelink PRS that can be transmitted, bandwidth of sidelink PRS that can be measured, RF frequency of sidelink PRS that can be transmitted, RF frequency of sidelink PRS that can be measured, signal coding of sidelink PRS that can be transmitted, signal coding of sidelink PRS that can be measured, periodicity of sidelink PRS transmissions, periodicity of sidelink PRS that is measured, transmission power for sidelink PRS transmission, transmission power for sidelink PRS that is measured, or any combination thereof.

Sidelink positioning capabilities may be fixed and static (e.g. dependent on UE implementation which may never change or may be changed infrequently via a software upgrade to the UE). Sidelink positioning resources may depend on available spectrum for SL PRS (e.g. whether PLMN licensed spectrum, unlicensed spectrum or Intelligent Transportation System (ITS) spectrum for V2X is available and permitted to be used) and/or on pre-existing positioning sessions and/or positioning procedures that a UE may already be supporting or part of. The pre-existing positioning sessions and/or positioning procedures may mean that a UE is not able to transmit and/or measure SL PRS at certain times for a new SL positioning session because at these times the UE needs to be transmitting and/or measuring SL PRS for the pre-existing positioning sessions and/or positioning procedures. Similarly, certain SL PRS characteristics like frequency or coding that are already in use for the pre-existing positioning sessions may not be available to be used for the new SL (or SLPP) positioning session. For example, usage of certain SL PRS characteristics for a new positioning sessions that are already in use for the pre-existing positioning sessions might prevent SL PRS transmissions for the new positioning session or pre-existing positioning sessions from being uniquely identified by UEs involved in the new positioning session or pre-existing positioning sessions which could then cause errors in location measurements and location results. Controlling the usage of SL PRS characteristics for a new positioning session by exchanging sidelink positioning resources that are allowed and/or not allowed may prevent such errors from occurring.

The service requirements that are exchanged at stage 1 may include an indication of at least one of an immediate (e.g. single) location at a current time, a deferred location (e.g. at a later time), a periodic location, a triggered location, a type or types of location result (e.g. relative location, global location, range, direction), a QoS of location results (e.g. location result accuracy, location result response time or latency, location periodicity, location reliability), or some combination of these. The service requirements that are exchanged may define the type(s) of location (e.g., single or periodic), accuracy, latency, periodicity, reliability that each UE requires or expects in the sidelink positioning session.

At stage 2, the UE 105A may send to UE 105B a proposed sidelink positioning signal configuration, e.g., PRS1, PRS2 configuration, e.g., using an SLPP Provide Positioning Signal Configuration message or SLPP Provide Assistance Data message, as discussed above. The PRS1 configuration (in this example) may define SL PRS to be transmitted later by UE 105A, while the PRS2 configuration (in this example) may define SL PRS to be transmitted later by UE 105B, The PRS1 and PRS2 configurations, for example, may be defined and proposed by UE 105A based on the capabilities, resources and service requirements exchanged at stage 1 which may include QoS of UE 105A and 105B. The PRS1 and PRS2 configurations, for example, may be the same as or similar to PRS configurations defined in 3GPP TS 37.355 for LPP except that they may refer to SL PRS transmission on a sidelink communication channel between UEs 105A and 105B. For example, the PRS1 and PRS2 configurations may each include specifications of SL PRS transmission starting time, SL PRS transmission duration, SL PRS bandwidth, SL PRS RF frequency (or frequencies), SL PRS signal coding, SL PRS transmission periodicity, SL PRS transmission power, SL PRS muting and/or SL PRS frequency hopping. Rules and guidelines may be standardized to ensure that the proposed PRS configurations PRS1 and PRS2 are compatible with the capabilities, resources and service requirement of UEs 105A and 105B, which may include QoS of both UEs.

At stage 3, the UE 105B may send a message to the UE 105A to confirm the proposed positioning signal configuration, e.g., the PRS1, PRS2 configurations, e.g., using an SLPP Confirm Positioning Signal Configuration or SLPP Provide Assistance Data Confirm, as discussed above. In some implementations, the UE 105B may instead reject the proposed positioning signal configuration at stage 3 and UE 105A may then propose a different positioning signal configuration until the UE 105A confirms the positioning signal configuration. In some implementations, the UE 105B may send to the UE 105A a modified proposed positioning signal configuration and the UE 105A may confirm the modified positioning signal configuration or may send another modified proposed positioning signal configuration to UE 105B. In some implementations, stage 3 may be omitted when the PRS1, PRS2 configurations sent at stage 2 are acceptable to UE 105B, which may reduce signaling.

At stage 4, the UE 105A transmits SL positioning signals corresponding to the PRS1 configuration and the UE 105B measures these positioning signals (e.g. based on UE 105B already knowing the PRS1 configuration). The UE 105B, for example, may measure one or more of RTT, Rx-Tx, RSRP, RSRQ, AOA, AOD, TOA of the PRS1 transmitted by UE 105A.

At stage 5, the UE 105B transmits SL positioning signals corresponding to the PRS2 configuration and the UE 105A measures these positioning signals (e.g. based on UE 105A already knowing the PRS2 configuration). The UE 105A, for example, may measure one or more of RTT, Rx-Tx, RSRP, RSRQ, AOA, AOD, TOA of the PRS2 transmitted by UE 105B.

At stage 6, the UE 105A and UE 105B exchange measurements obtained at stage 4 and stage 5. The exchange of measurements, for example, may indicate an exact SL PRS configuration used at stage 4 or stage 5 for transmission of SL PRS if there was any difference to the PRS1 and/or PRS2 configuration (e.g. concerning an exact time or duration of SL PRS transmission) and may further provide the measurements generated at stage 4 or stage 5. As an example, if the SL positioning signals (SL PRS) transmitted by UE 105A at stage 4 corresponding to the PRS1 configuration sent by UE 105A at stage 2 do not exactly match the PRS1 configuration (e.g. because UE 105A slightly delayed the SL PRS transmission because some other UE was transmitting at the transmission time(s) indicated in the PRS1 configuration), then UE 105A may include as part of the measurements sent by UE 105A at stage 6, the transmission time(s) actually used by UE 105A at stage 4. The UE 105B may then use the correct transmission time(s) for UE 105A received at stage 6 later when calculating any location results (e.g. at stage 7). Exchanging measurements at stage 6 may include both of UE 105A and UE 105B sending their measurements to the other UE or just one of UE 105A or UE 105B sending its measurements to the other UE.

At stage 7, the UE 105A and UE 105B may each calculate location results, e.g., range and/or direction between UE 105A and 105B, relative locations, absolute locations, velocities, relative velocities, or any combination thereof, based on the measurements generated at stages 4 and 5 and received at stage 6. For example, the UEs may determine a range between UE 105A and UE 105B based on Rx-Tx measurements of the PRS signals or based on equivalent TODi and TOAi measurements for the PRSi signals (where i=1 for PRS transmitted by UE 105A in stage 4 and i=2 for PRS transmitted by UE 105B in stage 5, and c represents the speed of transmission of an electromagnetic wave, e.g., speed of light) as:

$$\text{Range} = \left| \frac{(TOA_2 - TOD_1) + (TOA_1 - TOD_2)}{2c} \right| \qquad \text{Eq. 1}$$

The location result(s) determined at stage 7 may then be exchanged, at stage 8. Exchanging location results at stage 8 may include both of UE 105A and UE 105B sending their location results to the other UE or just one of UE 105A or UE 105B sending its location results to the other UE. In the latter case, just the UE which sends its location results to the other UE may calculate its location results at stage 7.

As illustrated in stage 9, stages 4-8 may be repeated as desired by UE 105A and UE 105B. For example, stages 4-8 may be repeated at stage 9 to enable periodic or triggered location results for UE 105A and UE 105B.

Figure 6A:
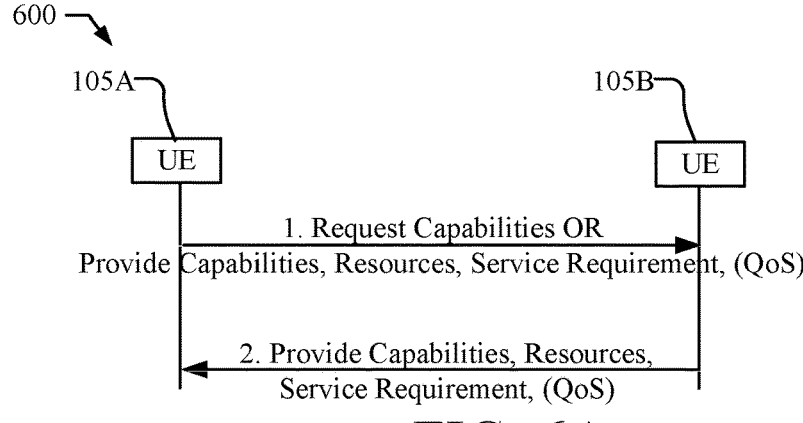
FIG. 6A is a signal flow illustrating the signaling between UEs for a sidelink positioning capabilities exchange, including the exchange of capabilities, resources, and service requirements.

FIG. 6A is a signal flow 600 illustrating the signaling between UE 105A and UE 105B for a sidelink positioning capabilities exchange, including the exchange of capabilities, resources, and service requirements, which may include QoS, which may correspond to stage 1 of FIG. 5. As illustrated in signal flow 600, at stage 1, the UE 105A may send to the UE 105B a (e.g. SLPP) Request Capabilities message, a (e.g. SLPP) Provide Capabilities message or a (e.g. SLPP) Provide Capabilities, Resources, and Service Requirements message, which may include QoS. At stage 2, and in response to the Request Capabilities, the Provide Capabilities or the Provide Capabilities, Resources, and Service Requirements message, the UE 105B may send a (e.g. SLPP) Provide Capabilities message or a (e.g. SLPP) Provide Capabilities, Resources, and Service Requirements message, which may include QoS, to the UE 105A.

Figure 6B:
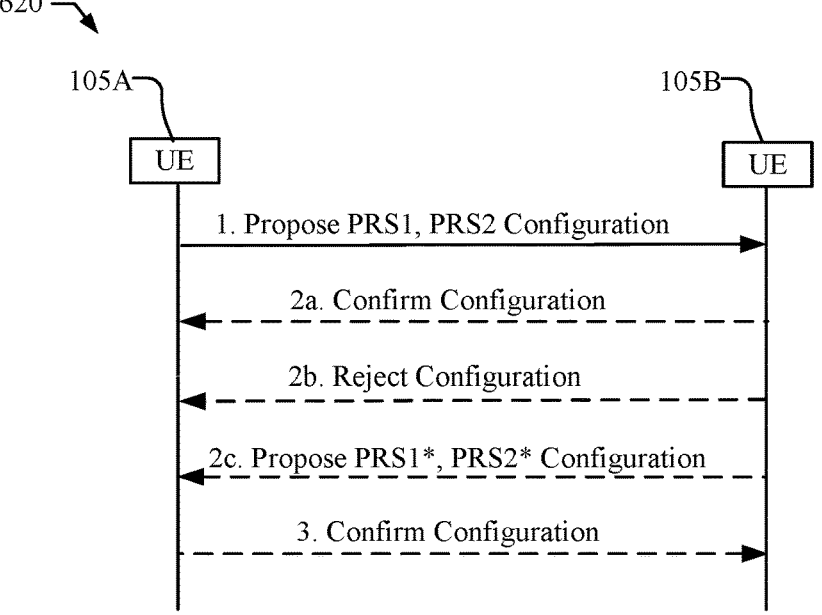
FIG. 6B is a signal flow illustrating the signaling between UEs for a positioning signal configuration and confirmation exchange.

FIG. 6B is a signal flow 620 illustrating the signaling between UE 105A and UE 105B for a positioning signal configuration and confirmation exchange and may correspond to stages 2 and 3 of FIG. 5. As illustrated, at stage 1 of signal flow 620, the UE 105A sends to UE 105B a proposed positioning signal configuration, e.g., PRS1, PRS2 configuration, which corresponds to stage 2 of FIG. 5 and may be included in an SLPP Provide Assistance Data message or an SLPP Provide Positioning Signal Configuration message. At stage 2a, the UE 105B may send to UE 105A a confirm configuration message, which corresponds to stage 3 of FIG. 5 and may be an SLPP Confirm Positioning Signal Configuration message or an SLPP Provide Assistance Data Confirm message. Alternatively, at stage 2*b*, the UE 105B may send to UE 105A a reject configuration message which may be an SLPP Reject Positioning Signal Configuration message or an SLPP Provide Assistance Data Reject message. In response to the reject configuration message from stage 2*b*, the UE 105A may prepare another positioning signal configuration and stages 1 and 2*a* or 2*b* are repeated. In another implementation, at stage 2*c*, the UE 105B may send to UE 105A a modified positioning signal configuration, e.g., with proposed modified PRS1*, PRS2* configurations, which may be included in an SLPP Provide Assistance Data message or an SLPP Provide Positioning Signal Configuration message. In response to stage 2*c*, the UE 105A may send a confirm configuration message to UE 105B at stage 3, which may be an SLPP Confirm Positioning Signal Configuration message or an SLPP Provide Assistance Data Confirm message. Alternatively, the UE 105A may further modify the positioning signal configuration by repeating stages 1 and 2*a* or 2*b*.

Figure 6C:
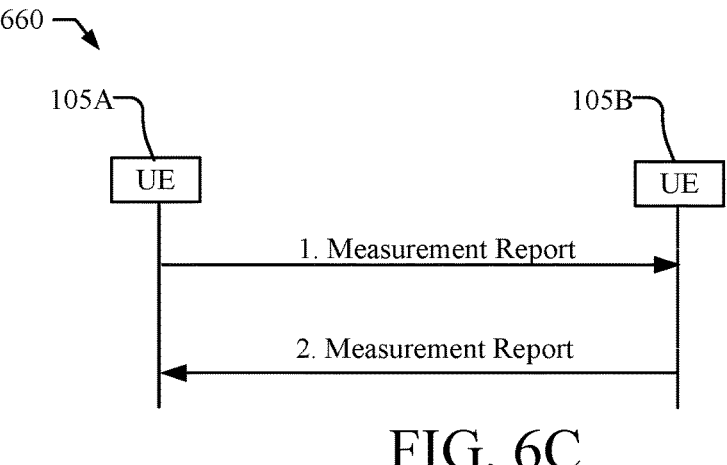
FIG. 6C is a signal flow illustrating the signaling between UEs for a measurement exchange.

FIG. 6C is a signal flow 660 illustrating the signaling between UE 105A and UE 105B for a measurement exchange, and may correspond to stage 6 of FIG. 5. As illustrated in signal flow 660, at stage 1, the UE 105A may send to the UE 105B a measurement report, which may include information related to the PRS transmitted by the UE 105A at stage 4 of FIG. 5, such as an exact time or times of transmission, etc. and may further include measurements generated by the UE 105A of the PRS transmitted by the UE 105B at stage 5 of FIG. 5. The measurement report for stage 1 may be an SLPP Provide Location Information message.

Similarly, at stage 2, the UE 105B may send to the UE 105A a measurement report, which may include information related to the PRS transmitted by the UE 105B at stage 5 of FIG. 5, such as an exact time or times of transmission, etc. and may further include measurements generated by the UE 105B of the PRS transmitted by the UE 105A at stage 4 of FIG. 5. The measurement report for stage 2 may be an SLPP Provide Location Information message.

Thus, as discussed for stage 1 of FIG. 5, as well as discussed for stage 1 shown in FIG. 6A, a sidelink positioning message sent by the UE 105A may include sidelink positioning capabilities and sidelink positioning resources of the UE 105A. The sidelink positioning message may further include the sidelink positioning Service Requirement of the UE 105A as discussed for stage 1 of FIG. 5 and FIG. 6A.

Moreover, the UE 105A may receive a second sidelink positioning message from the UE 105B. For example, as discussed for stage 1 of FIG. 5, as well as discussed for stage 2 shown in FIG. 6A, the second sidelink positioning message received from UE 105B may include the sidelink positioning capabilities and sidelink positioning resources of UE 105B. The second sidelink positioning message received from UE 105B may further include the sidelink positioning Service Requirement of UE 105B as discussed for stage 1 of FIG. 5 and stage 2 of FIG. 6A.

As illustrated for stages 2-8 of FIG. 5, the UE 105A may exchange additional sidelink positioning messages with UE 105B, which may be based on the sidelink positioning capabilities and the sidelink positioning resources of UE 105B. Each of the additional sidelink positioning messages may be further based on the sidelink positioning Service Requirement of the UE 105B. For example, as discussed for stages 2-8 of FIG. 5, as well as discussed in signal flows 620 and 660 of FIGS. 6B and 6C, the additional sidelink positioning messages exchanged with UE 105B may include proposed positioning signal configurations, confirmation (or rejection or modification) of the proposed positioning signal configurations, requests for measurements and/or measurements of sidelink positioning PRS and location results determined from the measurements of sidelink positioning PRS.

As illustrated by stage 7 of FIG. 5, the UE 105A may determine the location of the UE 105B based on the additional sidelink positioning messages.

The pairwise sidelink positioning illustrated in FIGS. 5, 6A, 6B, and 6C may be expanded and extended for group operation, e.g., with a group of UEs, e.g., as illustrated by the UE group 210 in FIG. 2. The group of UEs, for example, may be sufficiently small that direct discovery and direct sidelink signaling are possible between UEs in the group of UEs. Various sidelink positioning messages sent by the UEs in the group may be transmitted using groupcast or multicast so that each sidelink positioning message is broadcast once using sidelink signaling to all recipient UEs.

Figure 7:
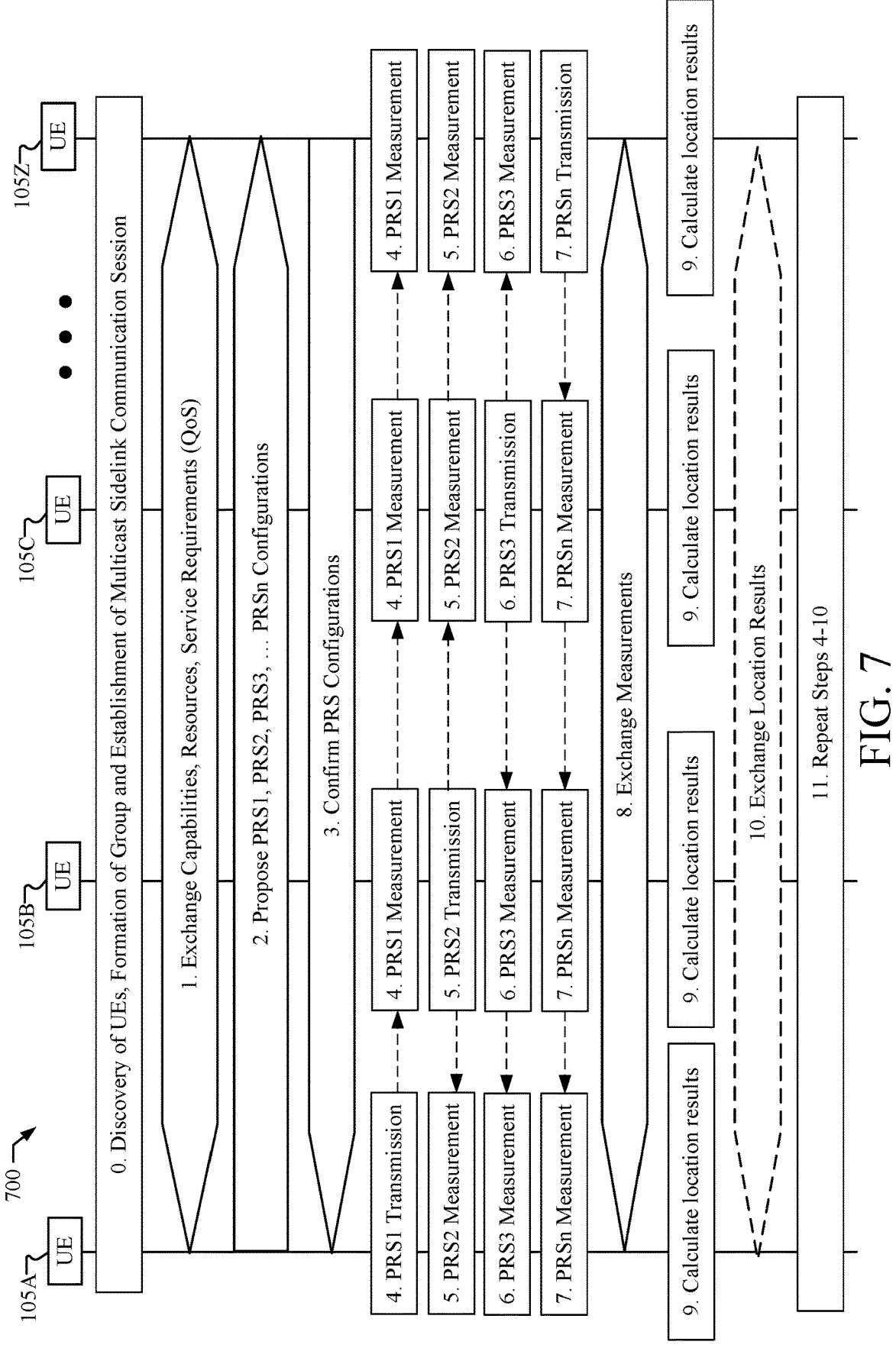
FIG. 7 is a signal flow illustrating the signaling for group operation of sidelink positioning for a plurality of UEs.

FIG. 7 by way of example, is a signal flow 700 illustrating the signaling for group operation of sidelink positioning for a plurality of UEs, illustrated as UE 105A, 105B, 105C, . . . 105Z, sometimes collectively referred to as UEs 105. The group of UEs may comprise a small number of UEs (e.g., up to 20) for which direct discovery and direct SL signaling are possible. The UEs 105, for example, may be, e.g., the UEs illustrated in FIG. 1 or any of the UEs illustrated in group 210 shown in FIG. 2. The sidelink positioning illustrated in FIG. 7 is independent of a network and thus, the UEs shown in FIG. 7 may be the out of coverage UEs in subgroup 216 in FIG. 2. The signaling performed in signal flow 700 may be similar to or the same as the SLPP signaling discussed above in reference to FIG. 2 and as illustrated in signal flow 500 in FIG. 5, except that the SLPP signaling can involve a larger number of UEs. If desired, the signaling may be performed directly, as illustrated or via relays and/or via a network. It is noted that the number of UEs in signal flow 700 is typically more than two though in a limiting case might be two (in which case two of the UEs shown in FIG. 7 are not present).

At stage 0 of FIG. 7, discovery of UEs, formation of the group, and establishment of a multicast sidelink communication session is performed. The discovery process may be request-response or announcement based. The discovery phase, for example, may be implemented by one or more UEs 105 to detect other UEs 105 that are available for sidelink positioning and are suitable for joining the group. For example, discovery messages may be exchanged between the UEs 105 to determine nearby UEs 105 that are available to participate in sidelink positioning. For example, UE 105A may broadcast a discovery based message using sidelink signaling which UEs 105B, 105C and 105Z may each receive and respond to by each transmitting a similar discovery based response message back to UE 105A using sidelink signaling. The UEs 105 may also exchange (or may be pre-configured with) one or more group criteria parameters for group formation, such as an approximate maximum distance between pairs of UEs (to help ensure UEs 105 can communicate directly with one another), a minimum period of time that any UE 105 is likely to be in communication with other UEs 105 (to help ensure that UEs 105 can communicate directly with one another for some minimum time period), and/or a common direction and/or common range of speed of the UEs 105 (to help ensure that UEs 105 will remain nearby to one another). Based on the group criteria parameters, the UEs 105 may determine whether to form a group, which UEs 105 should or should not belong to the group or whether and when to add additional UEs 105 later to the group and/or to remove an existing UEs 105 from the group. For example, the UEs 105 may determine a group status indication for each UE 105 indicating inclusion in the group or exclusion from the group. In FIG. 7, for example, it is assumed that all UEs 105A, 105B, 105C, . . . 105Z meet the one or more group criteria and are included in the group. Additional messages may be exchanged between the UEs 105 to establish a sidelink communication or positioning session between the UEs 105. For example, UE 105A may multicast a single request (e.g. an SLPP request) to UEs 105B, 105C and 105Z to start an SLPP positioning session and UEs 105B, 105C and 105Z may each return a response (e.g. an SLPP response) to UE 105A agreeing to start the SLPP positioning session.

At stage 1, the UEs 105 may exchange SLPP capabilities, resources, and service requirements, which may include QoS, for example, using SLPP Request Capabilities and Resources and SLPP Provide Capabilities and Resources messages as discussed above. The exchange of capabilities, resources, and service requirements, which may include QoS, may be similar to the signal flow 600 illustrated in FIG. 6A, but with additional UEs. For example, the UEs 105 may initially exchange capabilities by each sending a single groupcast SLPP message from each UE 105 to all the other UEs 105. The capabilities that are exchanged may define what each of the UEs 105 is implemented to support. The resources that are exchanged may define what capabilities each of the UEs 105 is permitted to support and/or is not permitted to support. The sidelink positioning capabilities that a UE is permitted to support or not permitted to support may include permission or restrictions on one or more of a sidelink PRS transmission time, sidelink PRS measurement time, sidelink PRS transmission duration, sidelink PRS measurement duration, bandwidth of sidelink PRS that can be transmitted, bandwidth of sidelink PRS that can be measured, RF frequency of sidelink PRS that can be transmitted, RF frequency of sidelink PRS that can be measured, signal coding of sidelink PRS that can be transmitted, signal coding of sidelink PRS that can be measured, periodicity of sidelink PRS transmissions, periodicity of sidelink PRS that is measured, transmission power for sidelink PRS transmission, transmission power for sidelink PRS that is measured, or any combination thereof. Sidelink positioning capabilities may be fixed and static as discussed for stage 1 of FIG. 5. Sidelink positioning resources may depend on available spectrum for SL PRS and/or on pre-existing positioning sessions and/or positioning procedures that a UE 105 may already be supporting or part of as discussed for stage 1 of FIG. 5. The service requirements of each of the UEs 105 may be as described for stage 1 of FIG. 5.

At stage 2, the UE 105A may send the other UEs 105 a proposed positioning signal configuration, e.g., PRS1, PRS2, PRS3, . . . PRSn configuration, e.g., using an SLPP Provide Positioning Signal Configuration message or SLPP Provide Assistance Data message, as discussed above. The PRS1 configuration (in this example) may define SL PRS to be transmitted later by UE 105A, the PRS2 configuration (in this example) may define SL PRS to be transmitted later by UE 105B, the PRS3 configuration (in this example) may define SL PRS to be transmitted later by UE 105C, and the PRSn configuration (in this example) may define SL PRS to be transmitted later by UE 105Z, The PRS1, PRS2, PRS3 and PRSn configurations, for example, may be defined and proposed by UE 105A based on the capabilities, resources and service requirements exchanged at stage 1 which may include QoS of each of the UEs 105. The PRS1, PRS2, PRS3 and PRSn configurations, for example, may each be as described for PRS1 and PRS2 for stage 2 of FIG. 5.

At stage 3, each of the UEs 105B, 105C, . . . 105Z may send a message to the UE 105A to confirm the proposed positioning signal configuration, e.g., the PRS1, PRS2, PRS3, . . . PRSn configurations, e.g., using an SLPP Confirm Positioning Signal Configuration or SLPP Provide Assistance Data Confirm, as discussed above. In some implementations, a UE 105 (e.g. UE 105B) may instead reject the proposed positioning signal configuration at stage 3 and may further indicate which PRS configuration(s) are being rejected. and UE 105A may then propose a different positioning signal configuration (or just different PRS configurations for the PRS configuration(s) which are being rejected) until each of the other UEs 105 confirms the positioning signal configuration. In some implementations, a UE 105 (e.g. UE 105B) may send to the UE 105A and to other UEs 105 in the group a modified proposed positioning signal configuration and the UE 105A and the other UEs 105 may confirm the modified positioning signal configuration or may send another modified proposed positioning signal configuration to other UEs 105. In some implementations, stage 3 may be omitted when the PRS1, PRS2. PRS3, . . . PRSn configurations sent at stage 2 are acceptable to each of the UEs 105B, 105C, . . . 105Z which may reduce signaling.

At stage 4, the UE 105A transmits SL positioning signals corresponding to the PRS1 configuration and UEs 105B, 105C, . . . 105Z each measure these positioning signals (e.g. based on UE 105B, UE 105C, . . . UE 105Z already each knowing the PRS1 configuration). The UEs 105B, 105C, . . . 105Z, for example, may each measure one or more of RTT, Rx-Tx, RSRP, RSRQ, AOA, AOD, TOA of the PRS1 transmitted by UE 105A.

At stage 5, the UE 105B transmits positioning signals PRS2 and the remaining UEs 105 each measure the positioning signals PRS2, similar to PRS1 measurement at stage 4.

At stage 6, the UE 105C transmits positioning signals PRS3 and the remaining UEs 105 measure the positioning signals PRS3, similar to PRS1 measurement at stage 4.

At stage 7, the UE 105Z transmits positioning signals PRSn and the remaining UEs 105 measure the positioning signals PRSn. similar to PRS1 measurement at stage 4.

At stage 8, the UEs 105 exchange measurements. The exchange of measurements may be similar to the signal flow 660 illustrated in FIG. 6C, but with additional UEs, and with the measurements, for example, exchanged via a single groupcast SLPP message sent by each UE 105 to all the other UEs 105 in the group. As discussed later in reference to FIG. 9, each UE 105 may include in the measurements exchanged at stage 8 an indication of reverse link communication from every other UE 105 in the group to the UE 105. The exchange of measurements, for example, may indicate an exact or corrected SL PRS configuration used by a UE 105 for transmission of SL PRS (e.g. as discussed for stage 6 of FIG. 5), and may further provide the measurements obtained by the UE 105—e.g. at one of stages 4, 5, 6 or 7.

At stage 9, each UE 105 determines location results, e.g., range and/or direction between the UE 105 and each of one or more other UEs 105 in the group, relative locations of one or more of the UEs 105, absolute locations, velocities, relative velocities, or any combination thereof, based on the measurements generated at stages 4-7 and received at stage 8. In some embodiments, only one UE 105 (e.g. UE 105A) may determine location results.

The location result(s) determined at stage 9 may then be exchanged, at stage 10. Exchanging location results at stage 10 may include each of UEs 105A, 105B, 105C . . . 105Z sending its location results to all the other UEs 105 in the group or just one UE 105 (e.g. UE 105A) sending its location results to the other UEs 105. In the latter case, just the UE 105 which sends its location results to the other UEs 105 may calculate its location results at stage 9.

As illustrated at stage 11, stages 4-10 may be repeated as desired by the UEs 105. For example, stages 4-10 may be repeated at stage 1 to enable periodic or triggered location results for the UEs 105 to be obtained.

Thus, as shown in FIG. 7 when a UE 105, such as UE 105A, belongs to a group of UEs that contains two or more UEs, the UE 105A may send a sidelink positioning message to all other UEs in the group of UEs, e.g., UEs 105B, 105C, . . . 105Z, e.g., based on sidelink multicasting, so that the sidelink positioning message is broadcast or multicast once using SL signaling to all recipients UEs. For example, as discussed in stage 1 of FIG. 7, as well as discussed in stage 1 shown in FIG. 6A, the sidelink positioning message sent by the UE 105A may include sidelink positioning capabilities and sidelink positioning resources of the UE 105A. The sidelink positioning message may further include the sidelink positioning Service Requirement of the UE 105A as discussed in stage 1 of FIG. 7 and FIG. 6A.

Moreover, as further discussed in stage 1 of FIG. 7, the UE 105A may receive a second sidelink positioning message from each of the other UEs in the group of UEs, e.g., UEs 105B, 105C, . . . 105Z, e.g., based on sidelink multicasting. For example, as discussed in stage 1 of FIG. 7, as well as discussed in stage 2 shown in FIG. 6A, the second sidelink positioning message received from each of the other UEs may include sidelink positioning capabilities and sidelink positioning resources of the each UE. The second sidelink positioning message received from each UE may further include the sidelink positioning Service Requirement of the each UE as discussed in stage 1 of FIG. 7 and FIG. 6A.

As illustrated by stages 2-8 of FIG. 7, the UE 105A may exchange additional sidelink positioning messages with at least some UEs in the group of UEs, e.g., UEs 105B, 105C, . . . 105Z, e.g., based on sidelink multicasting. The additional sidelink positioning messages, for example, may be based on the sidelink positioning capabilities and the sidelink positioning resources of each of the at least some UEs. Each of the additional sidelink positioning messages may be further based on the sidelink positioning Service Requirements of each UE. For example, as discussed in stages 2-8 of FIG. 7, as well as discussed in signal flows 620 and 660 of FIGS. 6B and 6C, the additional sidelink positioning messages exchanged with at least some UEs may include proposed positioning signal configurations, may confirm (or reject or modify) the proposed positioning signal configurations, and/or may request measurements or provide measurements of SL PRS.

As illustrated by stage 9, the UE 105A may determine location results regarding the at least some of the UEs based on the additional sidelink positioning messages.

For group operation of sidelink positioning, such as illustrated in FIG. 7, the group of UEs must be initially formed, e.g., based on one or more criteria. Moreover, modification of the group UEs may be necessary as UEs leave or enter the group area.

Group formation for sidelink positioning may use Proximity-based Services (ProSe), e.g., for discovery and establishment of the group as illustrated in stage 0 of FIGS. 5 and 7. Various criteria may be used for including UEs in the same group. For example, for inclusion within a group, one criteria may be the ability for discovery via ProSe and the ability to communicate directly (via sidelink signaling) with other UEs in the group. Other criteria may include a maximum distance restriction, e.g., exclude from the group any UEs that are generally more distant from other UEs in the group than a maximum distance threshold; a time restriction, e.g., exclude from the group any UEs that are (or are likely to be) in communication with other UEs in the group for less than a minimum time duration threshold; and a direction or speed restriction, e.g., exclude from the group any UEs that are moving in a different direction than other UEs in the group or are moving at a speed that differs from the speeds of other UEs in the group by more than a maximum speed difference threshold. The criteria, e.g., thresholds to determine whether a UE meets various requirements to join the group, may be dependent on an environment and application. By way of example, the distance, time, and direction or speed criteria used in group formation for V2X highway, V2X local road, or V2X carpark applications may differ. Once a group is established, periodic ProSe signaling may be used to determine when a UE should leave the group and when new UEs should join the group, e.g., based on whether the group criteria are met. Within a group, the UEs may be assigned member IDs (e.g., 1, 2, 3 etc.) for identification within the group and in SLPP messages. The group member IDs, for example, may be used to determine which UE will lead, coordinate and/or initiate an SLPP positioning session, a position method or a position method type, e.g. which UE will propose PRS configurations to other UEs, such as illustrated at stage 2 of FIGS. 5 and 7. A group may be restricted to one position method type only (e.g., SL NR PRS), while other position method types (e.g., SL LTE PRS or RTK) may be used by a different group. Restricting a group to one position method type may avoid scenarios where not all UEs in a group support the same position method types and may simplify procedures and messaging. Alternatively, to maximize signaling efficiency, the same group of UEs may employ multiple position method types and/or multiple position methods, where not all UEs in the group necessarily support exactly the same position method types or exactly the same position methods.

FIG. 8, by way of example, shows an environment 800 that illustrates group formation of sidelink positioning groups of UEs. In the example illustrated in FIG. 8, the UEs are On-Board Unit (OBU) or IVSs for vehicles and, consequently, are illustrated simply as vehicles. The environment 800 shown in FIG. 8, for example, may be a divided 4-lane highway, and illustrates group membership of the UEs with regions having boundaries marked with dotted lines.

FIG. 8 illustrates four groups, Group 1, Group 2, Group 3, and Group 4, each containing multiple UEs (where each UE corresponds to a vehicle). As illustrated, each UE may belong to one or more groups. Membership of UEs in multiple groups may restrict PRS transmission and measurement times in each group to avoid signaling collisions. Various criteria may be used for group formation. For example, each group may preferably be restricted to nearby vehicles travelling in the same direction. As illustrated in FIG. 8, however, Group 1 includes one anomaly, UE 802, that is near other vehicles in Group 1, but is traveling in the opposite direction. In the example of FIG. 8, the environment is a divided highway and, thus, it may not be necessary or desirable to include UE 802 in Group 1 as it is travelling in the opposite direction to the other UEs in Group 1. To avoid anomalies such as illustrated in FIG. 8, criteria may be used for group membership, such as thresholds or requirements for relative distance to other UEs in the group, a period of time that a UE will be in communication with other UEs in the group, and a direction and/or speed of travel. For example, in other environments, such as roads without a divider, local roads or carparks, it may be desirable to include UEs traveling in opposite directions (as well as UEs travelling in the same direction).

Thus, after discovery of two or more UEs that are available for sidelink positioning, e.g., as discussed in stage 0 of FIGS. 5 and 7, a UE may determine (e.g. from pre-configured information in the UE) or obtain (e.g. from other UEs that were discovered) one or more group criteria parameters. The UE may determine a group status indication for at least one UE based on the one or more group criteria parameters that were generated or obtained from one or more other UEs. The group status indication, for example, may indicate inclusion of the at least one UE in the group or exclusion of the at least one UE from the group.

In some implementations, group management may be centralized, e.g., performed by one UE, e.g., UE 105A shown in FIGS. 5 and 7. With centralized group management, any of the other UEs, e.g., UEs 105B, 105C, ... 105Z in FIG. 7, may be included in the group when the UE 105A determines the group status indication for the other UE indicates inclusion of the other UE in the group. Similarly, with centralized group management, any of the other UEs, e.g., UEs 105B, 105C, ... 105Z, may be excluded from the group when the UE 105A determines the group status indication for the other UE indicates exclusion of the other UE from the group.

In some implementations, group management may be distributed, e.g., performed by all UEs, e.g., UEs 105A and 105B shown in FIG. 5 or UEs 105A, 105B, 105C, ... 105Z shown in FIG. 7. With a distributed group management, for example, each UE determines a group status indication for each of the other UEs based on the group criteria parameters generated or obtained from the other UEs. A UE may be included in the group or excluded from the group based on the group status indications for the UE determined by each of the other UEs. For example, if all or most other UEs determine that a particular UE 105 should be included in a group, then that UE 105 may be included. Similarly, if all or most other UEs determine that a particular UE 105 should be excluded from a group, then that UE 105 may be excluded. If each UE sends its determined group status indications to all other UEs, then each UE may determine for itself whether it is included in or excluded from the group based on whether all or most of the group status indications for the each UE determined by the other UEs indicate inclusion or exclusion.

As discussed above, the criteria parameters for inclusion in a group may include one or more of a distance restriction or threshold, a time restriction or threshold, a direction of travel restriction or threshold, and a speed (or speed difference) restriction or threshold. A distance restriction or threshold, for example, may limit inclusion in a group to UEs that are less than a threshold distance from other UEs in the group. In some implementations, the threshold distance may be with respect to any UE in the group or may be with respect to an average location for the group, e.g., a mean UE location, a center of gravity, a centroid (or other single location) of the group. The threshold distance may vary based on environment, including type of road, road conditions, day of week, time of day, traffic conditions, weather conditions, etc. For example, a relatively large threshold distance (e.g. 100 to 500 meters) may be used in environments with higher speeds (e.g., highways) or fewer restrictions on the direction of travel (e.g., no road divisions), while a relatively low threshold distance (e.g. 20 to 100 meters) may be used in environments with low speeds (carparks) or greater restrictions on the direction of travel (e.g., divided roads).

Another criterion may be a time restriction or threshold, for example, which may limit inclusion in a group to UEs that are (or are likely to be) in communication with other UEs in the group for more than a threshold time. For example, a UE may be near other UEs in the group, but may be traveling in a different direction or may be on a different road, and accordingly, will only be in communication with UEs in the group momentarily. The expected time that a UE will be in communication with UEs in the group may be determined based on various factors, such as location, direction of travel, numbers and density of UEs, etc. for the UEs. The threshold time may be based on environment, including type of road, road conditions, traffic conditions, weather conditions, etc. For example, a relatively small time threshold (e.g. 5 seconds) may be used in environments with higher speeds (e.g., highways) and a relatively large time threshold (e.g. 30 seconds) may be used in environments with lower speeds (carparks and local roads).

Another criterion may be a direction of travel restriction or threshold, which may limit inclusion in a group to UEs based on a UE traveling in the same or similar direction on the same road as the UEs in the group. The criterion for the direction of travel restriction, for example, may be based on the environment, including type of road, road conditions, traffic conditions, weather conditions, etc. For example, the criterion for the direction of travel restriction, for example, may be given more weight in the consideration of a UE for inclusion in a group in environments where the likelihood of collision is increased. For example, in an environment with a divided road, where head on collisions are not normally possible, the direction of travel restriction may be given a high weight. In an environment where head on or side collisions are more likely, e.g., undivided roads, intersections, or carparks, the direction of travel restriction may be given lower weight or may even be removed (e.g. such that UEs can be in the same group regardless of their directions of travel).

Another criterion may be a speed or speed difference restriction or threshold, which may limit inclusion in a group of UEs to UEs that have a speed that is less than a threshold difference from the speed or speeds of the other UEs in the group. In some implementations, the speed restriction may be with respect to an average speed of the UEs in the group, or may be with respect to the speed of one particular UE in the group, or may be with respect to the speed of each UE in the group. The threshold difference may vary based on environment, including type of road, road conditions, traffic conditions, weather conditions, etc. For example, a relatively high threshold difference (e.g. 50 kms/hour) may be used in environments with higher speeds (e.g., highways), while a relatively low threshold difference (e.g. 20 kms/hour) may be used in environments with lower speeds (e.g. carparks and local roads) or where platooning is used.

Additional or other criteria parameters for inclusion in a group may be used. For example, in some implementations group criteria parameters may include a sidelink position method restriction or a sidelink position method type restriction. For example, a sidelink position method restriction may limit inclusion in a group of UEs to UEs that support the same sidelink position methods as other members of the group. The sidelink position methods, for example, may be limited to a specific signal type or types (e.g., SL NR PRS, Wi-Fi, GPS L1-L5), or to one particular position method (e.g., SL NR PRS RTT). A sidelink position method type restriction may limit inclusion in a group of UEs to UEs that support the same sidelink position method type or types as other members of the group. The sidelink position method type, for example, may be limited to a specific signal type or types (e.g., SL NR PRS, Wi-Fi, GPS L1-L5). Restricting a group of UEs to support of a common sidelink position method or methods or a common sidelink position method type or types may simplify sidelink positioning procedures and messaging. For example, FIGS. 5 and 7 may assume that the participating UEs 105 all support a common sidelink position method type based on transmission and measurement of SL PRS. The signaling and procedures in FIGS. 5 and 7 might then not be possible if some of the participating UEs 105 did not support transmission and measurement of SL PRS and a different and more complex positioning procedure might then become necessary to obtain location results for all the participating UEs 105.

Once a group of UEs has been formed, it may be necessary to update the group, e.g., to remove or add UEs to the group. For example, in V2X applications, group membership changes may sometimes be needed rapidly, e.g., in a matter of a few seconds. The exchange of measurements and/or the exchange of location results using SLPP, e.g., illustrated in stages 6 and 8 of FIG. 5 and stages 8 and 10 of FIG. 7, and the receipt and measurement of PRS, e.g., illustrated in stages 4 and 5 of FIG. 5 and stages 4-7 of FIG. 7, enables each UE to know whether reverse link communication still exists with respect to each of the other UEs in the group. In a determination labelled here as D1, a UE 105 may determine if the UE 105 is able to receive and decode an SLPP message sent by the other UE (e.g., at stage 6 or 8 of FIG. 5 or stage 8 or 10 of FIG. 7). In another determination labelled here as D2, a UE 105 may determine if the UE 105 is able to receive and measure SL PRS transmitted by the other UE (e.g., at stage 4 or 5 of FIG. 5 or one of stages 4-7 of FIG. 7). In some embodiments, the UE 105 may determine that reverse link communication from another UE 105 exists if only if both D1 and D2 are determined to be true. In other embodiments, the UE 105 may determine that reverse link communication from another UE 105 exists if either D1 or D2 is determined to be true. In yet another embodiment, the UE 105 may determine that reverse link communication from another UE 105 exists if only if D1 is determined to be true (or if and only if D2 is determined to be true).

A UE may then indicate to all other UEs in the group its own reverse link communication determinations, e.g., using a bit string, in SLPP messages used to exchange measurements or location results, e.g., illustrated in stages 6 and 8 of FIG. 5 and stages 8 and 10 of FIG. 7. For example, the UE 105A in FIG. 7 may send to the other UEs 105 in FIG. 7 reverse link communication determinations indicating whether UE 105 determined that reverse link communication exists (to UE 105A) from each of UE 105B, UE 105C and UE 105Z. Accordingly, each UE may then construct a table showing reverse link communication status between all pairs of UEs that may be used to determine a group status indication for each UE in the group, and which may then be used to determine whether to retain each UE in the group or exclude one or more UEs from the group.

In some embodiments, a UE may not explicitly indicate its own reverse link communication determinations to other UEs (e.g. at stage 8 in FIG. 7) but may implicitly indicate to other UEs in the group its reverse link communication determinations. The implicit indications may correspond to provision of measurements for other UEs. In a measurement report message sent by a UE A to other UEs in the group (e.g. at stage 8 in FIG. 7 or stage 1 or 2 in FIG. 6C), the inclusion of one or more measurements obtained by the UE A for SL PRS transmitted by another UE B may be assumed to imply that reverse link communication exists from the other UE B to the UE A. Conversely, the exclusion of measurements obtained by the UE A for SL PRS transmitted by another UE B, or an indication that the UE A was not able to obtain any measurements for SL PRS transmitted by the other UE B, may be assumed to imply that reverse link communication does not exist from the other UE B to the UE A.

FIG. 9, for example, illustrates an example of a table 900 that may be produced by a UE (e.g., UE1) for a group of UEs, labeled UE1, UE2, UE3, UE4, and UE5 and used to determine removal of a UE from the group. The entries in table 900 may be based on indications of reverse link communication between UEs and indicates whether each column-wise UE has determined (e.g. indicated) that reverse link communication exists (and thus signals can be received) from each row-wise UE with a possible Y (yes), N (no), or U (unknown) entry. In the example shown in FIG. 9, UE1 knows that reverse link communication exists (i.e. it can receive signals) from UE2, UE3, and UE4, as indicated by Ys in the UE2, UE3, and UE4 rows and UE1 column of table 900, but it knows that reverse link communication does not exist (i.e. does not receive signals) from UE5, as indicated by the N in the UE5 row and UE1 column of table 900. Further, each of UE2, UE3, and UE4 may indicate to all other UEs in the group (including UE1) in the exchange of measurements or location results (e.g., stage 8 or 10 of FIG. 7) that they have determined that reverse link communication exists (i.e. can receive signals) from one another, as indicated by the Ys in the UE2, UE3, and UE4 columns and UE1, UE2, UE3, and UE4 rows in table 900, but not from UE5, as indicated by Ns in the UE5 row of table 900. UE1 does not receive messages from UE5, and so UE1 does not know whether UE5 receives signals from UE1, UE2, UE, or UE4, as indicated by Us in the UE5 column in table 900. Accordingly, UE5 would then be a candidate for removal from the group. The ProSe layer or a group support layer may be periodically invoked to remove UEs (e.g., UE5 in the present example) from the group based on such reverse link communication determinations.

Thus, after formation of a group, a UE, e.g., UE 105A shown in FIG. 7, may send to each of the other UEs in the group, e.g., UEs 105B, 105C, . . . 105Z, indications of reverse link communication from each of the other UEs in the group to the UE 105A, e.g. as illustrated in the exchange measurement stage 8 of FIG. 7 and in the measurement report at stage 1 of FIG. 6C. The indications of reverse link communication may be sent based on sidelink multicasting, e.g., when the group contains more than two UEs. The UE 105A may additionally receive from each of the other UEs in the group indications of reverse link communication from other UEs in the group to the each of the other UEs in the exchange measurement stage 8 of FIG. 7 and in the measurement report at stage 2 of FIG. 6C. An indication of reverse link communication from any UE in the group to any other UE in the group may indicates whether sidelink positioning signaling (e.g., an SLPP message, a sidelink PRS or both) transmitted by the any UE was received or was not received by the any other UE. The UE 105A may determine a group status indication for one or more UEs in the group based on the indications of reverse link communication from each UE in the group to the UE 105 and the indications of reverse link communication from each UE in the group to each of the other UEs in the group. The group status indication for at least one UE may indicate inclusion of the at least one UE in the group or exclusion of the at least one UE from the group.

In some implementations, the UE 105A may determine a status of forward link communication and a status of reverse link communication between all pairs of UEs in the group based on the indications of reverse link communication from each UE in the group to the UE 105A and the indications of reverse link communication from each UE in the group to each of the other UEs in the group. Forward link communication may be the inverse of reverse link communication. For example, if reverse link communication from a UE B to a UE A is determined to exist by the UE A, then forward link communication exists from the UE B to the UE A. The UE 105A may determine the group status indication for the at least one UE based on the status of the forward link communication and the status of the reverse link communication between all pairs of UEs in the group. The status of forward link communication and the status of reverse link communication between any pair of UEs A and B in the group indicates whether successful sidelink positioning signaling transfer between the pair of UEs A and B is currently possible, currently not possible or has an unknown status for each of a forward direction of transfer (e.g. UE A to UE B) and a reverse direction of transfer (e.g. UE B to UE A), e.g., as illustrated in FIG. 9.

In some implementations, group management may be centralized, e.g., performed by one UE, e.g., UE 105A shown in FIGS. 5 and 7, or UE1 in the example shown in FIG. 9. With centralized group management, any of the other UEs, e.g., UEs 105B, 105C, . . . 105Z, may be included in the group when the UE (e.g., UE 105A or UE1) determines the group status indication for the other UE indicates inclusion of the other UE in the group. Similarly, with centralized group management, any of the other UEs, e.g., UEs 105B, 105C, . . . 105Z, may be excluded from the group when the UE (e.g., UE 105A or UE1) determines the group status indication for the other UE indicates exclusion of the other UE from the group.

In some implementations, group management may be distributed, e.g., performed by all UEs, e.g., UEs 105A and 105B shown in FIG. 5 or UEs 105A, 105B, 105C, . . . 105Z shown in FIG. 7 or UE1, UE2, UE3, UE4, UE5 in the example shown in FIG. 7. With a distributed group management, for example, each UE determines a group status indication for all UEs based on indications of reverse link communication determined by (e.g. received from) all UEs in the group. A UE may be included in the group or excluded from the group based on the group status indications for the UE determined by the UE itself or determined by one or more of the others UEs in the group.

In addition to removing UEs from a group, it also may be necessary to update the group by adding new UEs. In some situations it may be desirable to merge two or more groups of UEs into a single group, or add to a group one or more members from another group. For example, a UE that is a member of two or more groups may use relative locations and velocities of UEs in the groups, which may be used to infer future relative locations of UEs, to determine when two groups might be merged or when UEs from one group might be added to or transferred to another.

FIG. 10, by way of example, shows an environment 1000 that illustrates addition or transfer of a UE between sidelink positioning groups of UEs, including Group 1 and Group 2 illustrated with regions having boundaries marked with dotted lines. Similar to FIG. 8, in the example illustrated in FIG. 10, the UEs are OBU or IVSs for vehicles and, consequently, are illustrated simply as vehicles. In the example illustrated in FIG. 10, UE1 and UE2 in Group 1 may be candidates for addition to Group 2. UE3 belongs to both Group 1 and Group 2 and, thus, knows the relative locations and velocities and signaling connectivity of UE 1 and UE2 and can determine based on the relative locations and velocities and signaling connectivity that UE1 and UE2 should be added to Group 2. The SLPP layer in UE3 may inform a ProSe layer or application layer in UE3 to instigate group reconfiguration. In another implementation, the SLPP layer of each UE periodically reports relative UE locations, velocities and signaling connectivity to the ProSe layer or application layer to instigate group reconfiguration by the ProSe layer or application layer. The use of SLPP advantageously may reduce ProSe layer or application layer signaling and/or latency that would otherwise be needed for group reconfiguration.

Thus, a UE that belongs to two different groups of UEs, such as UE3 in the example of FIG. 10, may obtain the relative locations and velocities of a first set of UEs in a first group and may obtain the relative locations and velocities of a second set of UEs in a second group. Based on the relative locations and velocities of the first set of UEs and the second set of UEs, the UE may instigate the addition or transfer of at least some of the first set of UEs to the second group or the addition or transfer of at least some of the second set of UEs to the first group, or both. For example, in one implementation, the addition or transfer of at least some of the first set of UEs or at least some of the second set of UEs may merge the first group with the second group.

The UE 105 may include a Discovery (DSC) Service Layer, which may be defined by 3GPP. The services provided to Upper Layer(s) by the DSC Service Layer may include determining or obtaining: unique IDs of discovered nearby UEs; services supported by each nearby UE (e.g. including sidelink positioning); approximate range/direction to each nearby UE; and location/velocity of each nearby UE. The services provided to Upper Layer(s) by the DSC Service Layer may also include establishing a communication channel, connection or session to each nearby UE. The services requested from the DSC Service Layer by Upper Layer(s) may include: (i) discovery of nearby UEs and attributes of discovered UEs that need to be determined or obtained; (ii) a willingness to be discovered by other UEs and attributes of the UE to be provided to other UEs for discovery; and (iii) a request or permission for receiving/providing supported services, receiving/providing approximate ranges/directions, receiving/providing locations/velocities, and establishing communications channels/connections/sessions. The services performed by Upper Layer(s) based on DSC Service Layer support may include ranging between two UEs using SLPP and formation of a group of UEs.

The UE 105 may include a Group Support (GS) Service Layer, which may be defined by 3GPP. The GS service layer may be used to help manage a group of UEs although decisions on group membership may not be made by the GS service layer but only by upper layers (e.g. an application layer). The GS Service Layer may not be needed for ranging or other services between only a pair of UEs. The GS Service Layer, for example, may support groups of two or more UEs. The services provided to Upper Layer(s) by the GS Service Layer may include: (i) creating a group of UEs when provided with UE IDs, pairwise communications channels, group member IDs, member priorities, group leader(s); (ii) creating a multicast channel/connection/session for the group of UEs, where one message from any UE can be multicast to all other UEs in the group; (iii) creating and providing a group ID and group member IDs to upper layers; (iv) managing addition of a new UE to the group and removal of an existing UE from the group; (v) managing splitting and merger of groups; and (vi) managing communication resources, e.g., licensed/unlicensed spectrum. Decisions regarding group membership and group changes may be taken by upper layers. The services requested from the GS Service Layer by Upper Layer(s) may include: (i) creating a group of UEs (e.g. using UE IDs and parwise communications channels); (ii) removing the UE (for the GS Service Layer) from a group of UEs; (iii) removing another UE from a group of UEs; (iv) adding another UE to a group of UEs; (v) splitting a group of UEs into two separate groups; and (vi) merging two groups of UEs into one group.

The UE 105 may include a sidelink positioning Service Layer, also referred to as an SL Positioning layer, SLPP Service Layer or SLPP layer, which may be defined by 3GPP. The sidelink positioning Service Layer may be used for ranging between a pair of UEs and sidelink positioning for a group of UEs and may make use of an SLPP protocol (e.g. the SLPP protocol described elsewhere here). The services provided to Upper Layer(s) by the sidelink positioning Service Layer may include on demand range/direction determination or relative location of another UE (one off), periodic range/direction determination or relative location of another UE, triggered range/direction determination or relative location of another UE (e.g., when range/direction or relative location changes by a threshold value), on demand range/direction determination or relative location for a group of other UEs (one off), periodic range/direction determination or relative location for a group of other UEs, and triggered range/direction determination or relative location for a group of other UEs (e.g. when range/direction or relative location of another UE changes by a threshold value). The services requested from the sidelink positioning Service Layer by Upper Layer(s) may include request for current range/direction or relative location of another UE—one off, periodic or triggered, and request for current range/direction or relative location for a group UEs—one off, periodic or triggered. The services requested from a Serving Network (e.g. an LMF) by the sidelink positioning Service Layer in a UE may include LMF support of sidelink positioning with respect to PRS Configuration determination or verification and Location calculation, and may be an extension of a Mobile Originating-Location Request (MO-LR).

The role of UE Upper Layers and of an External AF or Client may also be defined. For example, UE Upper Layers may request and receive information from DSC, GS and sidelink positioning service layers, decide on group formation, positioning of other UEs, and provide services applicable to one or more applications (e.g. V2X, IIoT etc.) using application level protocols. An External Client or Application Function (AF) may receive information from UE(s) about other discovered UEs and groups of UEs, and may (i) request for a current range/direction or relative location of two or more identified target UEs (one off, periodic or triggered); (ii) request for a current range/direction or relative location for a group of identified target UEs (one off, periodic or triggered); and (iii) request for a current range/ direction or relative location of one identified target UE and other (unidentified) target UEs discovered by this target UE or in a group with this target UE. Requests from an External Client or AF can be sent to either a GMLC, which can forward the request to an LMF in a serving PLMN for a target UE, or to a Home SUPL SLP (H-SLP) for a target UE.

In order to support operations for Sidelink positioning and ranging services, a UE 105 may implement and support several fundamental functions, e.g. device and service discovery, group operation, sidelink positioning and ranging-based service control, and interactions with an application layer or application function (AF). For example, a UE 105 may implement and support several fundamental functions including a device and service discovery function, a group support service function, a Sidelink (SL) Positioning and Ranging Protocol (e.g. SLPP), and a service exposure function. These functions may support some or all of the procedures and techniques described previously herein. For example, a device and service discovery function may be used to support discovery of UEs and the services they support, e.g. as in stage 0 in FIG. 5 and/or stage 0 in FIG. 7; a group support service function may support establishment and modification of groups of UEs, e.g. as described in association with FIGS. 8, 9 and 10; a Sidelink (SL) Positioning and Ranging Protocol such as SLPP may support sidelink positioning of a pair of UEs or group of UEs, e.g. as described for FIGS. 2, 3, 4A, 4B, 5, 6A, 6B, 6C and 7; and a service exposure function in a UE may receive a request from an Application in the UE or from an external Client or external Application Function (AF) for location results for one or more UEs and may provide the location results (e.g. once obtained by a Sidelink (SL) Positioning and Ranging Protocol) to the Application in the UE or to the external Client or AF.

Figure 11A:
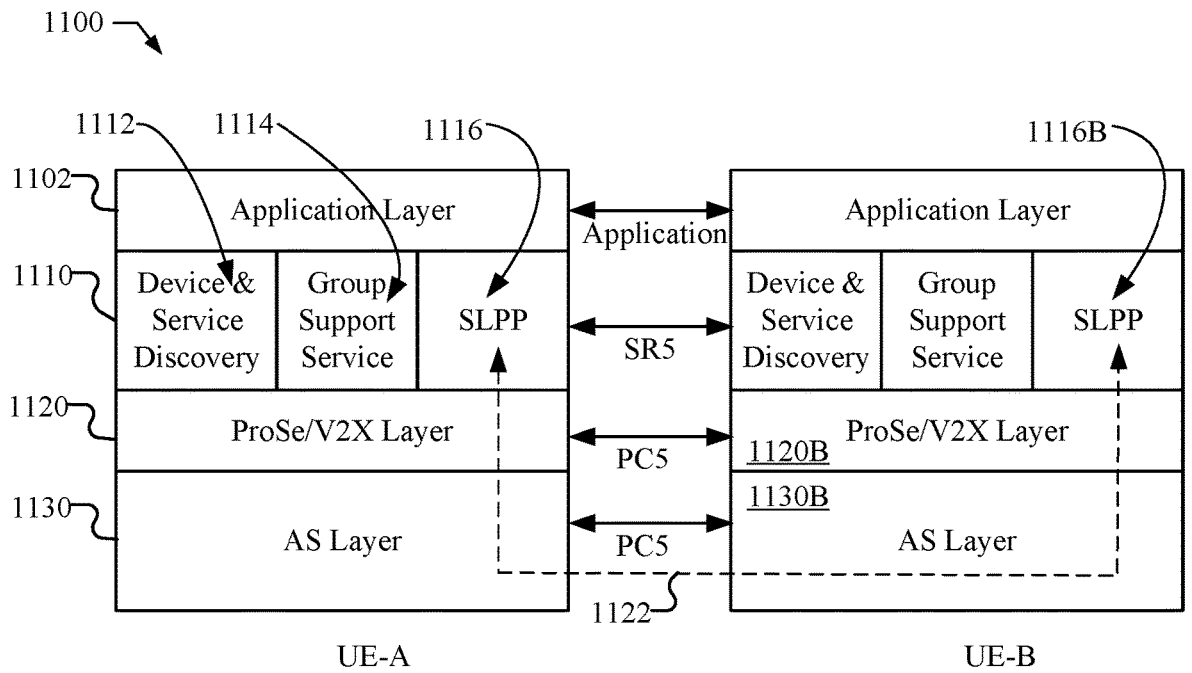
FIG. 11A is a block diagram illustrating an example UE architecture and potential interactions of functional elements and other layers of the UE for communication between UEs for sidelink positioning and ranging services.

FIG. 11A is a block diagram 1100 illustrating an example UE architecture and potential interactions of functional elements and protocol layers of the UE for communication between a UE-A 105A and UE-B 105B for sidelink positioning and ranging services. As illustrated by UE-A, the architecture of functional elements may include an upper layer 1102, such as an Application layer, beneath which is a ranging support layer 1110 (which may also be referred to as a sidelink ranging layer abbreviated as SR5, or as a sidelink positioning layer abbreviated as SP5) that provides services to the upper layer, e.g., the Application layer 1102. The ranging support layer 1110 is followed by at least one lower layer 1120, such as a ProSe layer or V2X layer 1120, which is further followed by an Access Stratum (AS) layer 1130 as the lowest layer. The Application layer 1102, for example, may support or manage at least one application such as V2X, automated driving, movement of objects in a factory or warehouse, or UE to UE ranging. The communications between UE-A and UE-B flow through the lowest layer interface, e.g., illustrated in FIG. 11A as the PC5 communication service at the AS layer 1130. The Application layer 1102 in UE-A may interact with an Application layer of another UE, e.g., UE-B, via an Application interface; an element of the ranging support layer 1110 in UE-A may similarly interact with a corresponding element of the ranging support layer of another UE, e.g. UE-B, via a sidelink ranging interface, labeled SR5; and the ProSe layer or V2X layer 1120 and AS layer of UE-A may interact with corresponding layers in another UE, e.g. UE-B, via a PC5 communication service. Either of the UE-A or UE-B in FIG. 11A may be an RSU, a PRU or some other element of a network.

The ranging support layer 1110, for example, may include a Device and Service Discovery Function (DSDF) 1112 that provides services to the upper layer, e.g. Application layer 1102. For example, the DSDF 1112 may provide: a unique identifier of each of one or more other UE(s) (e.g. UE-B) in proximity to UE-A that can participate in a Sidelink Positioning and Ranging service; an indication of services supported by each of the other UE(s) (e.g., signaling protocols, pairwise ranging, group ranging); and/or a sidelink communication channel or sidelink communication session with each of the other UE(s), or any combination thereof. The DSDF 1112 may receive request related information from an upper layer, e.g., Application layer 1102. For example, the DSDF 1112 may receive information such as a trigger for the discovery of UEs to participate in Sidelink Positioning and Ranging services; optionally, the attributes of the UEs to be discovered; an indication of allowing or supporting discovery by other UEs and corresponding attributes of the other UEs; and request/permission for Sidelink Positioning and Ranging services, or any combination thereof. An operation performed by DSDF 1112, by way of example, may include performing device and service discovery using PC5 communication service provided by the ProSe layer or V2X layer 1120 or AS layer 1130. For example, the DSDF 1112 may perform application layer discovery using a broadcast service over a PC5 reference point.

The ranging support layer 1110, for example, may include a Group Support Service Function (GSSF) 1114 that provides services to the upper layer, e.g. Application layer 1102. For example, the GSSF 1114 may provide services such as creating a Sidelink Positioning and Ranging service group, when more than two UEs are involved in a session and the upper layer has specified the group. GSSF 1114 may provide a group ID and group local member IDs to the upper layer. GSSF 1114 may also manage the group members, e.g. addition or removal of group member UEs, splitting or merging of groups, etc., as decided by the upper layer. With the upper layer, e.g., Application layer 1102, managed group function (e.g. a V2X platooning application), the GSSF 1114 may provide needed support for group member status monitoring, e.g. determining an indication of presence, absence, capability and/or status of group members. The GSSF 1114 may make use of the service of DSDF 1112 for discovering group members and their presence, absence, capability and/or status. The GSSF 1114 may receive request related information from the upper layer 1102. For example, the GSSF 1114 may receive from the upper layer 1102 a request for the creation of a group for Sidelink Positioning and Ranging service; a request for an operation for a specific group member, e.g., to add or remove a member UE; a request for the management of a group, e.g., to merge or split a group, or any combination thereof. An operation performed by the GSSF 1114, for example, may include performing group management requested by the upper layer 1102 using the PC5 communication service provided by ProSe layer or V2X layer 1120 or AS layer 1130. Messages generated by GSSF 1114 (e.g. and sent to a GSSF in another UE) may be sent as data traffic over a PC5 reference point and may not require additional enhancements to the PC5 reference point.

The ranging support layer 1110, for example, may include a Sidelink Positioning and Ranging Protocol (SLPP) function 1116 that may provide services to the upper layer, e.g. Application layer 1102. For example, the SLPP function 1116 may provide services such as: on-demand Sidelink Positioning/Ranging for determination of a range, direction, relative location and/or relative velocity for another UE or each UE of a group of other UEs; periodic Sidelink Positioning/Ranging for periodic determination of a range, direction, relative location and/or relative velocity for another UE or each UE of a group of other UEs; triggered Sidelink Positioning/Ranging for triggered determination of a range, direction, relative location and/or relative velocity for another UE or each UE of a group of other UEs; or any combination thereof. The SLPP function 1116 may receive request related information from the upper layer 1102. For example, the SLPP function 1116 may receive information such as a request for: a current range/direction, relative location and/or relative velocity of another UE or a group of UEs; a request for periodic range/direction, relative location and/or relative velocity of another UE or a group of UEs; a request for triggered range/direction, relative location and/or relative velocity of another UE or a group of UEs; or any combination thereof. An operation performed by the SLPP function 1116, for example, may include performing control signaling between UEs or among a group of UEs to manage and coordinate the Sidelink Positioning and Ranging operations. Messages generated by the SLPP function 1116 (e.g. and sent to an SLPP function in another UE) may be sent as data (or control) traffic over a PC5 reference point using a PC5 communication service provided by the ProSe layer or V2X layer 1120 or AS layer 1130, and may not require additional enhancements to the PC5 reference point. In an implementation in which the network supports Sidelink Positioning and Ranging, the SLPP function 1116 exchange may occur between the UE and the LMF 120 (shown in FIG. 1A), for example, over NAS signaling, similar to that defined in 3GPP TS 23.273.

The architecture of functional elements may additionally include a Service Exposure Function, which allows a UE to interact with the application layer 1102, or an external AF and external client. In an implementation in which the network supports the Sidelink Positioning and Ranging, the interactions may occur between the UE and the LMF 120 and GMLC 125 (shown in FIG. 1A) as defined in 3GPP TS 23.273. The Service Exposure Function may be part of or supported by the Application Layer 1102.

In order to be supported over PC5, the services of the ranging support layer 1110, e.g., the three services including DSDF 1112, GSSF 1114, and SLPP function 1116, may obtain a V2X Service Type (e.g. PSID (Provider Service Identifier), ITS-AID (Intelligent Transport Systems (ITS) Application Identifier), or AID (Application Identifier)) or a ProSe Application ID. It is possible for the three services to share the same identifier or separate identifiers.

A UE that supports a Sidelink Positioning and Ranging service (e.g. an application layer 1102 in the UE) may invoke the DSDF 1112 service to discover and identify other UEs in proximity that also support the Sidelink Positioning and Ranging service. This may be based on a request from the upper layer 1102. Based on pre-configuration, or provisioned policies and parameters, the UE may determine a RAT (e.g. LTE PC5 or NR PC5) and corresponding Tx Profiles to be used for the DSDF 1112, GSSF 1114, and SLPP function 1116, based on a V2X Service Type/ProSe Application ID to RAT mapping. Such a configuration may also determine communication modes to be used, e.g. broadcast, groupcast, or unicast. In case it is determined that more than two UEs need to participate in an operation, the GSSF 1114 service may be invoked to form a group of UEs or determine group member UEs' presence and status for the operation. The SLPP function 1116 is used for control signaling between the UEs to support Sidelink Positioning and Ranging operations, e.g. a channel to be used for Sidelink Positioning or Ranging reference signals (e.g. SL PRS), a sequence and time slots for each UE to perform signal (e.g. SL PRS) transmission and measurements. The UEs, e.g. UE A and UE B in FIG. 11A, or in other cases a group of UEs, carry out the Sidelink Positioning or Ranging reference signal transmission and measurements. Based on Sidelink Positioning or Ranging services negotiated by the SLPP function 1116 in an earlier phase, the UEs uses the SLPP function 1116 to exchange the measurement results.

This can enable the UEs to perform the calculation of the range/direction, relative locations and/or relative velocities (e.g. as described in FIGS. 5 and 7). Depending on SLPP function 1116 support, some UEs may also provide calculation service to other UEs. When the network supports Sidelink Positioning and Ranging services, the UE may send the measurement results to an LMF, which would perform the calculation on behalf of the UEs, e.g. as described for FIG. 3.

Layer communication in the UE architecture shown in FIG. 11A may be based on a protocol-layered architecture (e.g. such as the 7-layer ISO protocol architecture) that are well known in the industry. Thus, at one entity (e.g. the UE-A in FIG. 11A), a protocol or service layer A may obtain service(s) from a protocol or service layer B immediately below it on the same entity and may exchange messages, such as Protocol Data Units (PDUs), with a corresponding peer level protocol or service layer A* in another entity (e.g. the UE-B in FIG. 11A) by transferring the message to the protocol or service layer B which in turn may encapsulate the message in a message or PDU for the protocol or service layer B and transfer this to a corresponding peer protocol or service layer B* in the other entity via a protocol or service layer C immediately below the protocol or service layer B which in turn transfers a message or PDU to a corresponding protocol or service layer C* on the other entity. At the lowest layer (e.g. the AS layer 1130 in FIG. 11A), messages are physically transferred to the other entity—e.g. via RF signaling at a physical layer. Messages from higher layers can be segmented, fragmented, combined, interleaved, retransmitted, re-encoded, etc. by lower layers but with the higher layer information content remaining unchanged. At the other entity (e.g. the UE-B in FIG. 11A), a high layer message is passed up through successive higher protocol or service layers until reaching the corresponding higher layer service or protocol layer for the message. This type of communication is well known in the industry.

As an example of layer communication, the application layer 1102 in UE-A in FIG. 11A may request some service from the SLPP function 1116 of the ranging support layer 1110, e.g. may request a range and/or direction of UE-B relative to UE-A. The SLPP function 1116 may then exchange one or more SLPP messages with an SLPP function 1116B in UE-B by transferring the SLPP messages via the ProSe/V2X layer 1120 and AS layer 1130 in UE-A and a corresponding AS layer 1130B and ProSe/V2X layer 1120B in UE-B as shown by the message path 1122 in FIG. 11A. The exchanged SLPP messages may enable sidelink location measurements (e.g. of a round trip time and/or angle of departure or arrival) which may enable UE-A and/or UE-B to calculate information (e.g. a range and/or direction of UE-B relative to UE-A) which may be returned by the SLPP function 1116 of UE-A to the application layer 1102 in UE-A to provide the service originally requested by the application layer 1102 in UE-A. A similar type of layer communication to that just described for the SLPP function 1116 may also be supported for the Group Support Service Function (GSSF) 1114 and for the Device and Service Discovery Function (DSDF) 1112. For example, the GSSF 114 may exchange messages for a GSSF protocol with a GSSF in UE-B, via the ProSe/V2X layer 1120 and AS layer 1130 in UE-A and the corresponding AS layer 1130B and ProSe/V2X layer 1120B in UE-B, in order to perform services for the Application layer 1102 in UE-A.

Figure 11B:
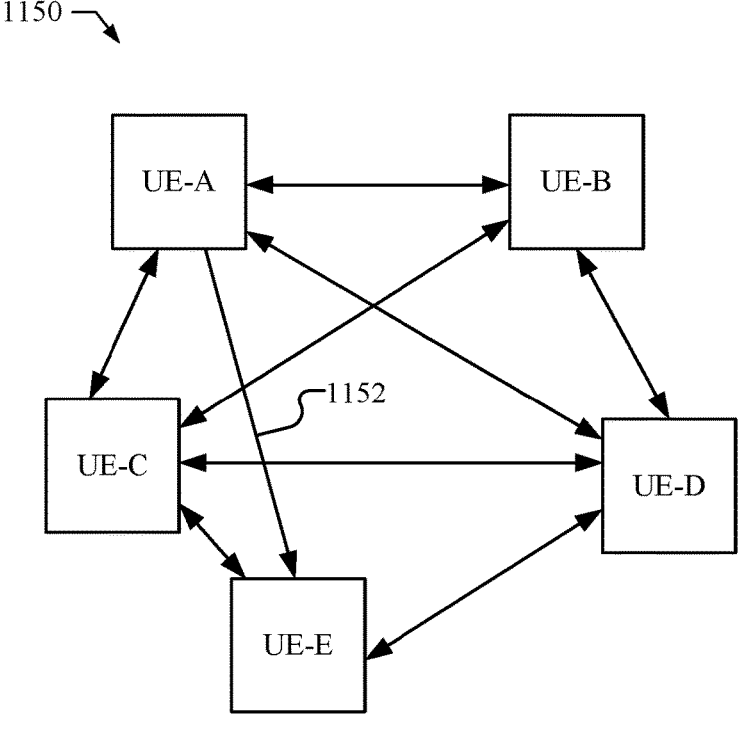
FIG. 11B illustrates a group of UEs communicating in support of group Sidelink Positioning and Ranging services.

FIG. 11B illustrates a group 1150 of UEs, individually identified as UE-A, UE-B, UE-C, UE-D, and UE-E, communicating in support of group Sidelink Positioning and Ranging services. Each UE illustrated in FIG. 11B may include the architecture and function elements and layers illustrated for UE-A and UE-B in FIG. 11A. The communications between each pair of UEs in FIG. 11B is illustrated as a double arrow where two-way communications occur and as a single arrow where only one-way communication occurs, such as illustrated by arrow 1152 from UE-A to UE-E. Where no communication occurs between a pair of UEs, e.g., between UE-B and UE-E, no arrow is illustrated. During communications, e.g., as discussed in FIG. 11A, a UE may send a single message that is received by all UEs in the group 1150, via multicast.

Figure 12:
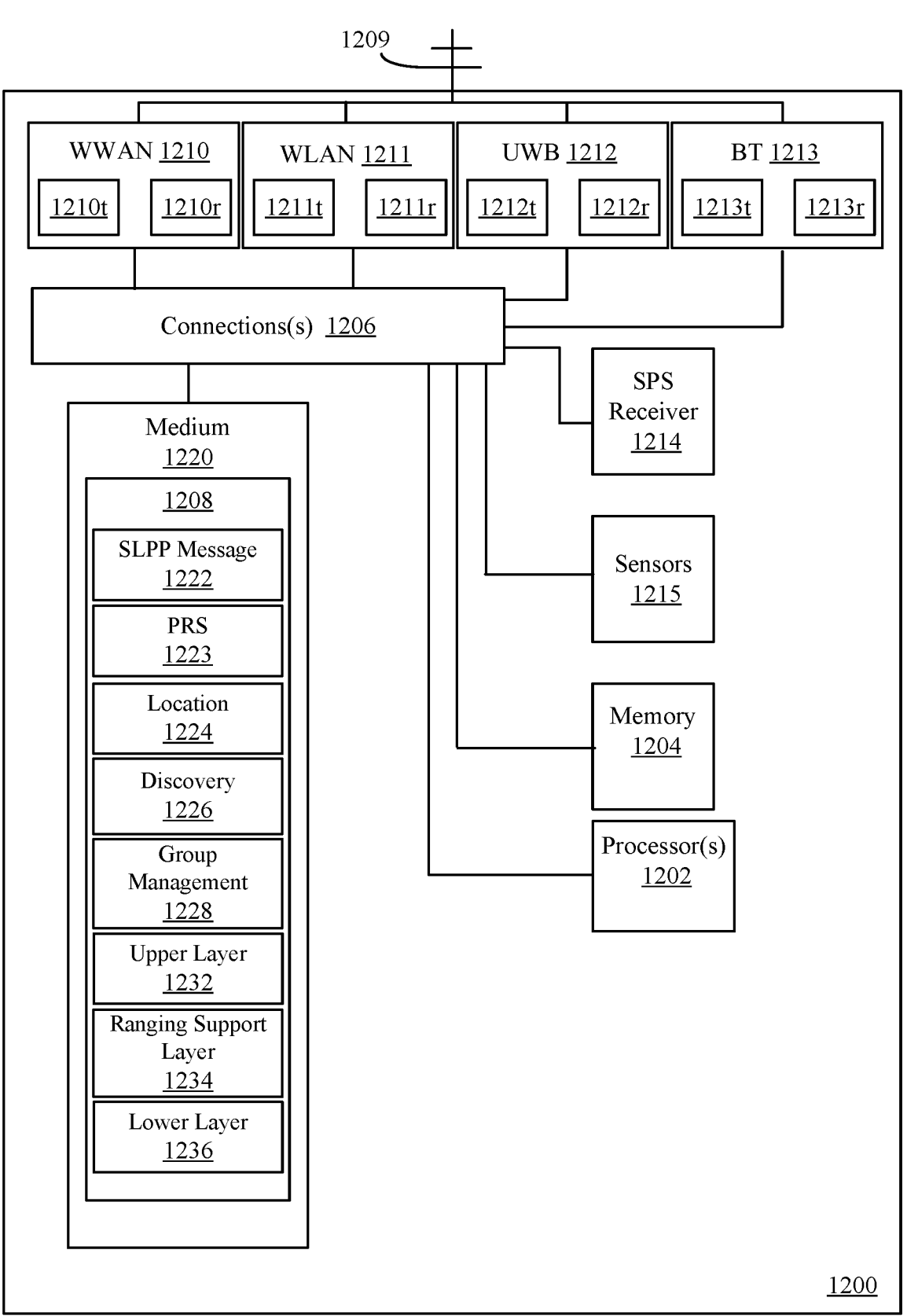
FIG. 12 shows a schematic block diagram illustrating certain exemplary features of a UE that is configured to support sidelink positioning, as discussed herein.

FIG. 12 shows a schematic block diagram illustrating certain exemplary features of a UE 1200, e.g., which may be a UE 105 shown in FIGS. 1, 3, 5, 6A, 6B, 6C, and 7, and any of the UEs illustrated in FIGS. 2, 8, 9, 10, 11A, and 11B and supports sidelink positioning of the UE 1200, including group management, as described herein. The UE 1200, for example, may perform the signal flows 300, 500, 600, 620, 660, and 700 shown in respective FIGS. 3, 5, 6A, 6B, 6C, and 7 and the process flows 1400 and 1500 shown in respective FIGS. 14 and 15, and accompanying techniques as discussed herein. The UE 1200 may include, for example, one or more processors 1202, memory 1204, an external interface such as at least one wireless transceivers (e.g., wireless network interface) illustrated as Wireless Wide Area Network (WWAN) transceiver 1210, Wireless Local Area Network (WLAN) transceiver 1211, an Ultra-Wideband (UWB) transceiver 1212 and a Bluetooth (BT) transceiver 1213, SPS receiver 1214, and one or more sensors 1215, which may be operatively coupled with one or more connections 1206 (e.g., buses, lines, fibers, links, etc.) to non-transitory computer readable medium 1220 and memory 1204. The SPS receiver 1214, for example, may receive and process SPS signals from satellite vehicles 190 shown in FIG. 1. The one or more sensors 1215, for example, may include an inertial measurement unit (IMU) that may include one or more accelerometers, one or more gyroscopes, a magnetometer, etc. The UE 1200 may further include additional items, which are not shown, such as a user interface that may include e.g., a display, a keypad or other input device, such as virtual keypad on the display, through which a user may interface with the UE 1200. In certain example implementations, all or part of UE 1200 may take the form of a chipset, and/or the like.

The UE 1200 may include at least one wireless transceiver, such as wireless transceiver 1210 for a WWAN communication system and wireless transceiver 1211 for a WLAN communication system, UWB transceiver 1212 for a UWB communication system, BT transceiver 1213 for a Bluetooth communication system, or a combined transceiver for any of WWAN, WLAN, UWB, and BT. The WWAN transceiver 1210 may include a transmitter 1210$t$ and receiver 1210$r$ coupled to one or more antennas 1209 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 1211 may include a transmitter 1211$t$ and receiver 1211$r$ coupled to one or more antennas 1209 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The UWB transceiver 1212 may include a transmitter 1212t and receiver 1212r coupled to one or more antennas 1209 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The BT transceiver 1213 may include a transmitter 1213t and receiver 1213r coupled to one or more antennas 1209 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 1210t, 1211t, 1212t, and 1213t may include multiple transmitters that may be discrete components or combined/integrated components, and/or the receivers 1210r, 1211r, 1212r, and 1213r may include multiple receivers that may be discrete components or combined/integrated components. The WWAN transceiver 1210 may be configured to communicate signals (e.g., with base stations and/or one or more other UEs or other devices) according to a variety of radio access technologies (RATs) such as New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 1211 may be configured to communicate signals (e.g., with access points and/or one or more other devices) according to a variety of radio access technologies (RATs) such as 3GPP LTE-V2X (PC5), IEEE 802.11 (including IEEE 802.11p), Wi-Fi, Wi-Fi Direct (Wi-Fi D), Zigbee etc. The UWB transceiver 1212 may be configured to communicate signals (e.g., with access points and/or one or more other devices) according to a variety of radio access technologies (RATs) such as personal area network (PAN) including IEEE 802.15.3, IEEE 802.15.4, etc. The BT transceiver 1213 may be configured to communicate signals (e.g., with access points and/or one or more other devices) according to a variety of radio access technologies (RATs) such as a Bluetooth network. The transceivers 1210 1211, 1212, and 1213 may be communicatively coupled to a transceiver interface, e.g., by optical and/or electrical connection, which may be at least partially integrated with the transceivers 1210, 1211, 1212, 1213.

In some embodiments, UE 1200 may include antenna 1209, which may be internal or external. UE antenna 1209 may be used to transmit and/or receive signals processed by wireless transceivers 1210, 1211, 1212, 1213. In some embodiments, UE antenna 1209 may be coupled to wireless transceivers 1210, 1211, 1212, and 1213. In some embodiments, measurements of signals received (transmitted) by UE 1200 may be performed at the point of connection of the UE antenna 1209 and wireless transceivers 1210, 1211, 1212, 1213. For example, the measurement point of reference for received (transmitted) RF signal measurements may be an input (output) UE of the receiver 1210r (transmitter 1210t) and an output (input) UE of the UE antenna 1209. In a UE 1200 with multiple UE antennas 1209 or antenna arrays, the antenna connector may be viewed as a virtual point representing the aggregate output (input) of multiple UE antennas.

The one or more processors 1202 may be implemented using a combination of hardware, firmware, and software. For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of UE 1200.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in UE 1200, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors.

A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in UE 1200 is merely exemplary, and as such the functionality of the modules and/or data structures may be combined, separated, and/or be structured in different ways depending upon the implementation of the UE 1200.

The medium 1220 and/or memory 1204 may include an SLPP message module 1222 that when implemented by the one or more processors 1202 configures the one or more processors 1202 to transmit and receive sidelink positioning (e.g., SLPP) messages, via the external interface including one or more of wireless transceivers 1210, 1211, 1212, and 1213. The sidelink positioning messages may use SLPP as discussed herein. The one or more processors 1202 may be configured to transmit SLPP messages, via the external interface, directly to one or more other UEs or to broadcast the SLPP messages using groupcast or multicast to a plurality of other UEs. The one or more processors 1202 may be configured to transmit and receive SLPP messages, via the external interface, with a location server (e.g. an LMF) in a PLMN with the SLPP message(s) embedded in an LPP message, embedded in both an LPP and SUPL message (e.g. which may include a SUPL POS message), embedded in just a SUPL message (e.g. which may include a SUPL POS message), or not embedded in an LPP or SUPL message. The one or more processors 1202 may be configured, for example, to transmit and receive, via the external interface, SLPP messages that include an SLPP capabilities request or SLPP capabilities, SLPP resources, and/or SLPP service requirements for the UE. The one or more processors 1202 may be configured, for example, to transmit and receive, via the external interface, proposed PRS configurations for sidelink positioning and may be configured to transmit and receive, via the external interface, confirmation, rejection or modification of proposed PRS configurations for sidelink positioning. The sidelink positioning messages may use SLPP as discussed herein. The one or more processors 1202 may be configured, for example, to transmit and receive, via the external interface, SLPP messages that include a measurement report or location results. The transmitted measurement report, for example, may include information for the sidelink positioning signals transmitted by the UE and measurements performed by the UE 1200 for sidelink positioning signals transmitted by other UEs and may include indications of reverse link communication from each UE in a group to the UE 1200. The received measurement reports, for example, may include measurements performed by other UEs including measurements for the sidelink positioning signals transmitted by the UE 1200, and may include indications of reverse link communication from each UE in a group to each of the other UEs in the group. The location results may include ranges, distances and/or directions between one or more pairs of UEs in a group and/or relative locations, absolute locations and/or velocities and/or relative velocities for each of one or more UEs in a group.

The medium 1220 and/or memory 1204 may include a PRS module 1223 that when implemented by the one or more processors 1202 configures the one or more processors 1202 to transmit, via the external interface including one or more of wireless transceivers 1210, 1211, 1212, and 1213, PRS for sidelink positioning (e.g. sidelink PRS or sidelink SRS for NR or LTE). The one or more processors 1202 may be configured to transmit the SL PRS consistent with a proposed SL PRS configuration sent to or received from another UE. The one or more processors 1202 may be further configured to receive SL PRS from other UEs, via the external interface, and to measure the SL PRS for sidelink positioning.

The medium 1220 and/or memory 1204 may include a location module 1224 that when implemented by the one or more processors 1202 configures the one or more processors 1202 to determine location results for one or more UEs with respect to the UE 1200 based on SL PRS measurements performed by the UE 1200 and measurement information received in SLPP messages from the other UEs. The one or more processors 1202 may be further configured to determine velocities of the UE 1200 and/or other UEs based on SL PRS measurements performed by the UE 1200, and measurement information received in SLPP messages from the other UEs.

The medium 1220 and/or memory 1204 may include a discovery module 1226 that when implemented by the one or more processors 1202 configures the one or more processors 1202 to discover one or more other UEs that are available for sidelink positioning. The one or more processors 1202 may be further configured to obtain group criteria parameters for other UEs, such as a distance restriction, a time restriction, a direction of travel restriction, a speed restriction, sidelink position method restriction or a sidelink position method type restriction.

The medium 1220 and/or memory 1204 may include a group management module 1228 that when implemented by the one or more processors 1202 configures the one or more processors 1202 to determine a group status indication for one or more UEs, indicating inclusion or exclusion of the UE in the group, based on the group criteria parameters. The one or more processors 1202 may be further configured to determine a group status indication for one or more UEs in a group, indicating inclusion or exclusion of the UE in the group, based on the indications of reverse link communication for the one or more UEs, including indications of reverse link communication from each UE and the indications of reverse link communication from the UE 1200. The one or more processors 1202 may be further configured to determine a status of forward link communication and a status of reverse link communication between all pairs of UEs in the group based on the indications of reverse link communication from each UE in the group. The one or more processors 1202 may be further configured to determine the group status indication for one or more UEs based on the status of the forward link communication and the status of the reverse link communication between all pairs of UEs in the group. The one or more processors 1202 may be further configured to instigate the addition or transfer of one or more UEs from one group to another group based on relative locations and velocities of the one or more UEs and the UEs in the groups.

The medium 1220 and/or memory 1204 may include an upper layer module 1232 that when implemented by the one or more processors 1202 configures the one or more processors 1202 with an upper layer, such as upper layer 1102 of FIG. 11A, and to provide information to a ranging support layer module 1234 and to receive services from the ranging support layer module 1234. The one or more processors 1202 may be configured with an upper layer that is an application layer and that supports at least one of V2X, automated driving, movement of objects in a factory or warehouse, or UE to UE ranging.

The medium 1220 and/or memory 1204 may include a ranging support layer module 1234 that when implemented by the one or more processors 1202 configures the one or more processors 1202 with a ranging support layer that includes one or more ranging support elements for supporting sidelink positioning and ranging with one or more other UEs, such as ranging support layer 1110 of FIG. 11A, and to provide services to the upper layer by the ranging support layer. The ranging support elements of the ranging support layer configured by the one or more processors 1202 communicates with a corresponding one or more ranging support elements of a ranging support layer in the one or more other UEs through at least one lower layer of the architecture, e.g., via the transceivers 1210-1213.

The ranging support elements in the ranging support layer 1234 configured by the one or more processors 1202, for example, may be a discovery function, such as the DSDF 1112 shown in FIG. 11A and the services provided to the upper layer may include at least one of providing a unique identifier of another UE in proximity to the UE that can participate in Sidelink Positioning and Ranging service, providing services supported by another UE, providing a sidelink communication channel or communication session with another UE, or any combination thereof. The discovery function configured by the one or more processors 1202 may receive information from the upper layer, where the information may include at least one of a trigger for discovery of UEs to participate in Sidelink Positioning and Ranging services, attributes of the UEs to be discovered, an indication of discovery by other UEs and corresponding attributes of the other UEs, a request or permission for the corresponding Sidelink Positioning and Ranging services, or any combination thereof. The discovery function in the ranging support layer 1234, such as the DSDF 1112 shown in FIG. 11A, may be supported by the discovery module 1226 which may then be part of the ranging support layer 1234.

The ranging support elements in the ranging support layer 1234 configured by the one or more processors 1202, for example, may be a group support function, such as the GSSF 1114 shown in FIG. 11A and the services provided to the upper layer may include creating a Sidelink Positioning and Ranging service group with more than two UEs if the upper layer specified the Sidelink Positioning and Ranging service group, providing a group ID and group local member IDs to the upper layer, managing addition or removal of group members, splitting or merging groups, monitoring group member status, or any combination thereof. The group support function configured by the one or more processors 1202 may receive information from the upper layer, where the information may include a request for the creation of the Sidelink Positioning and Ranging service group, a request for addition or removal of a specific group member UE, a request for the management of the Sidelink Positioning and Ranging service group comprising merging or splitting groups. The group support function in the ranging support layer 1234, such as the GSSF 1114 shown in FIG. 11A, may be supported by the group management module 1228 which may then be part of the ranging support layer 1234.

The ranging support elements in the ranging support layer configured by the one or more processors 1202, for example, may be a Sidelink Positioning and Ranging Protocol function, such as the SLPP function 1116 shown in FIG. 11A and the services provided to the upper layer may include at least one of on-demand Sidelink Positioning and Ranging, direction, or relative location or velocity of another UE or a group of UEs, periodic Sidelink Positioning and Ranging, direction, or relative location or velocity of another UE or a group of UEs; triggered Sidelink Positioning and Ranging, direction, or relative location or velocity of another UE or a group of UEs, or any combination thereof. The Sidelink Positioning and Ranging Protocol function configured by the one or more processors 1202 may receive information from the upper layer, where the information may include a request for current range or direction or relative location or velocity of another UE or a group of UEs, a request for periodic range or direction or relative location or velocity of another UE or a group of UEs, a request for triggered range or direction or relative location or velocity of another UE or a group of UEs, or any combination thereof. The Sidelink Positioning and Ranging Protocol function configured by the one or more processors 1202 may further communicate with a network server that supports Sidelink Positioning and Ranging, e.g., using Non-Access Stratum (NAS) signaling, e.g., via the transceivers 1210-1213. The Sidelink Positioning and Ranging Protocol function in the ranging support layer 1234, such as the SLPP function 1116 shown in FIG. 11A, may be supported by the SLPP message module 1222 which may then be part of the ranging support layer 1234.

The medium 1220 and/or memory 1204 may include a lower layer module 1236 that when implemented by the one or more processors 1202 configures the one or more processors 1202 with one or more lower layers through which the one or more ranging support elements communicate with corresponding one or more ranging support elements of a ranging support layer in the one or more other UEs, e.g., via the transceivers 1210-1213. The one or more lower layers in the architecture configured by the one or more processors 1202 may be, e.g., a ProSe layer or V2X layer, such as the ProSe/V2X layer 1120 described in FIG. 11A. The one or more lower layers in the architecture configured by the one or more processors 1202 may also or instead be an Access Stratum (AS) layer such as the AS layer 1130 described in FIG. 11A. Communications by the ranging support elements through the lower layer 1236 may use a PC5 communication service provided by the ProSe layer, the V2X layer, or the AS layer.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program code 1208. For example, the non-transitory computer readable medium including program code 1208 stored thereon may include program code 1208 to support sidelink positioning in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include an external interface including one or more of wireless transceivers 1210, 1211, 1212, and 1213 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random-access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable program code 1208 stored thereon, which if executed by one or more processors 1202 may be operatively enabled to perform all or portions of the example operations as described herein. Computer readable medium 1220 may be a part of memory 1204.

Figure 13:
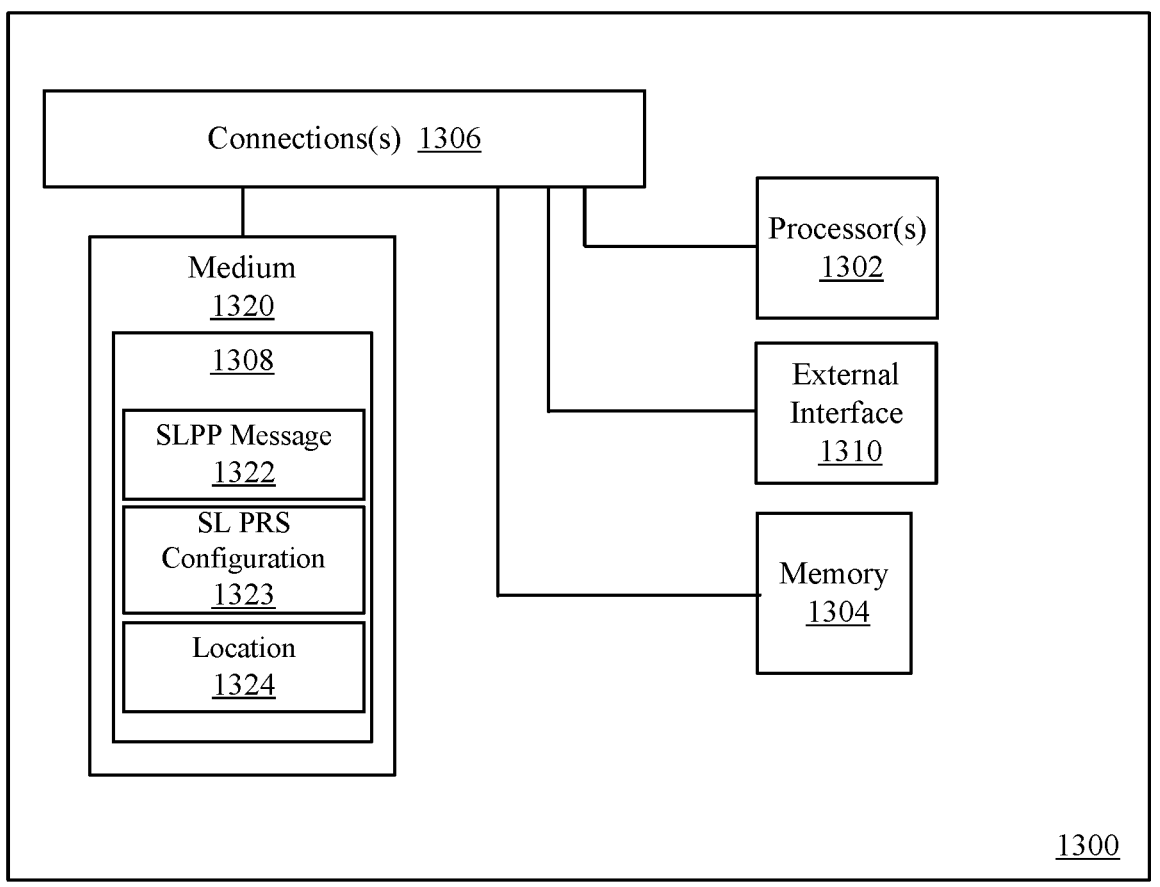
FIG. 13 shows a schematic block diagram illustrating certain exemplary features of a location server that is configured for network supported sidelink positioning, as discussed herein.

FIG. 13 shows a schematic block diagram illustrating certain exemplary features of a location server 1300, e.g., which may be LMF 120, SUPL SLP 119 or server 121 or 123 shown in FIG. 1, or LMF 120*a* or 120*b* or SUPL SLP 119*a* or 119*b* or server 121*a*, 121*b* or 123 shown in FIG. 2 or location server 302 shown in FIG. 3, and supports network supported sidelink positioning, as described herein. The location server 1300, for example, may be an LMF or a SUPL SLP (Secure User Plane Location (SUPL) Location Platform). The location server 1300, for example, may perform the signal flow 300 shown in FIG. 3 and accompanying techniques as discussed herein. The location server 1300 may include, for example, one or more processors 1302 and memory 1304, an external interface 1310, which may be operatively coupled with one or more connections 1306 (e.g., buses, lines, fibers, links, etc.) to non-transitory computer readable medium 1320 and memory 1304. The external interface 1310 may be a wired and/or wireless interface capable of connecting to network entities in the core network 140, such as an AMF or UPF, through which the location server 1300 may communicate with RAN nodes and UEs. The location server 1300 may further include additional items, which are not shown, such as a user interface that may include e.g., a display, a keypad or other input device, such as virtual keypad on the display, through which a user may interface with the location server. In certain example implementations, all or part of location server 1300 may take the form of a chipset, and/or the like.

The one or more processors 1302 may be implemented using a combination of hardware, firmware, and software. For example, the one or more processors 1302 may be configured to perform the functions discussed herein by implementing one or more instructions or program code 1308 on a non-transitory computer readable medium, such as medium 1320 and/or memory 1304. In some embodiments, the one or more processors 1302 may represent one or more circuits configurable to perform at least a portion of a data signal computing procedure or process related to the operation of location server 1300.

The medium 1320 and/or memory 1304 may store instructions or program code 1308 that contain executable code or software instructions that when executed by the one or more processors 1302 cause the one or more processors 1302 to operate as a special purpose computer programmed to perform the techniques disclosed herein. As illustrated in location server 1300, the medium 1320 and/or memory 1304 may include one or more components or modules that may be implemented by the one or more processors 1302 to perform the methodologies described herein. While the components or modules are illustrated as software in medium 1320 that is executable by the one or more processors 1302, it should be understood that the components or modules may be stored in memory 1304 or may be dedicated hardware either in the one or more processors 1302 or off the processors.

A number of software modules and data tables may reside in the medium 1320 and/or memory 1304 and be utilized by the one or more processors 1302 in order to manage both communications and the functionality described herein. It should be appreciated that the organization of the contents of the medium 1320 and/or memory 1304 as shown in location server 1300 is merely exemplary, and as such the functionality of the modules and/or data structures may be combined, separated, and/or be structured in different ways depending upon the implementation of the location server 1300.

The medium 1320 and/or memory 1304 may include an SLPP message module 1322 that when implemented by the one or more processors 1302 configures the one or more processors 1302 to send and receive SLPP messages to and from UEs, via the external interface 1310. The sidelink positioning messages may use SLPP as discussed herein. The one or more processors 1302 may be configured to transmit and receive SLPP messages, via the external interface 1310, not embedded in an LPP message, embedded in an LPP message, embedded in a SUPL message (which may include a SUPL POS message), or embedded in both an LPP and SUPL message (which may include a SUPL POS message). The one or more processors 1302 may be configured, for example, to transmit and receive, via the external interface 1310, SLPP messages that include an SLPP capabilities request or SLPP capabilities, SLPP resources, and/or SLPP service requirements for the UE. The one or more processors 1302 may be configured, for example, to transmit and receive, via the external interface 1310, proposed SL PRS configurations for sidelink positioning and may be configured to transmit and receive, via the external interface 1310, confirmation, rejection or modification of proposed SL PRS configurations for sidelink positioning. The one or more processors 1302 may be configured, for example, to transmit and receive, via the external interface 1310, SLPP messages that include a measurement report or location results. A measurement report, for example, may include measurements performed by UEs including measurements for sidelink positioning signals transmitted by UEs, and may include indications of reverse link communication from each UE in a group to each of the other UEs in the group. The location results may include ranges, distances and/or directions between one or more pairs of UEs in a group and/or relative locations, absolute locations and/or velocities for each of one or more UEs in a group.

The medium 1320 and/or memory 1304 may include an SL PRS configuration module 1323 that when implemented by the one or more processors 1302 configures the one or more processors 1302 to generate or verify configurations for SL PRS to be transmitted by one or more UEs for sidelink positioning. The one or more processors 1302 may be configured, for example, to obtain SLPP capabilities, SLPP resources, and SLPP service requirements for one or more UEs. The one or more processors 1302 may be configured to obtain SL PRS configurations for UEs.

The medium 1320 and/or memory 1304 may include a location module 1324 that when implemented by the one or more processors 1302 configures the one or more processors 1302 to determine location results for one or more UEs based on SL PRS measurements performed by the UEs. The one or more processors 1302 may be further configured to determine velocities of the UEs based on SL PRS measurements performed by the UEs. The one or more processors 1302 may be further configured to send to UEs, via the external interface 1310, the location results, such as ranges, directions, relative locations and/or velocities for the UEs.

The methodologies described herein may be implemented by various means depending upon the application. For example, these methodologies may be implemented in hardware, firmware, software, or any combination thereof. For a hardware implementation, the one or more processors 1302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1320 or memory 1304 that is connected to and executed by the one or more processors 1302. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1308 on a non-transitory computer readable medium, such as medium 1320 and/or memory 1304. Examples include computer readable media encoded with a data structure and computer readable media encoded with a computer program code 1308. For example, the non-transitory computer readable medium including program code 1308 stored thereon may include program code 1308 to enable network supported sidelink positioning in a manner consistent with disclosed embodiments. Non-transitory computer readable medium 1320 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1308 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1320, instructions and/or data may be provided as signals on transmission media included in a communication apparatus. For example, a communication apparatus may include an external interface 1310 having signals indicative of instructions and data. The instructions and data are configured to cause one or more processors to implement the functions outlined in the claims. That is, the communication apparatus includes transmission media with signals indicative of information to perform disclosed functions.

Memory 1304 may represent any data storage mechanism. Memory 1304 may include, for example, a primary memory and/or a secondary memory. Primary memory may include, for example, a random access memory, read only memory, etc. While illustrated in this example as being separate from one or more processors 1302, it should be understood that all or part of a primary memory may be provided within or otherwise co-located/coupled with the one or more processors 1302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1320. As such, in certain example implementations, the methods and/or apparatuses presented herein may take the form in whole or part of a computer readable medium 1320 that may include computer implementable program code 1308 stored thereon, which if executed by one or more processors 1302 may be operatively enabled to perform all or portions of the example operations as described herein. Computer readable medium 1320 may be a part of memory 1304.

FIG. 14 shows a flowchart for an exemplary method 1400, e.g., performed by a UE having an architecture for sidelink positioning and ranging services, such as UE 105 or UE 1200 or UE-A in FIGS. 11A and 11B, in a manner consistent with disclosed implementations.

At block 1402, the UE provides services to an upper layer of the architecture by a ranging support layer comprising one or more ranging support elements for supporting sidelink positioning and ranging with one or more other UEs, e.g., as discussed in FIGS. 11A and 11B. A means for providing services to an upper layer of the architecture by a ranging support layer comprising one or more ranging support elements for supporting sidelink positioning and ranging with one or more other UEs may include, e.g., one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200.

At block 1404, the UE communicates by the one or more ranging support elements with a corresponding one or more ranging support elements of a ranging support layer in the one or more other UEs through at least one lower layer of the architecture, e.g., as discussed in FIGS. 11A and 11B. A means for communicating by the one or more ranging support elements with a corresponding one or more ranging support elements of a ranging support layer in the one or more other UEs through at least one lower layer of the architecture may include, e.g., one of transceivers 1210-1213 and one or more processors 1202 configured with an architecture for sidelink positioning and ranging services with dedicated hardware or implementing executable code or software instructions in memory 1204 and/or medium 1220, such as the ranging support layer module 1234 and lower layer module 1236 of UE 1200.

In one implementation, the one or more ranging support elements may be a discovery function and may provide services to the upper layer that include at least one of providing a unique identifier of another UE in proximity to the UE that can participate in Sidelink Positioning and Ranging service, providing services supported by another UE, providing a sidelink communication channel or communication session with another UE, or any combination thereof, e.g., as discussed in FIGS. 11A and 11B. A means for providing services to the upper layer including at least one of providing a unique identifier of another UE in proximity to the UE that can participate in Sidelink Positioning and Ranging service, providing services supported by another UE, providing a sidelink communication channel or communication session with another UE, or any combination thereof may include, e.g., one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200. The UE may further receive information from the upper layer by the discovery function, where the information includes at least one of a trigger for discovery of UEs to participate in Sidelink Positioning and Ranging services, attributes of the UEs to be discovered, an indication of discovery by other UEs and corresponding attributes of the other UEs, a request or permission for the corresponding Sidelink Positioning and Ranging services, or any combination thereof, e.g., as discussed in FIGS. 11A and 11B. A means for receiving information from the upper layer by the discovery function, the information comprising at least one of a trigger for discovery of UEs to participate in Sidelink Positioning and Ranging services, attributes of the UEs to be discovered, an indication of discovery by other UEs and corresponding attributes of the other UEs, a request or permission for the corresponding Sidelink Positioning and Ranging services, or any combination thereof may include, e.g., one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200.

In one implementation, the one or more ranging support elements may be a group support function and may provide services to the upper layer that include at least one of creating a Sidelink Positioning and Ranging service group with more than two UEs if the upper layer specified the Sidelink Positioning and Ranging service group, providing a group ID and group local member IDs to the upper layer, managing addition or removal of group members, splitting or merging groups, monitoring group member status, or any combination thereof, e.g., as discussed in FIGS. 11A and 11B. A means for providing services to the upper layer including at least one of creating a Sidelink Positioning and Ranging service group with more than two UEs if the upper layer specified the Sidelink Positioning and Ranging service group, providing a group ID and group local member IDs to the upper layer, managing addition or removal of group members, splitting or merging groups, monitoring group member status, or any combination thereof may include, e.g., one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200. The UE may further receive information from the upper layer by the group support function, the information comprising a request for the creation of the Sidelink Positioning and Ranging service group, a request for addition or removal of a specific group member UE, a request for the management of the Sidelink Positioning and Ranging service group comprising merging or splitting groups, or any combination thereof, e.g., as discussed in FIGS. 11A and 11B. A means for receiving information from the upper layer by the group support function, the information comprising a request for the creation of the Sidelink Positioning and Ranging service group, a request for addition or removal of a specific group member UE, a request for the management of the Sidelink Positioning and Ranging service group comprising merging or splitting groups, or any combination thereof may include, e.g., one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200.

In one implementation, the one or more ranging support elements may be a Sidelink Positioning and Ranging Protocol function and may provide services to the upper layer that include at least one of on-demand Sidelink Positioning and Ranging, direction, or relative location of another UE or a group of UEs, periodic Sidelink Positioning and Ranging, direction, or relative location of another UE or a group of UEs; triggered Sidelink Positioning and Ranging, direction, or relative location of another UE or a group of UEs, or any combination thereof, e.g., as discussed in FIGS. 11A and 11B. A means for providing services to the upper layer comprises at least one of on-demand Sidelink Positioning and Ranging, direction, or relative location of another UE or a group of UEs, periodic Sidelink Positioning and Ranging, direction, or relative location of another UE or a group of UEs; triggered Sidelink Positioning and Ranging, direction, or relative location of another UE or a group of UEs, or any combination thereof may include, e.g., one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200. The UE may further receive information from the upper layer by the Sidelink Positioning and Ranging Protocol function, the information comprising a request for current range or direction or relative location of another UE or a group of UEs, a request for periodic range or direction or relative location of another UE or a group of UEs, a request for triggered range or direction or relative location of another UE or a group of UEs, or any combination thereof, e.g., as discussed in FIGS. 11A and 11B. A means for receiving information from the upper layer by the Sidelink Positioning and Ranging Protocol function, the information comprising a request for current range or direction or relative location of another UE or a group of UEs, a request for periodic range or direction or relative location of another UE or a group of UEs, a request for triggered range or direction or relative location of another UE or a group of UEs, or any combination thereof may include, e.g., one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200. The UE may further communicate by the Sidelink Positioning and Ranging Protocol function with a network server that supports Sidelink Positioning and Ranging, e.g., as discussed in FIGS. 11A and 11B. The Sidelink Positioning and Ranging Protocol function, for example, may communicate with the network server that supports Sidelink Positioning and Ranging using Non-Access Stratum (NAS) signaling. A means for communicating by the Sidelink Positioning and Ranging Protocol function with a network server that supports Sidelink Positioning and Ranging may include, e.g., one of transceivers 1210-1213 and one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200.

In one implementation, the upper layer may be an application layer, and the at least one lower layer may be a ProSe layer, V2X layer, or Access Stratum (AS) layer, as discussed in FIGS. 11A and 11B. The application layer, for example, may support at least one of V2X, automated driving, movement of objects in a factory or warehouse, UE to UE ranging, as discussed in FIGS. 11A and 11B. In one implementation, communicating through the at least one lower layer may use a PC5 communication service provided by the ProSe layer, the V2X layer, or the AS layer, as discussed in FIGS. 11A and 11B.

FIG. 15 shows a flowchart for an exemplary method 1500, e.g., performed by a UE having an architecture for sidelink positioning and ranging services, such as UE 105 or UE 1200 or UE-A in FIGS. 11A and 11B, in a manner consistent with disclosed implementations.

At block 1502, the functionality comprises implementing, at the UE, a ranging support protocol layer comprising one or more ranging support elements, e.g., as discussed above with respect to FIGS. 11A and 11B. A means for performing the functionality at block 1502 may include, e.g., one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200.

At block 1504, the functionality comprises communicating, using the one or more ranging support elements of the ranging support protocol layer, with a corresponding ranging support protocol layer in one or more other UEs (e.g. others UEs 105 or 1200), where the communicating is conducted via at least one lower protocol layer implemented at the UE, e.g., as discussed in FIGS. 11A and 11B. A means for performing the functionality at block 1504 may include, e.g., one of transceivers 1210-1213 and one or more processors 1202 configured with an architecture for sidelink positioning and ranging services with dedicated hardware or implementing executable code or software instructions in memory 1204 and/or medium 1220, such as the ranging support layer module 1234 and lower layer module 1236 of UE 1200.

At block 1506, the functionality comprises providing, at the ranging support protocol layer, a positioning service to an upper protocol layer implemented at the UE, where the positioning service is based at least in part on the communicating, e.g., as discussed above with respect to FIGS. 11A and 11B. A means for performing the functionality at block 1506 may include, e.g., one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200.

In one implementation, the one or more ranging support elements may be a discovery function and the positioning service may comprise information comprising a unique identifier of another UE of the one or more other UEs that can participate in a Sidelink Positioning and Ranging service, information comprising an indication of a service supported by another UE of the one or more other UEs, a sidelink communication channel with another UE of the one or more other UEs, a sidelink communication session with another UE of the one or more other UEs, or any combination thereof, e.g., as discussed in FIGS. 11A and 11B. In some embodiments, the method may further comprise receiving, with the discovery function, information from the upper protocol layer, where the information may comprise a trigger for discovery of UEs to participate in Sidelink Positioning and Ranging services, attributes of UEs to be discovered, a permission for discovery of the UE by other UEs of the one or more other UEs and corresponding attributes of the other UEs, a request or permission for Sidelink Positioning and Ranging services, or any combination thereof.

In one implementation, the one or more ranging support elements may comprise a group support function and providing a positioning service to the upper protocol layer may comprise using the group support function to: create a Sidelink Positioning and Ranging service group with more than two UEs if the upper layer specified the Sidelink Positioning and Ranging service group; provide a group ID and group local member IDs to the upper layer; manage addition or removal of group members; split or merge groups; monitor group member status; or any combination thereof, e.g., as discussed in FIGS. 11A and 11B. According to some embodiments, the method may further comprise receiving information from the upper protocol layer by the group support function, where the information comprises: a request for creation of the Sidelink Positioning and Ranging service group; a request for addition or removal of a specific group member UE; a request for management of the Sidelink Positioning and Ranging service group comprising merging or splitting groups; or any combination thereof, e.g., as discussed in FIGS. 11A and 11B.

In one implementation, the one or more ranging support elements may be a Sidelink Positioning and Ranging Protocol function and providing a positioning service to the upper protocol layer may comprise providing: on-demand Sidelink Positioning and Ranging for determination of a range, direction, relative location or relative velocity for another UE or each UE of a group of other UEs; periodic Sidelink Positioning and Ranging for periodic determination of a range, direction, relative location or relative velocity for another UE or each UE of a group of other UEs; triggered Sidelink Positioning and Ranging for triggered determination of a range, direction, relative location or relative velocity for another UE or each UE of a group of other UEs; or any combination thereof, e.g., as discussed in FIGS. 11A and 11B. Some embodiments may further comprise receiving information from the upper protocol layer by the Sidelink Positioning and Ranging Protocol function, where the information comprises: a request for a current range, direction, relative location or relative velocity of another UE or a group of UEs; a request for a periodic range, direction, relative location or relative velocity of another UE or a group of UEs; a request for a triggered range, direction, relative location or relative velocity of another UE or a group of UEs; or any combination thereof, e.g., as discussed in FIGS. 11A and 11B. Some embodiments may further comprise communicating, using the Sidelink Positioning and Ranging Protocol function, with a network server that supports Sidelink Positioning and Ranging, e.g., as discussed in FIGS. 11A and 11B. The Sidelink Positioning and Ranging Protocol function, for example, may communicate with the network server that supports Sidelink Positioning and Ranging using Non-Access Stratum (NAS) signaling and/or SLPP signaling. A means for communicating by the Sidelink Positioning and Ranging Protocol function with a network server that supports Sidelink Positioning and Ranging may include, e.g., one of transceivers 1210-1213 and one or more processors 1202 configured with an architecture for sidelink positioning and ranging services with dedicated hardware or implementing executable code or software instructions in memory 1204 and/or medium 1220, such as the upper layer module 1232 and ranging support layer module 1234 of UE 1200.

In one implementation, the upper protocol layer may comprise an application layer, and the at least one lower layer may comprise a ProSe layer, V2X layer, or Access Stratum (AS) layer, as discussed in FIGS. 11A and 11B. The application layer, for example, may support V2X, automated driving, movement of objects in a factory or warehouse, UE to UE ranging, or a combination thereof as discussed in FIGS. 11A and 11B. In one implementation, communicating through the at least one lower layer may use a PC5 communication service provided by the ProSe layer, the V2X layer, or the AS layer, as discussed in FIGS. 11A and 11B.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, Wi-Fi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1: A method for supporting sidelink (SL) positioning, the method performed by a user equipment (UE) and comprising: implementing, at the UE, a ranging support protocol layer comprising one or more ranging support elements; communicating, using the one or more ranging support elements of the ranging support protocol layer, with a corresponding ranging support protocol layer in one or more other UEs, wherein the communicating is conducted via at least one lower protocol layer implemented at the UE; and providing, at the ranging support protocol layer, a positioning service to an upper protocol layer implemented at the UE, the positioning service based at least in part on the communicating.

Clause 2: The method of clause 1, wherein the one or more ranging support elements comprise a discovery function, and the positioning service comprises: information comprising a unique identifier of another UE of the one or more other UEs that can participate in a Sidelink Positioning and Ranging service, information comprising an indication of a service supported by another UE of the one or more other UEs, a sidelink communication channel with another UE of the one or more other UEs, a sidelink communication session with another UE of the one or more other UEs, or any combination thereof.

Clause 3: The method of clause 2 further comprising receiving, with the discovery function, information from the upper protocol layer, wherein the information comprises: a trigger for discovery of UEs to participate in Sidelink Positioning and Ranging services, attributes of UEs to be discovered, a permission for discovery by other UEs of the one or more other UEs and corresponding attributes of the other UEs, a request or permission for Sidelink Positioning and Ranging services, or any combination thereof.

Clause 4: The method of any one of clauses 1-3 wherein the one or more ranging support elements comprise a group support function; and providing a positioning service to the upper protocol layer comprises using the group support function to: create a Sidelink Positioning and Ranging service group with more than two UEs of the one or more other UEs if the upper protocol layer specified the Sidelink Positioning and Ranging service group, provide a group ID and group local member IDs to the upper protocol layer, manage addition or removal of group members, split or merge groups, monitor group member status, or any combination thereof.

Clause 5: The method of clause 4 further comprising receiving, with the group support function, information from the upper protocol layer, wherein the information comprises: a request for creation of the Sidelink Positioning and Ranging service group, a request for addition or removal of a specific group member UE, a request for management of the Sidelink Positioning and Ranging service group comprising merging or splitting groups, or any combination thereof.

Clause 6: The method of any one of clauses 1-5 wherein the one or more ranging support elements comprise a Sidelink Positioning and Ranging Protocol function, and providing a positioning service to the upper protocol layer comprises providing: on-demand Sidelink Positioning and Ranging for determination of a range, direction, relative location or relative velocity for another UE or each UE of a group of other UEs; periodic Sidelink Positioning and Ranging for periodic determination of a range, direction, relative location or relative velocity for another UE or each UE of a group of other UEs; triggered Sidelink Positioning and Ranging for triggered determination of a range, direction, relative location or relative velocity for another UE or each UE of a group of other UEs; or any combination thereof.

Clause 7: The method of clause 6 further comprising receiving, with the Sidelink Positioning and Ranging Protocol function, information from the upper protocol layer, wherein the information comprises: a request for a current range, direction, relative location or relative velocity of another UE or a group of UEs, a request for a periodic range, direction, relative location or relative velocity of another UE or a group of UEs, a request for a triggered range, direction, relative location or relative velocity of another UE or a group of UEs, or any combination thereof.

Clause 8: The method of any one of clauses 6-7 further comprising communicating, using the Sidelink Positioning and Ranging Protocol function, with a network server that supports Sidelink Positioning and Ranging.

Clause 9: The method of clause 8 wherein the Sidelink Positioning and Ranging Protocol function communicates with the network server that supports Sidelink Positioning and Ranging using Non-Access Stratum (NAS) signaling.

Clause 10: The method of any one of clauses 1-9 wherein the upper protocol layer is an application layer, and the at least one lower protocol layer comprises a ProSe layer, V2X layer, or Access Stratum (AS) layer.

Clause 11: The method of clause 10 wherein the application layer supports vehicle-to-everything (V2X), automated driving, movement of objects in a factory or warehouse, UE to UE ranging, or a combination thereof.

Clause 12: The method of any one of clauses 1-11 wherein communicating, using the one or more ranging support elements of the ranging support protocol layer, comprises using a PC5 communication service provided by the ProSe layer, the V2X layer, or the AS layer.

Clause 13: A user equipment (UE) comprising: a transceiver; a memory; and one or more processors communicatively coupled with the transceiver and the memory, wherein the one or more processors are configured to: implement a ranging support protocol layer comprising one or more ranging support elements; communicate, via the transceiver using the one or more ranging support elements of the ranging support protocol layer, with a corresponding ranging support protocol layer in one or more other UEs, wherein the communicating is conducted via at least one lower protocol layer implemented at the UE; and provide, at the ranging support protocol layer, a positioning service to an upper protocol layer implemented at the UE, the positioning service based at least in part on the communicating.

Clause 14: The UE of clause 13, wherein: to communicate using the one or more ranging support elements, the one or more processors are configured to implement a discovery function; and to provide the positioning service, the one or more processors are configured to provide: information comprising a unique identifier of another UE of the one or more other UEs that can participate in a Sidelink Positioning and Ranging service, information comprising an indication of a service supported by another UE of the one or more other UEs, a sidelink communication channel with another UE of the one or more other UEs, a sidelink communication session with another UE of the one or more other UEs, or any combination thereof.

Clause 15: The UE of clause 14 wherein the one or more processors are further configured to receive, with the discovery function, information from the upper protocol layer, wherein the information comprises: a trigger for discovery of UEs to participate in Sidelink Positioning and Ranging services, attributes of UEs to be discovered, a permission for discovery by other UEs of the one or more other UEs and corresponding attributes of the other UEs, a request or permission for Sidelink Positioning and Ranging services, or any combination thereof.

Clause 16: The UE of any one of clauses 13-15 wherein to communicate using the one or more ranging support elements, the one or more processors are configured to implement a group support function; and to provide the positioning service to the upper protocol layer, the one or more processors are configured to use the group support function to: create a Sidelink Positioning and Ranging service group with more than two UEs of the one or more other UEs if the upper protocol layer specified the Sidelink Positioning and Ranging service group, provide a group ID and group local member IDs to the upper protocol layer, manage addition or removal of group members, split or merge groups, monitor group member status, or any combination thereof.

Clause 17: The UE of clause 16 wherein the one or more processors are further configured to receive, with the group support function, information from the upper protocol layer, wherein the information comprises: a request for creation of the Sidelink Positioning and Ranging service group, a request for addition or removal of a specific group member UE, a request for management of the Sidelink Positioning and Ranging service group comprising merging or splitting groups, or any combination thereof.

Clause 18: The UE of any one of clauses 13-17 wherein to communicate using the one or more ranging support elements, the one or more processors are configured to implement a Sidelink Positioning and Ranging Protocol function; and to provide the positioning service to the upper protocol layer, the one or more processors are configured to provide: on-demand Sidelink Positioning and Ranging for determination of a range, direction, relative location or relative velocity for another UE or each UE of a group of other UEs; periodic Sidelink Positioning and Ranging for periodic determination of a range, direction, relative location or relative velocity for another UE or each UE of a group of other UEs; triggered Sidelink Positioning and Ranging for triggered determination of a range, direction, relative location or relative velocity for another UE or each UE of a group of other UEs; or any combination thereof.

Clause 19: The UE of clause 18 wherein the one or more processors are further configured to receive, with the Sidelink Positioning and Ranging Protocol function, information from the upper protocol layer, wherein the information comprises: a request for a current range, direction, relative location or relative velocity of another UE or a group of UEs, a request for a periodic range, direction, relative location or relative velocity of another UE or a group of UEs, a request for a triggered range, direction, relative location or relative velocity of another UE or a group of UEs, or any combination thereof.

Clause 20: The UE of any one of clauses 18-19 wherein the one or more processors are further configured to communicate, via the transceiver using the Sidelink Positioning and Ranging Protocol function, with a network server that supports Sidelink Positioning and Ranging.

Clause 21: The UE of clause 20 wherein the one or more processors are configured to communicate, using the Sidelink Positioning and Ranging Protocol function, with the network server that supports Sidelink Positioning and Ranging using Non-Access Stratum (NAS) signaling.

Clause 22: The UE of any one of clauses 13-21 wherein to provide the positioning service to the upper protocol layer, the one or more processors are configured to provide the positioning service to an application layer; and to communicate via the at least one lower protocol layer, the one or more processors are configured to communicate via a ProSe layer, V2X layer, or Access Stratum (AS) layer.

Clause 23: The UE of clause 22 wherein, to communicate using the one or more ranging support elements of the ranging support protocol layer, the one or more processors are configured to use a PC5 communication service provided by the ProSe layer, the V2X layer, or the AS layer.

Clause 24: An apparatus having means for performing the method of any one of clauses 1-12.

Clause 25: A non-transitory computer-readable medium storing instructions, the instructions comprising code for performing the method of any one of clauses 1-12.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the disclosure as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting sidelink (SL) positioning, the method performed by a user equipment (UE) and comprising:

implementing, at the UE, a ranging support protocol layer configured as a protocol layer between (i) at least one lower protocol layer implemented at the UE comprising a ProSe layer, a V2X layer, or an Access Stratum (AS) layer, and (ii) an upper protocol layer implemented at the UE and configured to utilize positioning information, the ranging support protocol layer comprising one or more ranging support elements;

communicating, using the one or more ranging support elements of the ranging support protocol layer, with a corresponding ranging support protocol layer in one or more other UEs through the at least one lower protocol layer; and providing, by the ranging support protocol layer to the upper protocol layer, a positioning service based at least in part on the communicating.

2. The method of claim 1, wherein the one or more ranging support elements comprise a discovery function, and the positioning service comprises:

information comprising a unique identifier of another UE of the one or more other UEs that can participate in a Sidelink Positioning and Ranging service, information comprising an indication of a service supported by another UE of the one or more other UEs, a sidelink communication channel with another UE of the one or more other UEs, a sidelink communication session with another UE of the one or more other UEs, or any combination thereof.

3. The method of claim 2, further comprising receiving, with the discovery function, information from the upper protocol layer, wherein the information comprises:

a trigger for discovery of UEs to participate in Sidelink Positioning and Ranging services, attributes of UEs to be discovered, a permission for discovery by other UEs of the one or more other UEs and corresponding attributes of the other UEs, a request or permission for Sidelink Positioning and Ranging services, or any combination thereof.

4. The method of claim 1, wherein:

the one or more ranging support elements comprise a group support function; and providing a positioning service to the upper protocol layer comprises using the group support function to:

create a Sidelink Positioning and Ranging service group with more than two UEs of the one or more other UEs if the upper protocol layer specified the Sidelink Positioning and Ranging service group, provide a group ID and group local member IDs to the upper protocol layer, manage addition or removal of group members, split or merge groups, monitor group member status, or any combination thereof.

5. The method of claim 4, further comprising receiving, with the group support function, information from the upper protocol layer, wherein the information comprises:

a request for creation of the Sidelink Positioning and Ranging service group, a request for addition or removal of a specific group member UE, a request for management of the Sidelink Positioning and Ranging service group comprising merging or splitting groups, or any combination thereof.

6. The method of claim 1, wherein the one or more ranging support elements comprise a Sidelink Positioning and Ranging Protocol function, and providing a positioning service to the upper protocol layer comprises providing:

on-demand Sidelink Positioning and Ranging for determination of a range, direction, relative location or relative velocity for another UE or each UE of a group of other UEs;

periodic Sidelink Positioning and Ranging for periodic determination of a range, direction, relative location or relative velocity for another UE or each UE of a group of other UEs;

triggered Sidelink Positioning and Ranging for triggered determination of a range, direction, relative location or relative velocity for another UE or each UE of a group of other UEs; or any combination thereof.

7. The method of claim 6, further comprising receiving, with the Sidelink Positioning and Ranging Protocol function, information from the upper protocol layer, wherein the information comprises:

a request for a current range, direction, relative location or relative velocity of another UE or a group of UEs, a request for a periodic range, direction, relative location or relative velocity of another UE or a group of UEs, a request for a triggered range, direction, relative location or relative velocity of another UE or a group of UEs, or any combination thereof.

8. The method of claim 6, further comprising communicating, using the Sidelink Positioning and Ranging Protocol function, with a network server that supports Sidelink Positioning and Ranging.

9. The method of claim 8, wherein the Sidelink Positioning and Ranging Protocol function communicates with the network server that supports Sidelink Positioning and Ranging using Non-Access Stratum (NAS) signaling.

10. The method of claim 1, wherein the upper protocol layer is an application layer.

11. The method of claim 10, wherein the application layer supports vehicle-to-everything (V2X), automated driving, movement of objects in a factory or warehouse, UE to UE ranging, or a combination thereof.

12. The method of claim 10, wherein communicating, using the one or more ranging support elements of the ranging support protocol layer, comprises using a PC5 communication service provided by the ProSe layer, the V2X layer, or the AS layer.

13. A user equipment (UE) comprising:

a transceiver;

a memory; and one or more processors communicatively coupled with the transceiver and the memory, wherein the one or more processors are configured to:

implement a ranging support protocol layer configured as a protocol layer between (i) at least one lower protocol layer implemented at the UE comprising a ProSe layer, a V2X layer, or an Access Stratum (AS) layer, and (ii) an upper protocol layer implemented at the UE and configured to utilize positioning information, the ranging support protocol layer comprising one or more ranging support elements;

communicate, via the transceiver using the one or more ranging support elements of the ranging support protocol layer, with a corresponding ranging support protocol layer in one or more other UEs through the at least one lower protocol layer; and provide, by the ranging support protocol layer to the upper protocol layer, a positioning service based at least in part on the communicating.

14. The UE of claim 13, wherein:

to communicate using the one or more ranging support elements, the one or more processors are configured to implement a discovery function; and to provide the positioning service, the one or more processors are configured to provide:

information comprising a unique identifier of another UE of the one or more other UEs that can participate in a Sidelink Positioning and Ranging service, information comprising an indication of a service supported by another UE of the one or more other UEs, a sidelink communication channel with another UE of the one or more other UEs, a sidelink communication session with another UE of the one or more other UEs, or any combination thereof.

15. The UE of claim 14, wherein the one or more processors are further configured to receive, with the discovery function, information from the upper protocol layer, wherein the information comprises:

a trigger for discovery of UEs to participate in Sidelink Positioning and Ranging services, attributes of UEs to be discovered, a permission for discovery by other UEs of the one or more other UEs and corresponding attributes of the other UEs, a request or permission for Sidelink Positioning and Ranging services, or any combination thereof.

16. The UE of claim 13, wherein:

to communicate using the one or more ranging support elements, the one or more processors are configured to implement a group support function; and to provide the positioning service to the upper protocol layer, the one or more processors are configured to use the group support function to:

create a Sidelink Positioning and Ranging service group with more than two UEs of the one or more other UEs if the upper protocol layer specified the Sidelink Positioning and Ranging service group, provide a group ID and group local member IDs to the upper protocol layer, manage addition or removal of group members, split or merge groups, monitor group member status, or any combination thereof.

17. The UE of claim 16, wherein the one or more processors are further configured to receive, with the group support function, information from the upper protocol layer, wherein the information comprises:

a request for creation of the Sidelink Positioning and Ranging service group, a request for addition or removal of a specific group member UE, a request for management of the Sidelink Positioning and Ranging service group comprising merging or splitting groups, or any combination thereof.

18. The UE of claim 13, wherein:

to communicate using the one or more ranging support elements, the one or more processors are configured to implement a Sidelink Positioning and Ranging Protocol function; and to provide the positioning service to the upper protocol layer, the one or more processors are configured to provide:

on-demand Sidelink Positioning and Ranging for determination of a range, direction, relative location or relative velocity for another UE or each UE of a group of other UEs;

periodic Sidelink Positioning and Ranging for periodic determination of a range, direction, relative location or relative velocity for another UE or each UE of a group of other UEs;

triggered Sidelink Positioning and Ranging for triggered determination of a range, direction, relative location or relative velocity for another UE or each UE of a group of other UEs; or any combination thereof.

19. The UE of claim 18, wherein the one or more processors are further configured to receive, with the Sidelink Positioning and Ranging Protocol function, information from the upper protocol layer, wherein the information comprises:

a request for a current range, direction, relative location or relative velocity of another UE or a group of UEs, a request for a periodic range, direction, relative location or relative velocity of another UE or a group of UEs, a request for a triggered range, direction, relative location or relative velocity of another UE or a group of UEs, or any combination thereof.

20. The UE of claim 18, wherein the one or more processors are further configured to communicate, via the transceiver using the Sidelink Positioning and Ranging Protocol function, with a network server that supports Sidelink Positioning and Ranging.

21. The UE of claim 20, wherein the one or more processors are configured to communicate, using the Sidelink Positioning and Ranging Protocol function, with the network server that supports Sidelink Positioning and Ranging using Non-Access Stratum (NAS) signaling.

22. The UE of claim 13, wherein:

to provide the positioning service to the upper protocol layer, the one or more processors are configured to provide the positioning service to an application layer.

23. The UE of claim 22, wherein, to communicate using the one or more ranging support elements of the ranging support protocol layer, the one or more processors are configured to use a PC5 communication service provided by the ProSe layer, the V2X layer, or the AS layer.

24. An apparatus for supporting sidelink (SL) positioning, the apparatus comprising:

means for implementing a ranging support protocol layer configured as a protocol layer between (i) at least one lower protocol layer implemented at a user equipment (UE) comprising a ProSe layer, a V2X layer, or an Access Stratum (AS) layer, and (ii) an upper protocol layer implemented at the UE and configured to utilize positioning information, the ranging support protocol layer comprising one or more ranging support elements;

means for communicating, using the one or more ranging support elements of the ranging support protocol layer, with a corresponding ranging support protocol layer in one or more other UEs through the at least one lower protocol layer; and means for providing, by the ranging support protocol layer to the upper protocol layer, a positioning service based at least in part on the communicating.

25. The apparatus of claim 24, wherein:

the means for communicating using the one or more ranging support elements comprise means for implementing a discovery function; and the means for providing the positioning service comprises means for providing:

information comprising a unique identifier of another UE of the one or more other UEs that can participate in a Sidelink Positioning and Ranging service, information comprising an indication of a service supported by another UE of the one or more other UEs, a sidelink communication channel with another UE of the one or more other UEs, a sidelink communication session with another UE of the one or more other UEs, or any combination thereof.

26. The apparatus of claim 25, further comprising means for receiving, with the discovery function, information from the upper protocol layer, wherein the information comprises:

a trigger for discovery of UEs to participate in Sidelink Positioning and Ranging services, attributes of UEs to be discovered, a permission for discovery by other UEs of the one or more other UEs and corresponding attributes of the other UEs, a request or permission for Sidelink Positioning and Ranging services, or any combination thereof.

27. The apparatus of claim 24, wherein:

the means for communicating using the one or more ranging support elements comprise means for implementing a group support function; and the means for providing the positioning service comprises means for using the group support function to:

create a Sidelink Positioning and Ranging service group with more than two UEs of the one or more other UEs if the upper protocol layer specified the Sidelink Positioning and Ranging service group, provide a group ID and group local member IDs to the upper protocol layer, manage addition or removal of group members, split or merge groups, monitor group member status, or any combination thereof.

28. The apparatus of claim 27, further comprising means for receiving, with the group support function, information from the upper protocol layer, wherein the information comprises:

a request for creation of the Sidelink Positioning and Ranging service group, a request for addition or removal of a specific group member UE, a request for management of the Sidelink Positioning and Ranging service group comprising merging or splitting groups, or any combination thereof.

29. The apparatus of claim 24, wherein:

the means for communicating using the one or more ranging support elements comprise means for implementing a Sidelink Positioning and Ranging Protocol function; and the means for providing the positioning service comprises means for providing:

on-demand Sidelink Positioning and Ranging for determination of a range, direction, relative location or relative velocity for another UE or each UE of a group of other UEs;

periodic Sidelink Positioning and Ranging for periodic determination of a range, direction, relative location or relative velocity for another UE or each UE of a group of other UEs;

triggered Sidelink Positioning and Ranging for triggered determination of a range, direction, relative location or relative velocity for another UE or each UE of a group of other UEs; or any combination thereof.

30. A non-transitory computer-readable medium storing instructions for supporting sidelink (SL) positioning, the instructions comprising code for:

implementing a ranging support protocol layer configured as a protocol layer between (i) at least one lower protocol layer implemented at a user equipment (UE) comprising a ProSe layer, a V2X layer, or an Access Stratum (AS) layer, and (ii) an upper protocol layer implemented at the UE and configured to utilize positioning information, the ranging support protocol layer comprising one or more ranging support elements;

communicating, using the one or more ranging support elements of the ranging support protocol layer, with a corresponding ranging support protocol layer in one or more other UEs, through the at least one lower protocol layer; and providing, by the ranging support protocol layer to the upper protocol layer, a positioning service based at least in part on the communicating.

* * * * *